(12) United States Patent
Shattil

(10) Patent No.: US 11,424,792 B2
(45) Date of Patent: *Aug. 23, 2022

(54) COORDINATED MULTIPOINT SYSTEMS

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/183,114

(22) Filed: Feb. 23, 2021

(65) Prior Publication Data

US 2021/0273689 A1 Sep. 2, 2021

Related U.S. Application Data

(60) Continuation of application No. 16/575,713, filed on Sep. 19, 2019, now Pat. No. 10,931,338, which is a
(Continued)

(51) Int. Cl.
*H04B 7/0456* (2017.01)
*H04B 1/00* (2006.01)
(Continued)

(52) U.S. Cl.
CPC ......... *H04B 7/0456* (2013.01); *H04B 1/0003* (2013.01); *H04B 7/024* (2013.01); *H04B 7/0452* (2013.01); *H04B 7/0632* (2013.01)

(58) Field of Classification Search
CPC .... H04B 7/0456; H04B 1/0003; H04B 7/024; H04B 7/0452; H04B 7/0632
See application file for complete search history.

(56) References Cited

U.S. PATENT DOCUMENTS

| 4,164,714 A | 8/1979 | Swanson |
| 4,471,399 A | 9/1984 | Udren |

(Continued)

FOREIGN PATENT DOCUMENTS

| EP | 2449690 B1 | 5/2012 |
| EP | 2763321 A1 | 8/2014 |

(Continued)

OTHER PUBLICATIONS

H. Prakash, C.D.Suriyakala; "PAPR Reduction in MIMO SC-FDMA—A Survey"; Int. J Rec. Adv. Sci. Tech., 2015; 2(2):11-19.
(Continued)

*Primary Examiner* — Shailendra Kumar
(74) *Attorney, Agent, or Firm* — Steven J Shattil

(57) ABSTRACT

A flexible channel bandwidth for mobile radio communications is provided by provisioning a set of Orthogonal Frequency Division Multiplexing (OFDM) subcarriers for mobile radio communications; encoding data symbols with polyphase codes derived from a discrete Fourier transform to produce encoded data symbols; and modulating the encoded data symbols onto the OFDM subcarriers to produce a superposition signal that resembles a single-carrier signal and has one of a plurality of different symbol durations. The provisioning comprises selecting one of a plurality of different selectable subcarrier spacings, to provide for the one of the plurality of different symbol durations.

21 Claims, 27 Drawing Sheets

Related U.S. Application Data continuation of application No. 14/733,013, filed on Jun. 8, 2015, now Pat. No. 10,425,135, which is a continuation-in-part of application No. 13/116,984, filed on May 26, 2011, now Pat. No. 10,014,882, which is a continuation-in-part of application No. 12/328,917, filed on Dec. 5, 2008, now Pat. No. 7,965,761, which is a division of application No. 11/621,014, filed on Jan. 8, 2007, now Pat. No. 7,593,449.

(51) Int. Cl.
*H04B 7/024* (2017.01)
*H04B 7/0452* (2017.01)
*H04B 7/06* (2006.01)

(56) References Cited

U.S. PATENT DOCUMENTS

| | | |
|---|---|---|
| 4,479,226 A | 10/1984 | Prabhu et al. |
| 4,550,402 A | 10/1985 | Gable et al. |
| 4,590,511 A | 5/1986 | Bocchi et al. |
| 4,628,517 A | 12/1986 | Schwarz |
| 4,700,341 A | 10/1987 | Huang |
| 4,827,480 A | 5/1989 | Kowalski |
| 4,901,307 A | 2/1990 | Gilhousen et al. |
| 4,912,422 A | 3/1990 | Kobayashi et al. |
| 4,943,973 A | 7/1990 | Werner |
| 5,003,545 A | 3/1991 | Kowalski |
| 5,016,242 A | 5/1991 | Tang |
| 5,093,863 A | 3/1992 | Galand et al. |
| 5,125,100 A | 6/1992 | Katznelson |
| 5,191,459 A | 3/1993 | Thompson et al. |
| 5,249,201 A | 9/1993 | Posner et al. |
| 5,282,222 A | 1/1994 | Fattouche et al. |
| 5,309,514 A | 5/1994 | Johnson et al. |
| 5,406,551 A | 4/1995 | Saito et al. |
| 5,410,538 A | 4/1995 | Roche et al. |
| 5,412,648 A | 5/1995 | Fan |
| 5,422,952 A | 6/1995 | Kennedy et al. |
| 5,425,049 A | 6/1995 | Dent et al. |
| 5,457,557 A | 10/1995 | Zarem et al. |
| 5,463,376 A | 10/1995 | Stoffer |
| 5,491,727 A | 2/1996 | Petit |
| 5,504,775 A | 4/1996 | Chouly et al. |
| 5,504,783 A | 4/1996 | Tomisato et al. |
| 5,519,692 A | 5/1996 | Hershey |
| 5,521,937 A | 5/1996 | Kondo et al. |
| 5,528,581 A | 6/1996 | De Bot |
| 5,533,012 A | 7/1996 | Fukasawa et al. |
| 5,543,806 A | 8/1996 | Wilkinson |
| 5,548,582 A | 8/1996 | Brajal et al. |
| 5,555,268 A | 9/1996 | Fattouche et al. |
| 5,563,906 A | 10/1996 | Hershey et al. |
| 5,579,304 A | 11/1996 | Sugimoto et al. |
| 5,612,978 A | 3/1997 | Blanchard et al. |
| 5,630,154 A | 5/1997 | Bolstad et al. |
| 5,640,698 A | 6/1997 | Shen et al. |
| 5,691,832 A | 11/1997 | Liedenbaum et al. |
| 5,694,393 A | 12/1997 | Kaye |
| 5,704,013 A | 12/1997 | Watari et al. |
| 5,712,716 A | 1/1998 | Vanoli et al. |
| 5,765,097 A | 6/1998 | Dail |
| 5,790,516 A | 8/1998 | Gudmundson et al. |
| 5,793,413 A | 8/1998 | Hylton et al. |
| 5,793,759 A | 8/1998 | Rakib et al. |
| 5,809,426 A | 9/1998 | Radojevic et al. |
| 5,815,801 A | 9/1998 | Hamalainen et al. |
| 5,818,619 A | 10/1998 | Medved et al. |
| 5,822,368 A | 10/1998 | Wang |
| 5,828,658 A | 10/1998 | Ottersten et al. |
| 5,831,977 A | 11/1998 | Dent |
| 5,838,268 A | 11/1998 | Frenkel et al. |
| 5,844,951 A | 12/1998 | Proakis et al. |
| 5,862,189 A | 1/1999 | Huisken et al. |
| 5,931,893 A | 8/1999 | Dent et al. |
| 5,940,196 A | 8/1999 | Piehler et al. |
| 5,940,379 A | 8/1999 | Startup et al. |
| 5,943,322 A | 8/1999 | Mayor et al. |
| 5,943,332 A | 8/1999 | Liu et al. |
| 5,949,796 A | 9/1999 | Kumar |
| 5,955,983 A | 9/1999 | Li |
| 5,955,992 A | 9/1999 | Shattil |
| 5,960,032 A | 9/1999 | Letaief et al. |
| 5,991,334 A | 11/1999 | Papadopoulos et al. |
| 6,008,760 A | 12/1999 | Shattil |
| 6,018,317 A | 1/2000 | Dogan et al. |
| 6,047,190 A | 4/2000 | Haleem et al. |
| 6,055,432 A | 4/2000 | Haleem et al. |
| 6,058,105 A | 5/2000 | Hochwald |
| 6,075,812 A | 6/2000 | Cafarella et al. |
| 6,084,871 A | 7/2000 | Engstrom et al. |
| 6,088,351 A | 7/2000 | Jenkin et al. |
| 6,091,967 A | 7/2000 | Kruys et al. |
| 6,097,712 A | 8/2000 | Secord et al. |
| 6,097,773 A | 8/2000 | Carter et al. |
| 6,107,954 A | 8/2000 | Li |
| 6,122,295 A | 9/2000 | Kato et al. |
| 6,128,276 A | 10/2000 | Agee |
| 6,128,350 A | 10/2000 | Shastri et al. |
| 6,130,918 A | 10/2000 | Humphrey et al. |
| 6,141,393 A | 10/2000 | Thomas et al. |
| RE36,944 E | 11/2000 | Li |
| 6,144,711 A | 11/2000 | Raleigh et al. |
| 6,154,443 A | 11/2000 | Huang et al. |
| 6,175,550 B1 | 1/2001 | van Nee et al. |
| 6,175,551 B1 | 1/2001 | Awater et al. |
| 6,178,158 B1 | 1/2001 | Suzuki et al. |
| 6,188,717 B1 | 2/2001 | Kaiser et al. |
| 6,192,068 B1 | 2/2001 | Fattouche et al. |
| 6,208,295 B1 | 3/2001 | Dogan et al. |
| 6,211,671 B1 | 4/2001 | Shattil |
| 6,215,983 B1 | 4/2001 | Dogan et al. |
| 6,233,248 B1 | 5/2001 | Sautter et al. |
| 6,236,642 B1 | 5/2001 | Shaffer et al. |
| 6,240,129 B1 | 5/2001 | Reusens et al. |
| 6,243,565 B1 | 6/2001 | Smith et al. |
| 6,243,581 B1 | 6/2001 | Jawanda |
| 6,252,909 B1 | 6/2001 | Tzannes et al. |
| 6,266,702 B1 | 7/2001 | Darnell et al. |
| 6,282,167 B1 | 8/2001 | Michon et al. |
| 6,282,185 B1 | 8/2001 | Hakkinen et al. |
| 6,289,220 B1 | 9/2001 | Spear |
| 6,292,473 B1 | 9/2001 | Duske et al. |
| 6,301,221 B1 | 10/2001 | Paterson |
| 6,307,892 B1 | 10/2001 | Jones et al. |
| 6,310,704 B1 | 10/2001 | Dogan et al. |
| 6,320,897 B1 | 11/2001 | Fattouche et al. |
| 6,331,837 B1 | 12/2001 | Shattil |
| 6,348,791 B2 | 2/2002 | Shattil |
| 6,351,499 B1 | 2/2002 | Paulraj et al. |
| 6,359,923 B1 | 3/2002 | Agee et al. |
| 6,377,566 B1 | 4/2002 | Cupo et al. |
| 6,389,034 B1 | 5/2002 | Guo et al. |
| 6,405,147 B1 | 6/2002 | Fera |
| 6,421,528 B1 | 7/2002 | Rosen et al. |
| 6,434,390 B2 | 8/2002 | Rahman |
| 6,438,173 B1 | 8/2002 | Stantchev et al. |
| 6,442,130 B1 | 8/2002 | Jones, IV et al. |
| 6,442,193 B1 | 8/2002 | Hirsch |
| 6,442,222 B1 | 8/2002 | Ghazi-Moghadam et al. |
| 6,452,981 B1 | 9/2002 | Raleigh et al. |
| 6,459,740 B1 | 10/2002 | Lo |
| 6,463,295 B1 | 10/2002 | Yun |
| 6,470,055 B1 | 10/2002 | Feher |
| 6,473,393 B1 | 10/2002 | Ariyavisitakul et al. |
| 6,473,418 B1 | 10/2002 | Laroia et al. |
| 6,496,290 B1 | 12/2002 | Lee |
| 6,504,862 B1 | 1/2003 | Yang et al. |
| 6,507,319 B2 | 1/2003 | Sikina |
| 6,510,133 B1 | 1/2003 | Uesugi |
| 6,512,737 B1 | 1/2003 | Agee |
| 6,526,105 B1 | 2/2003 | Harikumar et al. |

(56) References Cited

U.S. PATENT DOCUMENTS

| | | |
|---|---|---|
| 6,532,224 B1 | 3/2003 | Dailey |
| 6,549,581 B1 | 4/2003 | Izumi et al. |
| 6,563,881 B1 | 5/2003 | Sakoda et al. |
| 6,567,482 B1 | 5/2003 | Popovic |
| 6,567,982 B1 | 5/2003 | Howe et al. |
| 6,570,913 B1 | 5/2003 | Chen |
| 6,603,827 B2 | 8/2003 | Bottomley et al. |
| 6,606,351 B1 | 8/2003 | Dapper et al. |
| 6,631,175 B2 | 10/2003 | Harikumar et al. |
| 6,636,495 B1 | 10/2003 | Tangemann |
| 6,650,645 B2 | 11/2003 | Scott et al. |
| 6,654,408 B1 | 11/2003 | Kadous et al. |
| 6,654,719 B1 | 11/2003 | Papadias |
| 6,662,024 B2 | 12/2003 | Walton et al. |
| 6,665,521 B1 | 12/2003 | Gorday et al. |
| 6,667,714 B1 | 12/2003 | Solondz |
| 6,674,810 B1 | 1/2004 | Cheng |
| 6,674,999 B2 | 1/2004 | Ramachandran |
| 6,678,318 B1 | 1/2004 | Lai |
| 6,686,879 B2 | 2/2004 | Shattil |
| 6,687,511 B2 | 2/2004 | McGowan et al. |
| 6,693,984 B1 | 2/2004 | Andre et al. |
| 6,694,154 B1 | 2/2004 | Molnar et al. |
| 6,704,794 B1 | 3/2004 | Kejriwal et al. |
| 6,717,908 B2 | 4/2004 | Vijayan et al. |
| 6,728,295 B1 | 4/2004 | Nallanathan et al. |
| 6,747,946 B1 | 6/2004 | Kaneko et al. |
| 6,751,187 B2 | 6/2004 | Walton et al. |
| 6,757,344 B2 | 6/2004 | Carleton et al. |
| 6,760,373 B2 | 7/2004 | Gross et al. |
| 6,765,969 B1 | 7/2004 | Vook et al. |
| 6,778,514 B1 | 8/2004 | Boccussi et al. |
| 6,785,513 B1 | 8/2004 | Sivaprakasam |
| 6,813,485 B2 | 11/2004 | Sorrells et al. |
| 6,832,251 B1 | 12/2004 | Gelvin et al. |
| 6,850,481 B2 | 2/2005 | Wu et al. |
| 6,859,506 B1 | 2/2005 | McCorkle |
| 6,859,641 B2 | 2/2005 | Collins et al. |
| 6,882,619 B1 | 4/2005 | Gerakoulis |
| 6,907,270 B1 | 6/2005 | Blanz |
| 6,928,047 B1 | 8/2005 | Xia |
| 6,944,168 B2 | 9/2005 | Paatela et al. |
| 6,980,768 B2 | 12/2005 | Arend et al. |
| 6,982,968 B1 | 1/2006 | Barratt et al. |
| 6,985,533 B2 | 1/2006 | Attallah et al. |
| 6,996,076 B1 | 2/2006 | Forbes et al. |
| 7,009,958 B1 | 3/2006 | Gerakoulis |
| 7,010,015 B2 | 3/2006 | Hervey |
| 7,010,048 B1 | 3/2006 | Shattil |
| 7,020,110 B2 | 3/2006 | Walton et al. |
| 7,031,309 B1 | 4/2006 | Sautter et al. |
| 7,031,371 B1 | 4/2006 | Lakkis |
| 7,035,661 B1 | 4/2006 | Yun |
| 7,057,555 B2 | 6/2006 | Lewis |
| 7,075,999 B2 | 7/2006 | Redfern |
| 7,076,168 B1 | 7/2006 | Shattil |
| 7,082,153 B2 | 7/2006 | Balachandran et al. |
| 7,099,268 B2 | 8/2006 | Ichihara et al. |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,474 B1 | 1/2007 | Gerakoulis |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,263,133 B1 | 8/2007 | Miao |
| 7,283,799 B2 | 10/2007 | Shattil |
| 7,286,604 B2 | 10/2007 | Shattil |
| 7,295,509 B2 | 11/2007 | Laroia et al. |
| 7,317,750 B2 | 1/2008 | Shattil |
| 7,366,117 B2 | 4/2008 | Kim et al. |
| 7,376,074 B2 | 5/2008 | Jung et al. |
| 7,391,804 B2 | 6/2008 | Shattil |
| 7,406,261 B2 | 7/2008 | Shattil |
| 7,418,043 B2 | 8/2008 | Shattil |
| 7,426,196 B2 | 9/2008 | Gopalakrishnan et al. |
| 7,430,257 B1 | 9/2008 | Shattil |
| 7,469,013 B1 | 12/2008 | Bolt et al. |
| 7,508,798 B2 | 3/2009 | Tong et al. |
| 7,570,956 B2 | 8/2009 | Bigham et al. |
| 7,594,010 B2 | 9/2009 | Dohler et al. |
| 7,606,137 B2 | 10/2009 | Shattil |
| 7,764,594 B2 | 7/2010 | Walton et al. |
| 7,787,514 B2 | 8/2010 | Shattil |
| 7,801,247 B2 | 9/2010 | Onggosanusi et al. |
| 7,876,729 B1 | 1/2011 | Grilli et al. |
| 7,907,588 B2 | 3/2011 | Schaepperle et al. |
| 8,031,583 B2 | 10/2011 | Classon et al. |
| 8,102,907 B2 | 1/2012 | Kim |
| 8,107,965 B2 | 1/2012 | Hui et al. |
| 8,301,139 B2 | 10/2012 | Lotze et al. |
| 8,320,301 B2 | 11/2012 | Walton et al. |
| 8,345,693 B1 | 1/2013 | Kim |
| 8,363,739 B2 | 1/2013 | Ma et al. |
| 8,391,913 B2 | 3/2013 | Zimmer et al. |
| 8,396,153 B1 | 3/2013 | Shen et al. |
| 8,416,837 B2 | 4/2013 | Wu et al. |
| 8,472,335 B2 | 6/2013 | De Pasquale et al. |
| 8,498,647 B2 | 7/2013 | Gorokhov et al. |
| 8,526,400 B2 | 9/2013 | Tong et al. |
| 8,670,390 B2 | 3/2014 | Shattil |
| 8,724,721 B2 | 5/2014 | Soler Garrido |
| 8,780,830 B2 | 7/2014 | Doppler et al. |
| 8,885,628 B2 | 10/2014 | Palanki et al. |
| 8,929,550 B2 | 1/2015 | Shattil |
| 8,942,082 B2 | 1/2015 | Shattil |
| 8,976,838 B2 | 3/2015 | Jaeckel et al. |
| 9,025,684 B2 | 5/2015 | Jeong et al. |
| 9,026,790 B2 | 5/2015 | Bolton et al. |
| 9,042,468 B2 | 5/2015 | Barbu et al. |
| 9,130,810 B2 | 9/2015 | Laroia et al. |
| 9,225,471 B2 | 12/2015 | Shattil |
| 9,485,063 B2 | 11/2016 | Shattil |
| 9,628,231 B2 | 4/2017 | Shattil |
| 9,693,339 B2 | 6/2017 | Palanki et al. |
| 9,768,842 B2 | 9/2017 | Shattil |
| 9,798,329 B2 | 10/2017 | Shattil |
| 9,800,448 B1 | 10/2017 | Shattil |
| 9,819,449 B2 | 11/2017 | Shattil |
| 10,211,892 B2 | 2/2019 | Shattil |
| 10,243,773 B1 | 3/2019 | Shattil |
| 10,554,353 B2 | 2/2020 | Zhao et al. |
| 10,568,143 B2 | 2/2020 | Delfeld et al. |
| 10,602,507 B2 | 3/2020 | Nammi et al. |
| 10,917,167 B2 | 2/2021 | Jia et al. |
| 10,992,998 B2 | 4/2021 | Bergstrom |
| 11,025,377 B2 | 6/2021 | Rakib et al. |
| 11,025,471 B2 | 6/2021 | Kuchi |
| 2001/0050926 A1 | 12/2001 | Kumar |
| 2002/0009096 A1 | 1/2002 | Odenwalder |
| 2002/0034191 A1 | 3/2002 | Shattil |
| 2002/0044524 A1 | 4/2002 | Laroia et al. |
| 2002/0051433 A1 | 5/2002 | Affes et al. |
| 2002/0061068 A1 | 5/2002 | Leva et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0168016 A1 | 11/2002 | Wang et al. |
| 2002/0172184 A1 | 11/2002 | Kim et al. |
| 2002/0172213 A1 | 11/2002 | Laroia et al. |
| 2002/0181509 A1 | 12/2002 | Mody et al. |
| 2002/0193146 A1 | 12/2002 | Wallace et al. |
| 2002/0196733 A1 | 12/2002 | Shen et al. |
| 2003/0026222 A1 | 2/2003 | Kotzin |
| 2003/0043732 A1 | 3/2003 | Walton et al. |
| 2003/0072380 A1 | 4/2003 | Huang |
| 2003/0086363 A1 | 5/2003 | Hernandes |
| 2003/0128658 A1 | 7/2003 | Walton et al. |
| 2003/0133469 A1 | 7/2003 | Brockmann et al. |
| 2003/0147655 A1 | 8/2003 | Shattil |
| 2003/0154262 A1 | 8/2003 | Kaiser et al. |
| 2003/0169824 A1 | 9/2003 | Chayat |

(56) References Cited

U.S. PATENT DOCUMENTS

| | | |
|---|---|---|
| 2003/0206527 A1 | 11/2003 | Yim |
| 2003/0218973 A1 | 11/2003 | Oprea et al. |
| 2004/0013101 A1 | 1/2004 | Akin et al. |
| 2004/0017824 A1 | 1/2004 | Koenck |
| 2004/0047405 A1 | 3/2004 | Boesel et al. |
| 2004/0057501 A1 | 3/2004 | Balachandran et al. |
| 2004/0086027 A1 | 5/2004 | Shattil |
| 2004/0100897 A1 | 5/2004 | Shattil |
| 2004/0141548 A1 | 7/2004 | Shattil |
| 2004/0151109 A1 | 8/2004 | Batra et al. |
| 2004/0223476 A1 | 11/2004 | Jose et al. |
| 2004/0243258 A1 | 12/2004 | Shattil |
| 2005/0058098 A1 | 3/2005 | Klein et al. |
| 2005/0075081 A1 | 4/2005 | Catreux-Erceg et al. |
| 2005/0078742 A1 | 4/2005 | Cairns et al. |
| 2005/0179607 A1 | 8/2005 | Gorsuch et al. |
| 2005/0198199 A1 | 9/2005 | Dowling |
| 2005/0255808 A1 | 11/2005 | Ahmed et al. |
| 2005/0259627 A1 | 11/2005 | Song et al. |
| 2005/0265275 A1 | 12/2005 | Howard et al. |
| 2005/0265293 A1 | 12/2005 | Ro et al. |
| 2005/0270968 A1* | 12/2005 | Feng .................. H04L 27/2621 370/208 |
| 2005/0286476 A1 | 12/2005 | Crosswy et al. |
| 2006/0023803 A1 | 2/2006 | Perlman et al. |
| 2006/0034378 A1 | 2/2006 | Lindskog et al. |
| 2006/0057958 A1 | 3/2006 | Ngo et al. |
| 2006/0106600 A1 | 5/2006 | Bessette |
| 2006/0153283 A1 | 7/2006 | Scharf et al. |
| 2006/0245346 A1 | 11/2006 | Bar-Ness et al. |
| 2006/0262870 A1 | 11/2006 | Khan |
| 2007/0041311 A1 | 2/2007 | Baum et al. |
| 2007/0041404 A1 | 2/2007 | Palanki et al. |
| 2007/0071125 A1 | 3/2007 | Tan et al. |
| 2007/0081580 A1 | 4/2007 | Breiling |
| 2007/0078924 A1 | 5/2007 | Hassan et al. |
| 2007/0140102 A1 | 6/2007 | Oh et al. |
| 2007/0160014 A1 | 7/2007 | Larsson |
| 2007/0177681 A1 | 8/2007 | Choi et al. |
| 2007/0183386 A1 | 8/2007 | Muharemovic et al. |
| 2007/0211807 A1 | 9/2007 | Han et al. |
| 2008/0095121 A1 | 4/2008 | Shattil |
| 2008/0151743 A1 | 6/2008 | Tong et al. |
| 2008/0240022 A1 | 10/2008 | Yoon et al. |
| 2008/0298502 A1 | 12/2008 | Xu et al. |
| 2008/0310484 A1 | 12/2008 | Shattil |
| 2009/0092182 A1 | 4/2009 | Shin et al. |
| 2009/0110033 A1 | 4/2009 | Shattil |
| 2009/0147870 A1 | 6/2009 | Lin et al. |
| 2009/0156252 A1 | 6/2009 | Harris |
| 2009/0274103 A1 | 11/2009 | Yang et al. |
| 2009/0304108 A1 | 12/2009 | Kwon et al. |
| 2010/0039928 A1 | 2/2010 | Noh et al. |
| 2010/0041350 A1 | 2/2010 | Zhang et al. |
| 2010/0056200 A1 | 3/2010 | Tolonen |
| 2010/0080112 A1 | 4/2010 | Bertrand et al. |
| 2010/0091919 A1* | 4/2010 | Xu .................. H04L 27/2613 375/346 |
| 2010/0098042 A1 | 4/2010 | Dent |
| 2010/0110875 A1 | 5/2010 | No et al. |
| 2010/0165829 A1 | 7/2010 | Narasimha et al. |
| 2010/0184369 A1 | 7/2010 | Cho et al. |
| 2010/0185541 A1 | 7/2010 | Hassan et al. |
| 2010/0254484 A1 | 10/2010 | Hamaguchi et al. |
| 2010/0254497 A1 | 10/2010 | To et al. |
| 2010/0317343 A1 | 12/2010 | Krishnamurthy et al. |
| 2011/0041021 A1 | 2/2011 | Khoshnevis et al. |
| 2011/0058471 A1 | 3/2011 | Zhang |
| 2011/0096658 A1 | 4/2011 | Yang et al. |
| 2011/0135016 A1 | 6/2011 | Ahn et al. |
| 2011/0206207 A1 | 8/2011 | Priotti |
| 2011/0228878 A1 | 9/2011 | Sorrentino |
| 2011/0281534 A1 | 11/2011 | Liao et al. |
| 2012/0014392 A1 | 1/2012 | Bhushan et al. |
| 2012/0057660 A1 | 3/2012 | Nguyen et al. |
| 2012/0087393 A1 | 4/2012 | Jeong et al. |
| 2012/0113816 A1 | 5/2012 | Bhattad et al. |
| 2012/0188994 A1 | 7/2012 | Palanki et al. |
| 2012/0213054 A1 | 8/2012 | Hamaguchi et al. |
| 2012/0224517 A1 | 9/2012 | Yun et al. |
| 2012/0250740 A1 | 10/2012 | Ling |
| 2012/0252387 A1 | 10/2012 | Haskins et al. |
| 2012/0269285 A1 | 10/2012 | Jeong et al. |
| 2012/0294346 A1 | 11/2012 | Kolze |
| 2013/0058239 A1 | 3/2013 | Wang et al. |
| 2013/0077508 A1 | 3/2013 | Axmon et al. |
| 2013/0142275 A1 | 6/2013 | Baik et al. |
| 2013/0315211 A1 | 11/2013 | Balan et al. |
| 2014/0064392 A1 | 3/2014 | Jonsson et al. |
| 2014/0086186 A1 | 3/2014 | Hamaguchi et al. |
| 2014/0198863 A1 | 7/2014 | Terry |
| 2014/0348253 A1 | 11/2014 | Mobasher et al. |
| 2015/0009971 A1 | 1/2015 | Han et al. |
| 2015/0103723 A1 | 4/2015 | Kim et al. |
| 2015/0195840 A1 | 7/2015 | Ahn et al. |
| 2015/0271000 A1 | 9/2015 | Yang et al. |
| 2015/0304153 A1 | 10/2015 | Moffatt et al. |
| 2015/0358190 A1 | 12/2015 | Kruglick et al. |
| 2016/0006594 A1 | 1/2016 | Persson et al. |
| 2016/0050096 A1 | 2/2016 | DelMarco |
| 2016/0050099 A1 | 2/2016 | Siohan et al. |
| 2016/0197756 A1 | 7/2016 | Mestdagh et al. |
| 2016/0254889 A1 | 9/2016 | Shattil |
| 2016/0269083 A1 | 9/2016 | Porat et al. |
| 2016/0344497 A1 | 11/2016 | Myung et al. |
| 2016/0353446 A1 | 12/2016 | Abdoli et al. |
| 2017/0019284 A1 | 1/2017 | Ankarali et al. |
| 2017/0026218 A1 | 1/2017 | Shattil |
| 2017/0054480 A1 | 2/2017 | Shattil |
| 2017/0126454 A1 | 5/2017 | Huan et al. |
| 2017/0126458 A1 | 5/2017 | Shattil |
| 2017/0134202 A1 | 5/2017 | Baligh et al. |
| 2017/0134235 A1 | 5/2017 | Wu et al. |
| 2017/0250848 A1 | 8/2017 | Lee et al. |
| 2017/0264474 A1 | 9/2017 | He et al. |
| 2017/0279648 A1 | 9/2017 | Song et al. |
| 2017/0295000 A1 | 10/2017 | Yoo et al. |
| 2017/0353340 A1 | 12/2017 | Raphaeli et al. |
| 2018/0062904 A1 | 3/2018 | Hwang et al. |
| 2018/0091338 A1 | 3/2018 | Mayer et al. |
| 2018/0092086 A1 | 3/2018 | Nammi et al. |
| 2018/0109408 A1 | 4/2018 | Sandell et al. |
| 2018/0167244 A1 | 6/2018 | Cheng et al. |
| 2018/0191543 A1 | 7/2018 | Park et al. |
| 2018/0212810 A1 | 7/2018 | Park et al. |
| 2018/0288809 A1 | 10/2018 | Delfeld et al. |
| 2019/0036657 A1 | 1/2019 | Zhao et al. |

FOREIGN PATENT DOCUMENTS

| | | |
|---|---|---|
| JP | H08331093 | 12/1996 |
| JP | 2012-100323 | 5/2012 |
| KR | 10-2010-0019974 | 2/2010 |
| WO | WO/2001/054303 | 7/2001 |
| WO | WO/2001/054303 | 4/2002 |
| WO | 0237771 | 5/2002 |

OTHER PUBLICATIONS

E. Hajlaoui, M. Abdellaoui; "SOCP Approach for Reducing PAPR for MIMO-OFDM Via Tone Reservation" International Journal of Distributed and Parallel Systems (IJDPS) vol. 2, No. 3, May 2011.

J. Shin, B. Seo; "PAPR Reduction Scheme for MISO and MIMO OFDM Systems with Limited Feedback"; WSEAS Transactions on Communications 13:355-362—Jan. 2014.

D. Sinanovic, et al.; "Low PAPR Spatial Modulation for SC-FDMA"; IEEE Transactions on Vehicular Technology; vol. 66, Issue: 1, Jan. 2017.

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.

(56) References Cited

OTHER PUBLICATIONS

M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.
M. Vu, A. Paulraj; "MIMO Wireless Linear Precoding"; IEEE Signal Processing Magazine. Submitted Feb. 2006, revised Nov. 2006 and Dec. 2006.
H.G. Myung, et al.; "Peak Power Characteristics of Single Carrier FDMA MIMO Precoding System"; 2007 IEEE 66th Vehicular Technology Conference, Sep. 30-Oct. 3, 2007.
B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.
A.S. Parihar, A. Rai; "A Review: PAPR Reduction Techniques in MIMO OFDM System"; International Journal of Engineering and Innovative Technology (IJEIT); vol. 4, Issue 12, Jun. 2015.
B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).
C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.
K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.
K. Srinivasarao, et al.; "Peak-To-Average Power Reduction in MIMO-OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L. Goeckel; "Peak Power Reduction in Closed-Loop MIMO-OFDM Systems via Mode Reservation" IEEE Communications Letters, vol. 11, No. 7, Jul. 2007.
C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.
H-B Jeon, et al.; "Bit-Based SLM Schemes for PAPR Reduction in QAM Modulated OFDM Signals"; IEEE Transactions on Broadcasting, vol. 55, No. 3, Sep. 2009.
H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M.I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peak average power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM PEAKTO—Average Power Reduction Without Side Information"; Proceeding of the SDR 04 Technical Conference and Product Exposition 2004, Syracuse, NY, Technology Center—Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.

D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.
B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.
C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.
C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.
B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.
Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.
S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.
B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.
Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.
B. Natarajan, C.R. Nassar, S. Shattil; "Innovative pulse shaping for high-performance wireless TDMA," Communications Letters, IEEE vol. 5, Issue 9, Sep. 2001 pp. 372-374.
B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.
V.Thippavajjula, B.Natarajan; "Parallel Interference Cancellation Techniques for Synchronous Carrier Interferometry/MC-CDMA Uplink"; IEEE 60th Vehicular Technology Conference, 2004. VTC2004-Fall. Sep. 26-29, 2004.
A. Serener, et al.; "Performance of Spread OFDM with LDPC Coding in Outdoor Environments"; 2003 IEEE 58th Vehicular Technology Conference. VTC 2003-Fall (IEEE Cat. No.03CH37484), Oct. 6-9, 2003.
LTE: Evolved Universal Terrestrial Radio Access (E-UTRA); Multiplexing and channel coding (3GPP TS 36.212 version 8.8.0 Release 8), Jan. 2010.
LTE: Evolved Universal Terrestrial Radio Access (E-UTRA); Physical channels and modulation (3GPP TS 36.211 version 8.7.0 Release 8), Jun. 2009.
B.Natarajan, C.R. Nassar and S.Shattil; "CI/FSK: Bandwidth-Efficient Multicarrier FSK for High Performance, High Throughput, and Enhanced Applicability"; IEEE Transactions on Communications, vol. 52, No. 3, Mar. 2004.
G. Wunder, K.G. Paterson; "Crest-Factor Analysis of Carrier Interferometry MC-CDMA and OFDM systems" International Symposium onInformation Theory, 2004. ISIT 2004. Proceedings Jun. 27-Jul. 2, 2004.
B.Natarajan, C.R. Nassar "Crest Factor Reduction in MC-CDMA Employing Carrier Interferometry Codes"; EURSAP Journal on Wireless Comm. and Networking 2004:2, 374-379.
A.J. Best, B.Natarajan; "The Effect of Jamming on the Performance of Carrier Interferometry/OFDM"; WiMob'2005), IEEE International Conference on Wireless and Mobile Computing, Networking and Communications, 2005. Aug. 24-22, 2005.

(56) References Cited

OTHER PUBLICATIONS

S. Hijazi, et al.; "Enabling FCC's Proposed Spectral Policy via Carrier Interferometry"; 2004 IEEE Wireless Communications and Networking Conference (IEEE Cat. No.04TH8733). Mar. 21-25, 2004.

Z. Wu, et al.; "FD-MC-CDMA: A Frequency-based Multiple Access Architecture for High Performance Wireless Communication"; Proceedings RAWCON 2001. 2001 IEEE Radio and Wireless Conference (Cat.No.01EX514). Aug. 19-22, 2001.

P. Barbosa, et al.; "High-Performance MIMO-OFDM via Carrier Interferometry"; GLOBECOM '03. IEEE Global Telecommunications Conference (IEEE Cat. No.03CH37489). Dec. 1-5, 2003.

D.A. Wiegandt, C.R. Nassar; "High-Throughput, High-Performance OFDM via Pseudo-Orthogonal Carrier Interferometry"; 12th IEEE International Symposium on Personal, Indoor and Mobile Radio Communications. PIMRC 2001. Proceedings (Cat. No.01TH8598) Oct. 3-Sep. 30, 2001.

D.A. Wiegandt, C.R. Nassar; "High-Throughput, High-Performance OFDM via Pseudo-Orthogonal Carrier Interferometry Type 2"; The 5th International Symposium on Wireless Personal Multimedia Communications. Oct. 27-30, 2002.

D.A. Wiegandt, C.R. Nassar; "High-Throughput, High-Performance OFDM via Pseudo-Orthogonal Carrier Interferometry Spreading Codes"; IEEE Transactions On Communications, vol. 51, No. 7, pp. 1123-1134. Jul. 2003.

D.A. Wiegandt, C.R. Nassar; "Higher-Speed, Higher-Performance 802.11a Wireless LAN via Carrier-Interferometry Orthogonal Frequency Division Multiplexing"; 2002 IEEE International Conference on Communications. Conference Proceedings. ICC 2002 (Cat. No.02CH37333). Apr. 28-May 2, 2002.

Z. Wu, et al.; "High-Performance 64-QAM OFDM via Carrier Interferometry Spreading Codes"; 2003 IEEE 58th Vehicular Technology Conference. VTC 2003-Fall (IEEE Cat. No.03CH37484). Oct. 6-9, 2003.

B.Natarajan, C.R. Nassar and S.Shattil; "High-Throughput High-Performance TDMA Through Pseudo-Orthogonal Carrier Interferometry Pulse Shaping"; IEEE Transactions on Wireless Communications, vol. 3, No. 3, May 2004.

B.Natarajan, C.R. Nassar; "Introducing Novel FDD and FDM in MC-CDMA to Enhance Performance"; RAWCON 2000. 2000 IEEE Radio and Wireless Conference (Cat. No.00EX404). Sep. 13-13, 2000.

B.Natarajan, Z Wu, C.R. Nassar and S.Shattil; "Large Set of CI Spreading Codes for High-Capacity MC-CDMA"; IEEE Transactions on Communications, vol. 52, No. 11, Nov. 2004.

B.Natarajan, C.R. Nassar, Z Wu; "Multi-carrier platform for wireless communications. Part 1: High-performance, high-throughput TDMA and DS-CDMA via multi-carrier implementations"; Wireless Communications and Mobile Computing; Wirel. Commun. Mob. Comput. 2002; 2:357-379 (DOI: 10.1002/wcm.51) Jun. 18, 2002.

S.A. Zekavat, C.R. Nassar and S.Shattil; "Merging Multicarrier CDMA and Oscillating-Beam Smart Antenna Arrays: Exploiting Directionality, Transmit Diversity, and Frequency Diversity"; IEEE Transactions on Communications, vol. 52, No. 1, pp. 110-119, Jan. 2004.

C.R. Nassar, B.Natarajan, Z. Wu, D. Wiegandt, and S.Shattil; Multi-Carrier Technologies for Wireless Communication; Kluwer Academic Publishers 2002.

B.Natarajan, C.R. Nassar, S. Shattil; "Novel Multi-Carrier Implementation of FSK for Bandwidth Efficient, High Performance Wireless Systems"; 2002 IEEE International Conference on Communications. Conference Proceedings. ICC 2002 (Cat. No.02CH37333) Apr. 28-May 2, 2002.

D.A. Wiegandt, C.R. Nassar, Z. Wu; "Overcoming Peak-to-Average Power Ratio Issues in OFDM via Carrier-Interferometry Codes"; IEEE 54th Vehicular Technology Conference. VTC Fall 2001. Proceedings (Cat. No. 01CH37211), Oct. 7-11, 2001.

D.A. Wiegandt, C.R. Nassar; "Peak-to-Average Power Reduction in High-Performance, High-Throughput OFDM via Pseudo-Orthogonal Carrier-Interferometry Coding"; PACRIM. 2001 IEEE Pacific Rim Conference on, vol. 2, Feb. 2001.

X. Lin, et al.; "5G New Radio: Unveiling the Essentials of the Next Generation Wireless Access Technology"; IEEE Communications Standards Magazine (vol. 3 , Issue: 3 , Sep. 2019 ) pp. 30-37. Dec. 6, 2019.

"D2.2 Architecture, system and interface definitions of a 5G for Remote Area network"; Project website: http://5g-range.eu; Version 1 date Apr. 26, 2018.

R. Rani, et al.; "Peak-to-Average Power Ratio Analysis of SCFDMA Signal by Hybrid Technique"; International Journal of Computer Applications (0975-8887) vol. 69—No. 15, May 2013.

H. Kim, et al.; "Multiple Access for 5G New Radio: Categorization, Evaluation, and Challenges"; arXiv:1703.09042 [cs.IT], Mar. 27, 2017.

A. Anand, et al.; "Joint Scheduling of URLLC and eMBB Traffic in 5G Wireless Networks"; IEEE INFOCOM 2018—IEEE Conference on Computer Communications; Apr. 16-19, 2018.

M. Bennis, et al.; "Ultra-Reliable and Low-Latency Wireless Communication: Tail, Risk and Scale"; Proceedings of the IEEE ( vol. 106 , Issue: 10 , Oct. 2018 ).

B.G. Agee; "Efficient Allocation of RF Transceiver Resources in Spatially Adaptable Communication Networks"; SDR Forum/MPRG Workshop on Advanced in Smart Antennas for Software Radios, At Virginia Polytechnic Institute, Blacksburg, VA.

C.A. Azurdia-Meza, et al.; "PAPR reduction in SC-FDMA by pulse shaping using parametric linear combination pulses"; IEEE Communications Letters, vol. 16, No. 12, Dec. 2012.

C.A. Azurdia-Meza, et al.; "PAPR Reduction in Single Carrier FDMA Uplink by Pulse Shaping Using a $\beta$-$\alpha$ Filter"; Wireless Pers Commun 71, 23-44 (2013). https://doi.org/10.1007/s11277-012-0794-0; Aug. 9, 2012.

A Hamed, et al.; "Bandwidth and Power efficiency analysis of fading communication link"; 2016 International Symposium on Performance Evaluation of Computer and Telecommunication Systems (SPECTS); Jul. 24-27, 2016.

Y. Akhtman, L Hanzo; "Power Versus Bandwidth Efficiency in Wireless Communications: from Economic Sustainability to Green Radio"; China Communications 7(2)—Apr. 2010.

L. Militano, et al.; "Device-to-Device Communications for 5G Internet of Things"; EAI Endorsed Transactions on Internet of Things; Ghent vol. 1, Iss. 1, (Oct. 2015).

M. Vergara, et al.; "Multicarrier Chip Pulse Shape Design With Low PAPR"; 21st European Signal Processing Conference (EUSIPCO 2013); Sep. 9-13, 2013.

C. Liu, et al.; "Experimental demonstration of high spectral efficient 4×4 MIMO SCMA-OFDM/OQAM radio over multi-core fiber system"; Optics Express 18431, vol. 25, No. 15 | Jul. 24, 2017.

F. Wei, et al.; "Message-Passing Receiver Design for Joint Channel Estimation and Data Decoding in Uplink Grant-Free SCMA Systems"; IEEE Transactions on Communications, vol. 18 , Issue: 1 , Jan. 2019: Nov. 6, 2018.

H. Jiang, et al.; "Distributed Layered Grant-Free Non-Orthogonal Multiple Access for Massive MTC"; 2018 IEEE 29th Annual International Symposium on Personal, Indoor and Mobile Radio Communications (PIMRC); Sep. 9-12, 2018.

S. Sengar, P.B. Bhattacharya; "Performance Improvement in OFDM System by PAPR Reduction Using Pulse Shaping Technique"; International Journal of Emerging Technology and Advanced Engineering, vol. 2, Issue 12, Dec. 2012.

B.H. Alhassoun; "Peak-To-Average-Power-Ratio (PAPR) Reduction Techniques For Orthogonal-Frequency-Division-Multiplexing (OFDM) Transmission"; Thesis, University of Denver, Jun. 1, 2012.

A. Boonkajay, et al.; "Performance Evaluation of Low-PAPR Transmit Filter for Single-Carrier Transmission"; 2012 18th Asia-Pacific Conference on Communications (APCC); Oct. 15-17, 2012.

D. Das; "Peak to Average Power Ratio Reduction in OFDM Using Pulse Shaping Technique"; Computer Engineering and Applications vol. 5, No. 2, ISSN: 2252-5459 (Online) Jun. 2016.

D. Wulich, et al.; "Peak to Average Power Ratio in Digital Communications"; https://www.academia.edu/6222108/Peak_to_Average_Power_Ratio_in_Digital_Communications 2005.

(56) References Cited

OTHER PUBLICATIONS

S. Singh, et al.; "Analysis of Roll-Off-Factor To Reduce the PAPR in SC-FDMA System"; International Journal of Computational Intelligence Techniques, ISSN: 0976-0466 & E-ISSN: 0976-0474, vol. 3, Issue 2, 2012, pp. 76-78.

M. Mahlouji, T. Mahmoodi; "Analysis of Uplink Scheduling for Haptic Communications"; arXiv:1809.09837 [cs.NI], Sep. 26, 2018.

K. Au, et al.; "Uplink Contention Based SCMA for 5G Radio Access"; 2014 IEEE Globecom Workshops (GC Wkshps), Dec. 8-12, 2014.

S. Shah, A.R. Patel; "LTE—Single Carrier Frequency Division Multiple Access"; Jan. 1, 2010.

S.L. Ariyavisitakul, et al.; "Frequency Domain Equalization for Single-Carrier Broadband Wireless Systems"; IEEE Communications Magazine ( vol. 40 , Issue: 4 , Apr. 2002 ); pp. 58-66, Aug. 7, 2002.

A. Agarwal and P. R. Kumar, "Improved capacity bounds for wireless networks." Wireless Communications and Mobile Computing, vol. 4, pp. 251-261, 2004.

J.F. Cardoso, A. Souloumiac, "Blind Beamforming for non-Gaussian Signals," IEEE—Proceedings—F, vol. 140, No. 6, pp. 362-370, Dec. 1993.

D. Galda; H. Rohling, "A low complexity transmitter structure for OFDM-FDMA uplink systems", IEEE 55th Vehicular Technology Conference. VTC Spring 2002, May 6-9, 2002.

P. Gupta and P. R. Kumar, "The Capacity of Wireless Networks," IEEE Trans. Info. Theory, vol. IT-46, No. 2, Mar. 2000, pp. 388-404.

T. Kailath, Linear Systems, Prentice-Hall, Inc., 1980.

T. May; H. Rohling, "Reducing the peak-to-average power ratio in OFDM radio transmission systems", VTC '98. 48th IEEE Vehicular Technology Conference. May 21-21, 1998.

J.D. Schaffer, "Multiple objective optimization with vector evaluated genetic algorithms," Proceedings of 1st International Conference on Genetic Algorithms, 1991, pp. 93-100.

Z. Wu, C.R. Nassar, "Combined Directionality and Transmit Diversity via Smart Antenna Spatial Sweeping," RAWCON 2000, IEEE Radio and Wireless Conference 2000, pp. 103-106. Sep. 13, 2000.

S.A. Zekavat; C.R. Nassar; S. Shattil, "Combining multi-input single-output systems and multi-carrier systems achieving transmit diversity, frequency diversity and directionality", Vehicular Technology Conference. IEEE 55th Vehicular Technology Conterence. VTC Spring 2002, May 6-9, 2002.

S.A. Zekavat, C. R. Nassar and S. Shattil, "Smart antenna spatial sweeping for combined directionality and transmit diversity," Journal of Communications and Networks (JCN), Special Issue on Adaptive Antennas for Wireless Communications, vol. 2, No. 4, pp. 325-330, Dec. 2000.

E. Zitzler and L. Thiele, "Multiobjective evolutionary algorithms: A comparative case study and the strength pareto approach," IEEE Tran. on Evol. Comput., vol. 3, No. 4, Nov. 1999, pp. 257-271.

D. Gerakoulis and E. Geraniotis, CDMA: Access and Switching for Terrestrial and Satellite Networks, John Wiley & Sons, LTD, 2001.

ITU-T, Asymmetric Digital Subscriber Line (ADSL) Transceivers, G.992.1, Jun. 1999.

C-Y. Hsu, et al.; "Novel SLM Scheme with Low-Complexity for PAPR Reduction in OFDM System", IEICE Trans. Fundamentals, vol. E91-A. No. 7, pp. 1689-1696, Jul. 2008.

N. Jacklin, et al.; "A Linear Programming Based Tone Injection Algorithm for PAPR Reduction of OFDM and Linearly Precoded Systems", IEEE Trans. on Circuits and Systems-I: Regular Papers, vol. 60, No. 7, pp. 1937-1945, Jul. 2013.

* cited by examiner

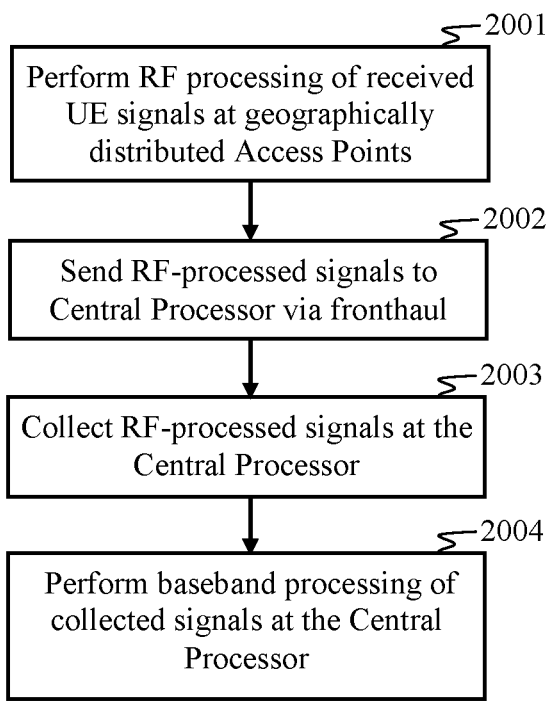
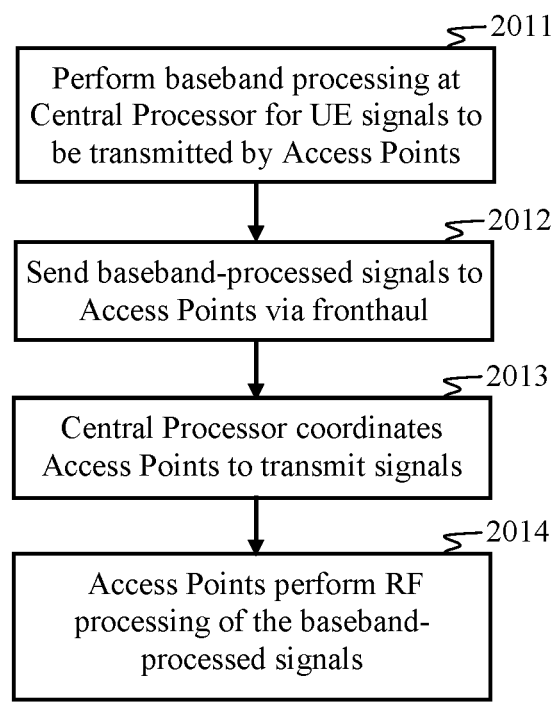
Figure 20A
Figure 20B

COORDINATED MULTIPOINT SYSTEMS

RELATED APPLICATIONS

This application is a Continuation of U.S. patent application Ser. No. 16/575,713, filed on Sep. 19, 2019, now U.S. Pat. No. 10,931,338, which is a Continuation of U.S. patent application Ser. No. 14/733,013, filed Jun. 8, 2015, now U.S. Pat. No. 10,425,135, which is a Continuation-in-Part of U.S. patent application Ser. No. 13/116,984, filed May 26, 2011, now U.S. Pat. No. 10,014,882, which is a Continuation-in-Part of U.S. patent application Ser. No. 12/328,917, filed Dec. 5, 2008, now U.S. Pat. No. 7,965,761, which is a Divisional of U.S. patent application Ser. No. 11/621,014 filed Jan. 8, 2007, now U.S. Pat. No. 7,593,449, all of which are expressly incorporated by reference in their entireties.

BACKGROUND

I. Field

The present invention relates generally to wireless communication networks, and more specifically to cooperative signal processing between wireless transceivers.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Communication over the spatial modes of a point-to-point MIMO channel was developed in the early 90s [e.g., S. J. Shattil, U.S. Pat. No. 6,211,671] then gradually extended to multi-user (MU-) MIMO channels [e.g., S. J. Shattil, U.S. Pat. No. 6,008,760].

In a conventional cellular communication system, transmissions to different users are formed independently. Hence, the transmission to one user can act as interference to other users. Because the system forms the transmission to each user independently, the system has no way of knowing how a transmission to a particular user will impact other users in the vicinity. As a result, interference between cells is a main factor limiting the performance of current cellular systems. For users near a cell boundary, inter-cell interference is especially problematic.

Fading and interference are the two key challenges faced by designers of mobile communication systems. While fading puts limits on the coverage and reliability of any point-to-point wireless connection, e.g., between a base station and a mobile terminal, interference in prior-art networks restricts the reusability of the spectral resource (time, frequency slots, codes, etc.) in space, thus limiting the overall spectral efficiency expressed in bits/sec/Hz/base station.

The conventional approach to interference mitigation is spatial reuse partitioning, which prevents any spectral resource from being re-used within a certain cluster of cells. Typically, the frequency re-use factor is much less than unity such that the level of co-channel interference is low. Thus, interference is controlled by fixing the frequency reuse pattern and the maximum power spectral density levels of each base station. Some CDMA systems allow for full frequency re-use in each cell, but at the expense of severe interference at the cell edge, resulting in a significant data rate drop at the terminals and a strong lack of fairness across cell users. Some interference mitigation can be achieved via limited inter-cell coordination, such as soft handover techniques. Inter-cell interference is typically treated as noise at the receiver side and is handled by resorting to improved point-to-point communications between the base station and the mobile station using efficient coding and/or single-link multiple-antenna techniques.

Some of the proposals for increasing the capacity of cellular networks include using more spectrum, increasing the number of transmit/receive antennas on each station, using dedicated beams to serve users, and micro-cell deployment. However, none of these approaches adequately address inter-cell interference, which is a primary bottleneck for spectral efficiency.

In the traditional cellular architecture, each base station only connects to a fixed number of sector antennas that cover a small area and only provide transmission/reception in its coverage area. Ideally, in such networks, the coverage areas of different base stations do not substantially overlap, as the system capacity is limited by interference. In these networks, interference makes it difficult to improve spectrum efficiency and network capacity. Another drawback to traditional cellular systems is that the base stations are built on proprietary platforms as a vertical solution.

Operators of prior-art cellular systems are faced with many challenges. For example, the high complexity of traditional base stations requires costly initial investment, site support, site rental, and management support. Building more base station sites imposes substantial infrastructure and operational expenses on the network operator. Furthermore, since the base stations can't share processing power with each other, network energy efficiency, processing efficiency, and infrastructure utilization efficiency are low because the average network load is typically far lower than the peak load. Specifically, each base station's processing capability can only benefit the active users in its cell. Thus, a base station's processing capability is wasted when the network load within its cell is low, while at other times it may be oversubscribed. Also, an idle or lightly loaded base station consumes almost as much power as it does under peak loads.

These and other drawbacks of the prior art can be reduced or eliminated by exemplary aspects of the disclosure.

As explained above, prior-art broadband wireless technologies are band-limited or interference-limited, meaning that their spectral efficiency reaches an upper limit set by the laws of Physics, such as indicated by the Shannon formulas. While the spatial domain adds another dimension to exploit via cell planning and sectoring, increasing the cell density (e.g., micro-cells, pico-cells, femto-cells) beyond a certain point fails to mitigate the performance decline as more users demand services. This is because smaller cells result in increased inter-cell interference, which establishes a practical upper bound for cell density. While the spectral efficiency of prior-art technologies is limited by the laws of Physics, the demand for data bandwidth keeps growing. As a result, today's cellular networks are already experiencing declining data rates per user.

Thus, there is a compelling need in the broadband wireless industry for systems and methods of wireless communications in which network performance is not hard-limited by the laws of Physics, but rather increases according to advances in computer processing technologies, such as indicated by Moore's law. Only systems and methods such as disclosed herein can meet the growing demands for broadband wireless data services.

SUMMARY

Aspects of the disclosure describe cooperative-MIMO processing which comprise MIMO processing wherein the multiple input (MI) comprises downlink transmissions from multiple base transceiver stations and the multiple output (MO) comprises uplink transmissions to multiple base transceiver stations. Aspects of the disclosure also indicate that cooperative-MIMO processing can employ user equipment (UEs). In accordance with some aspects, combinations of base transceiver stations and UEs are configured for cooperative-MIMO processing.

In accordance with the deficiencies of the prior art, some aspects of the disclosure can eliminate problems due to inter-cell interference near cell boundaries by simply eliminating the cell boundaries. For example, unlike soft hand-off in which two base stations merely employ the same radio channel to serve a handset at a cell boundary, geographically distributed base stations can be coordinated to function together as a distributed antenna system with overlapping coverage areas and configured to perform subspace antenna array processing. Since subspace antenna array transmissions can produce constructive and destructive interference zones (i.e., amplified-signal and cancelled-signal zones) in a rich scattering environment, provisioning of radio resources in accordance with networks and methods disclosed herein can benefit from types of spatial reuse that far outperform cellular-based (e.g., honeycomb) spatial reuse schemes that rely on signal attenuation via path loss.

Whereas prior-art cellular systems strive to reduce inter-cell and intra-cell interference, aspects of the disclosure exploit interference to achieve substantial performance gains. Some exemplary aspects dramatically improve system performance, including throughput, coverage, signal quality, and spectral efficiency, by exploiting inter-cell (and/or intra-cell) interference. Furthermore, since capacity in a downlink multi-user MIMO system depends on the number of transmitting antennas, coordinating multiple geographically distributed base transceiver stations to cooperatively perform multi-user MIMO processing can effectively increase the number of transmitting antennas, and thus, downlink system capacity (which can translate into a combination of serving more users, increasing data rates per user, and improving quality metrics of the communication links). Some aspects of the disclosure produce similar benefits for uplink performance in a multi-user MIMO system.

In some aspects, radio transceivers operating in networks disclosed herein can perform either or both client and server operations. By way of example, a UE may be configured to operate as a base transceiver antenna in a Cooperative-MIMO configuration with one or more base transceiver systems, thereby increasing the rank of the channel matrix, which enables more subspace channels to be employed in the uplink and/or downlink. The UE may be coordinated with the one or more base transceiver systems via a fronthaul network, including the radio access network (e.g., the WWAN). By way of example, a base transceiver system may be configured to operate as a UE in a local group of UEs organized in a Cooperative-MIMO configuration. The base transceiver can be configured to communicate with the local group via a local area network (e.g., a UE fronthaul network used to coordinate the group of UEs) in order to increase the rank of the channel matrix employed for uplink and/or downlink subspace processing.

Aspects of the disclosure may be provided for achieving a large number of objectives and applications which are too numerous to list herein. Therefore, only some of the objects and advantages of exemplary aspects are discussed in the Summary and in the Detailed Description. In some aspects of the disclosure, interference is dealt with using cooperative MIMO so as to increase the number of co-channel links that can coexist with acceptable quality of service. For example, in the high-SNR regime, this figure of merit corresponds to the maximum number of concurrent interference-free transmissions, which is referred to as the multiplexing gain of the network, or the number of degrees of freedom in the information-theoretic terminology.

Some aspects of the disclosure provide various types of interference-aware multi-cell coordination. For example, in some aspects, base stations no longer tune separately their physical and link/MAC layer parameters (power level, time slot, subcarrier usage, beamforming coefficients, etc.) or decode independently of one another, but instead coordinate their coding and/or decoding operations on the basis of global channel state and user data information exchanged over fronthaul (e.g., backhaul) links among multiple cells. Coordination protocols can exploit existing fronthaul links (e.g., WiMax, 4G LTE, optical fiber) or may require a design upgrade to accommodate additional overhead. There are various degrees of cooperation, offering a trade-off between performance gains and the amount of overhead placed on fronthaul and/or other channels, including over-the-air feedback channels.

In some aspects of the disclosure, such as disclosed in the '850 application, certain network control functions are performed in a cooperative fashion by a central processing unit for a set of cooperating base transceiver stations. The central processing unit can be incorporated in one of the cooperating base transceiver stations, which can be connected with any of the other cooperating base transceiver stations via a low-latency, high-capacity fronthaul network. Various network control functions can be performed by the central processing unit, including resource allocation (e.g., scheduling) and power control.

In some aspects of the disclosure, antenna array processing performed by the central processing unit can mitigate inter-cell interference caused by simultaneous transmissions scheduled on the same frequency resource by nearby base transceiver stations. In one aspect, the central processing unit coordinates beamforming (e.g., calculates array-processing weights from channel measurements and coordinates transmissions of the base transceiver stations) such that one base transceiver station provides for coherent combining of its transmissions at a target UE while at least one other base transceiver station produces transmissions that destructively combine at the target UE. In another aspect, the central processing unit is configured to perform joint processing of subspace signals for coordinated multi-point transmissions, wherein multiple base transceiver stations serve a target UE with subspace-coded transmissions. For example, multiple base transceiver stations can be provided with subspace pre-coding weights calculated from channel measurements, and their transmissions can be coordinated such that the set of base transceiver stations functions jointly as an array of transmitters that produces multiple non-interfering subspace channels. Specifically, first portions of subspace-coded transmissions from antennas on multiple ones of the base transceiver stations combine coherently at the target UE to produce at least a first data stream, whereas at least second portions of the subspace-coded transmissions from different ones of the base transceiver stations combine destructively at the target UE to cancel at least a second data stream, wherein the at least second data stream is intended for at least one other UE.

Subspace processing in the disclosed aspects can include various techniques, including, but not limited to, maximum ratio combining (MRC), zero-forcing (ZF), and minimum mean square error (MMSE) techniques.

In one aspect of the disclosure, a network of M connected J-antenna base stations can serve a total of MJ terminals in an interference-free manner simultaneously, regardless of how strong the interference is. To achieve this remarkable result, multi-user spatial pre-coding and decoding can be employed on the downlink and uplink, respectively.

In accordance with some aspects of the disclosure, a cloud radio access network (C-RAN) comprises multiple geographically distributed base transceiver stations, a high-bandwidth low-latency optical transport network (e.g., a fronthaul network), and a central processor. The base transceiver stations are connected to the central processor via the fronthaul network. Furthermore, the central processor may comprise distributed computing resources. For example, the central processor may comprise (or be communicatively coupled to) high-performance programmable processors and real-time virtualization technology. Some aspects employ a software defined radio (SDR) platform.

In one aspect of the disclosure, a C-RAN system comprises base transceiver stations that operate solely as radio units (e.g., remote radio heads), while the RAN baseband processing is performed at a central processor within the operator's network. Fronthaul links, such as fiber optic links or wireless links, connect each base transceiver station to the central processor. The centralization of both uplink and downlink baseband processing at the central processor enables many benefits, including allowing the central processor to perform cancellation of the downlink-uplink interference, since the downlink signal is known at the central processor.

Centralized signal processing disclosed herein greatly reduces the amount of base transceiver equipment needed to cover the same area. Cooperative processing, such as Cooperative-MIMO in a distributed antenna system, provides higher spectrum efficiency. Real-time cloud infrastructure (which can be based on an open platform and utilize base station virtualization) enables processing aggregation and dynamic resource allocation, reducing the power consumption and increasing the infrastructure utilization rate. This network architecture is advantageous for LTE-Advanced, which requires tight coordination between neighboring cells, as such coordination is facilitated at the central processor where RAN baseband functions of the base transceiver stations are pooled.

In another aspect of the disclosure, methods for providing C-RAN communications comprise performing RAN baseband processing at a central processor, while a distributed antenna system comprising a network of geographically distributed base transceiver stations acts solely as down-converters in the uplink and up-converters in the downlink. The fronthaul links carry baseband information. In one aspect, in the uplink, UE signals received by the base transceiver stations are forwarded to the central processor, which performs joint decoding. In another aspect, in the downlink, the central processor performs pre-coding and then communicates the resulting baseband signals via the fronthaul links to the base transceiver stations. Each base transceiver station simply up-converts the baseband signal and transmits it to the UEs.

With centralized processing of the C-RAN architecture, power consumption due to air conditioning and other equipment at the base transceiver sites can be reduced. In many aspects, the distance from the base transceiver stations to the UEs can be decreased, since Cooperative-MIMO processing can mitigate the effects of interference between base transceiver stations, allowing for a much higher density of base transceiver stations. With smaller cells, the power required for signal transmission is reduced, which can decrease power consumption in both the RAN and the UEs. Furthermore, because baseband processing is implemented via a shared resource among a large number of base transceiver stations, more efficient utilization of processing resources and lower power consumption can be achieved.

In aspects of the disclosure, the base station baseband processors and site support equipment are aggregated in a centralized location. This centralized management and operation can be far more efficient than managing a large number of base station sites in a traditional RAN network. If each base transceiver station's functionality is simpler, the size, cost, and power consumption can be reduced. Thus, base transceiver stations can be smaller, less expensive, and easier to deploy with minimum site support and management requirements. Centralized operation also facilitates sharing of the control signaling, traffic data, and channel state information in the system, which can enable joint processing and scheduling to mitigate inter-cell interference and improve spectral efficiency.

In some aspects of the disclosure relating to non-transitory computer-readable medium with instructions stored thereon, the term "virtual" is used. While virtualization typically refers to the abstraction of computer resources in which the physical characteristics of a computing platform are hidden from users and/or applications, the term, virtual, can also relate to an abstraction of a network configuration wherein signal-processing functions do not require certain details of a distributed antenna system. In some aspects, portions of methods and systems that provide for channel characterization and calculating antenna array weights for subspace multiplexing and/or demultiplexing do not require certain information about the distributed antenna system. For example, some of the signal-processing functions can be independent of whether the system comprises a conventional antenna array or a plurality of separate RAN transceivers communicatively coupled together via a fronthaul network. Some signal-processing functions can be independent of whether they are performed at a base transceiver station or at a central processor to which the base transceiver station is communicatively coupled. This enables MIMO and other baseband processing to be performed at the central processor.

In some aspects of the disclosure, central processing comprises distributed computing. Thus, a network operator can dynamically allocate processing resources within a centralized baseband pool to different virtualized base stations and different air interface standards. This allows the operator to efficiently support a variety of air interfaces and adjust to varying network loads across different geographical areas. Within a centralized baseband pool, physical layer processing resources can be efficiently managed and allocated via real time virtualization. Thus, a base station instance can be adapted through the flexible resource combination, which can adjust, allocate, and re-allocate resources based on each virtualized base station's requirements in order to meet its demands. This provides Cooperative-MIMO operations with the required processing resources dynamically. Furthermore, centralizing the hardware platform can provide cost effectiveness for managing, upgrading, and expanding the base station network.

In accordance with some aspects of the disclosure, a plurality of transmitting nodes is employed by a source node to build the dimension of the subspace spanned by the coded transmissions. In one aspect, the plurality of transmitting nodes is selected to ensure that a set of pre-coded transmissions is characterized by sufficient rank to allow a destination node to decode received signals. For example, selecting a sufficient number of transmitting nodes and encoding (e.g., pre-coding) original data signals can produce a sufficient number of linearly independent (i.e., algebraically unique) combinations of the original data signals to permit the destination node(s) to resolve the original data signals. The transmitting nodes can be selected based on channel measurements and/or their geographic locations such as to ensure that their transmissions are uncorrelated. Each of the transmitting nodes transmits a subset of a total number (i.e., plurality) of subspace-coded components and a corresponding code matrix, wherein at least one of the transmitting nodes has a rank that is insufficient for decoding the plurality of subspace coded components (e.g., a destination node needs to receive signals from a plurality of the transmitting nodes in order to achieve sufficient rank for decoding the received signals). The corresponding code matrix can take the form of a preamble (or header) that comprises the code matrix. When the codes comprise channel-specific codes based on the naturally random channel, then the codes comprise random codes.

As disclosed in some aspects herein, the transmitting nodes can function as routers, relays, repeaters, etc., configured to encode received signals prior to retransmission or simply pass through received signals prior to retransmission. In some aspects, the transmitting nodes can combine multiple signals to be transmitted. In some aspects, the naturally random channel provides random linear coding to transmissions, such as when transmitting nodes are selected to produce transmissions with uncorrelated multipath effects (e.g., fading).

In accordance with some aspects of the disclosure, a destination node can employ a plurality of receiving nodes to cooperatively receive a plurality of subspace-coded components and their corresponding code vectors, wherein the rank of at least one of the receiving nodes is insufficient for decoding the coded components. Thus, receiving nodes can function as routers, relays, repeaters, etc. The destination node builds up the dimension of the subspace spanned by code vectors it collects from the receiving nodes so it can decode the coded components. For example, the destination node can receive signals from multiple receiving nodes in order to decode the subspace-coded components. The receiving nodes can be selected to provide uncorrelated channels.

As disclosed herein, intervening nodes can function as either or both transmitting nodes and receiving nodes. Whereas in conventional routing, intervening nodes simply replicate and forward their received packets, cooperative network coding (such as disclosed in the '163 application) enables relay nodes to combine information received from multiple links for subsequent transmissions. The '163 application discloses various types of linear network codes, including polyphase codes derived from a discrete Fourier transform and random codes, such as derived from the natural randomness of wireless multipath channels, and combinations thereof.

In some aspects of the disclosure, assigned wireless network channels (such as network channels allocated to a particular frequency band and time interval) are reused. For example, cooperative subspace processing (e.g., Cooperative-MIMO) generates a plurality of parallel subspace channels that can simultaneously occupy the same spectral resource. If OFDM is employed, this means that multiple parallel spatial subchannels can occupy the same set of OFDM subcarriers, or tones. In some aspects, cooperative subspace processing provides for communicatively coupling together multiple geographically distributed transceivers (e.g., base transceiver stations and/or wireless client devices) via a fronthaul network to enable joint processing operations.

In some aspects of the disclosure, a network channel is allocated to a transceiver operating in a first network, wherein the transceiver is part of a group of transceivers comprising a second network. The network channel is reused by the group of transceivers for communicating in the second network in a manner that avoids interfering with the first network. By way of example, the group of transceivers employs spatial multiplexing, such as cooperative subspace processing, to mitigate interference between the first network and the second network.

In one aspect of the disclosure, a transceiver employs a channel allocation for a first communication link in a first group of transceivers comprising a first network. A second group of transceivers that is different from the first group but comprises the transceiver reuses the channel allocation for communicating in at least a second communication link. The second group is configured to employ any of various interference-mitigation techniques that permit the reuse of the channel allocation while minimizing co-channel interference with the first network. In some aspects, the second group is configured to employ interference-mitigation techniques that mitigate the effects of co-channel interference in the second link due to transmissions in the first link.

By way of example, if the channel allocation is for a downlink channel, the second group can perform either or both transmit-side and receive-side spatial multiplexing to cancel interference from transmissions in the first link that could interfere with one or more receivers in the second link. If the channel allocation is for an uplink channel, the second group can perform transmit-side spatial multiplexing to cancel interference from transmissions in the second link that could interfere with receivers employing the first link. The second group can perform either or both transmit-side and receive-side spatial multiplexing to cancel interference due to transmissions in the first link that could interfere with one or more receivers employing the second link.

As described throughout the '163 application, aspects disclosed herein can be implemented in a cloud-based SDR platform.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

BRIEF DESCRIPTION OF THE DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIGS. 20A and 20B are flow charts depicting methods wherein geographically distributed access points perform RF processing in a radio access network and a central processor performs corresponding RAN baseband processing. In some aspects the corresponding RAN baseband processing is performed by a distributed computing system.

DETAILED DESCRIPTION

Figure 1:
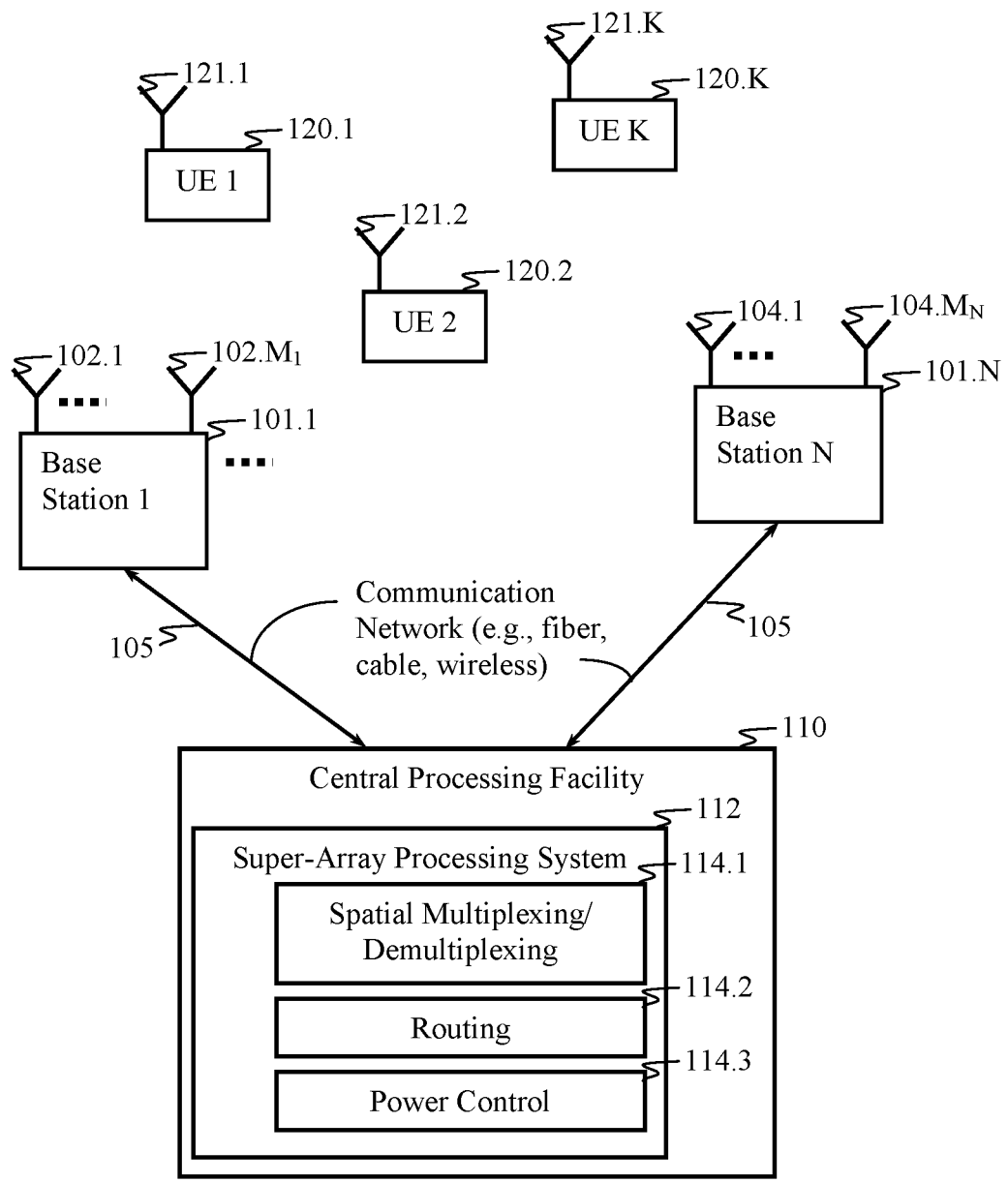
FIG. 1 is a block diagram of a communication system architecture in accordance with an exemplary aspect of the invention.

The terms "backhaul" and "fronthaul" can be used interchangeably in some aspects of the disclosure. A fronthaul is similar to a backhaul, which, at its simplest, links a radio access network to a wired (e.g., cable or optical fiber) network. A fronthaul can comprise a backhaul, or a portion of a backhaul. For example, a fronthaul can comprise a connection between one or more centralized controllers and remote stand-alone radio heads. A fronthaul connects a central processor to multiple base transceiver stations. A fronthaul connects multiple base transceiver stations together when one or more of the base transceiver stations functions as a central processor. As used herein, a fronthaul may comprise a traditional backhaul network. For example, a fronthaul can comprise at least a portion of S1 and/or X2 interfaces. A fronthaul may be part of a base station network. In Pat. Appl. Ser. No. 60/286,850, it is disclosed that a fronthaul can comprise optical fiber, wired, and/or radio networks. In one aspect of the disclosure, point-to-point fiber links provide high bandwidth and low latency. In another aspect, radio (e.g., microwave) links can provide high bandwidth and low latency, and can be substantially less expensive to implement than fiber. Furthermore, wireless links enable mobile radios and/or other radio transceivers (e.g., remote radio equipment) to be networked together via a radio fronthaul, such as disclosed in patent application Ser. No. 10/131,163. Accordingly, a fronthaul can comprise any combination of wireless, wired, and optical fiber links that communicatively couple together a group of radio transceivers configured to perform cooperative MIMO. Here, a group of radio transceivers is also referred to as a "micro-cell" and a "pico-cell" in the '163 application, and as a "local group" and a "micro-network" in patent application Ser. No. 11/187,107, all of the patents and patent applications mentioned herein being incorporated by reference in their entireties.

Pre-coding is defined herein to comprise its ordinary and customer meaning known to those of ordinary skill in the art. By way of example, in the '163 application, pre-coding is described in the context of antenna array transmission systems with the terms, "pre-transmission processing," "pre-distortion," "channel compensation," "transmit filtering," "spatial interferometry multiplexing," and "subspace processing." The '163 application also discloses directive and retro-directive adaptation methods for calculating antenna array weights for transmission in a distributed antenna system. In one example, subspace pre-coding weights are calculated from measurements of received signals, the measurements comprising channel state information.

User Equipment (UE), as used herein, may be fixed or mobile and comprises any device used directly by an end user (or client device) to communicate in a radio access network. For example, a UE can be a cellular handset, a laptop equipped with a mobile broadband adaptor, a wearable computer, a PDA, a tablet, or any other user device configured to communicate with a Wireless Wide Area Network (WWAN). A WWAN is also referred to as a radio access network (RAN). A UE comprises an RF transceiver for fixed and/or mobile clients receiving data streams over the downlink channel of the WWAN and transmitting data via the WWAN's uplink (UL) channel. While a UE is defined in the Universal Mobile Telecommunications System (UMTS) and 3GPP Long Term Evolution (LTE) as any device that connects to a base station NodeB or eNodeB as specified in the ETSI 125/136-series and 3GPP 25/36-series of specifications, UEs include equivalent devices, such as mobile stations in GSM systems and client devices in other wireless networks. As used herein, a UE may also be referred to as a subscriber device, mobile terminal, user terminal, wireless terminal, subscriber terminal, client terminal, subscriber unit, mobile unit, subscriber device, mobile device, wireless device, client device, client terminal, client unit, mobile network device, mobile handset, wireless handset, or some other terminology indicating a WWAN-enabled client device.

In general, the various embodiments of the UE can include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Examples of UEs are provided in 3GPP technical specification (TS) 36.306, Release 8, the disclosure of which is incorporated herein by reference in its entirety.

A Base Transceiver Station interfaces the fronthaul network with the WWAN channel. Base transceiver stations of one embodiment comprise access points consisting of a Digital-to-Analog Converter (DAC)/Analog-to-Digital Converter (ADC) and a radio frequency (RF) chain to convert the baseband signal to RF. A base transceiver station contains radio frequency transmitter(s) and receiver(s) for communicating directly with UEs. In some cases, the base transceiver station is a simple RF transceiver equipped with a power amplifier/antenna, and the RF signal is carried to the base transceiver station via RF-over-fiber technology as disclosed in the '850 and '163 applications. In other aspects, base transceiver stations are equipped to perform at least some RAN baseband processing operations, such as disclosed in the '850 and '163 applications. Additional features and aspects of base transceiver stations are described throughout the disclosure and in the aforementioned patent applications, which are incorporated by reference. As used herein, a base transceiver station may also be referred to as a base station, an access point, a NodeB, an evolved NodeB (eNodeB), or some other terminology. In accordance with some aspects of the disclosure, a base transceiver station is a network node.

A "network node" or "node," as used herein, is an active electronic device that is communicatively connected to a network via one or more connectors and is configured for sending, receiving, and/or forwarding information over a communication channel. A node can have multiple network connectors for a given network. For example, a node can have multiple antennas. A single device, such as a base station or a user terminal, with multiple network connectors is a single node. In a distributed network, nodes can be clients, servers, and/or peers. A peer can sometimes serve as a client and sometimes as a server. Nodes can include super nodes, which route data for other networked devices as well as themselves.

A Central Processor can include one or more servers interfacing the Internet (or other external networks) with the fronthaul. In a hierarchical network architecture, a central processor couples to the base transceiver stations and provides coordination and control for those stations. One or more base transceiver stations may function as a central processor, such as in a flat network architecture. In an LTE network, eNodeB(s) and/or access gateways can be configured to perform central processor functions. In some aspects of the disclosure, network control functions typically performed by a central processor may be assigned to any of various nodes in the network, including UEs.

In some aspects of the disclosure, the central processor computes the multi-user MIMO baseband processing and sends pre-coded data to geographically distributed base transceiver stations for downlink transmission. In some aspects, the central processor computes the multi-user MIMO baseband processing to provide spatial demultiplexing of uplink signals received by the geographically distributed base transceiver stations. In some aspects, the central processor can comprise a particular type of base transceiver station designed for certain specialized features, such as transmitting training signals for time/frequency synchronization of the base transceiver stations and/or the UEs, receiving/transmitting control information from/to the UEs, receiving the channel state information or channel quality information from the UEs, etc. In some aspects, a central processor is also referred to as a central processing facility, a cloud computing center, a cloud, a data center, a data center cloud, a central controller, a radio network controller, or a central control hub. In some aspects, a central processor can comprise multiple data centers.

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. The word "exemplary" is used herein to mean "serving as an example, instance, or illustration." Any embodiment or aspect described herein as "exemplary" is not necessarily to be construed as preferred or advantageous over other embodiments or aspects.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

FIG. 1 is a block diagram of a communication system architecture in accordance with an exemplary aspect of the invention. A plurality N of base stations 101.1-101.N are communicatively coupled to a central processing facility 110 (i.e., a central controller) via a communication network 105. Each base station 101.1-101.N comprises an antenna system for communicating with one or more mobile units (e.g., User Equipment) 120.1-120.K. For example, the first base station 101.1 may comprise a first antenna array comprising a plurality $M_1$ of antennas 102.1-102.$M_1$, and the $N^{th}$ base station 101.N may comprise an $N^{th}$ antenna array comprising a plurality $M_N$ of antennas 104.1-104.$M_N$. A plurality K of mobile units 120.1, 120.2, and 120.K are shown, each having its own antenna system 121.1, 121.2, and 121.K, respectively. Each antenna system 121.1, 121.2, and 121.K may comprise one or more antennas. The communication network 105 that communicatively couples the base stations 101.1-101.N to the central processing facility 110 may comprise a fiber network, a cable (i.e., wired) network, a wireless network, or any combination thereof.

In one aspect of the invention, the signal-processing architecture provides base stations 101.1-101.N that are essentially "dumb terminals." For example, many of the signal processing operations typically performed at a base station 101.1-101.N may be transferred to a central processor (e.g., the central processing facility 110) that is connected to the plurality of base stations 101.1-101.N. In some aspects of the invention, a minimal amount of signal processing is performed at each base station 101.1-101.N. For example, each base station 101.1-101.N can perform basic signal-processing tasks, such as amplification, RF filtering, frequency conversion (e.g., frequency up-conversion and/or frequency down-conversion), and/or other RF signal-processing functions. After basic signal processing, signals received by one or more antennas at each base station 101.1-101.N are coupled into at least one communication channel (e.g., network 105) linked to the central processing facility 110. Functions of the base station 101.1-101.N may be limited to cleaning up the received RF signal, amplifying it, and processing the signal with respect to coupling it into the network 105. Signals from different antennas 102.1-102.M$_1$ and 104.1-104.M$_N$ may be transmitted on different channels (e.g., on different waveguides), or they may be multiplexed onto the same channel (e.g., with respect to wavelength division, time division, frequency division, polarization division, subspace, phase space, code division, mode division, directionality, etc.).

The central processing facility 110 processes each of the received signals from the communication channel(s). For example, the central processor 110 removes the individual signals from one or more communication channels. The removal process can include demultiplexing the signals on the channel(s). In some aspects, the central processor 110 frequency-converts the received signals to baseband, intermediate, or radio-frequency signals prior to processing. Beam-forming can be performed in RF, IF, and/or after conversion to baseband.

Thus, in some aspects of the invention, by relocating most (or all) of the base station processing operations to the central processing facility, the capital expenditures and operating costs of the radio access network can be greatly reduced. This can also facilitate rapid and less costly network upgrades and expansion. In one aspect, all the RF processing of the radio access network signals is performed at the base transceiver stations, whereas baseband processing is performed at the central processing facility. Baseband signals of the radio access network are communicated between the base transceiver stations and the central processing facility via a fronthaul radio network, some other wireless network, waveguide (e.g., cable), an optical fiber network, or a combination thereof. RF processing of the fronthaul network signals (which is different than RF processing of the radio access network signals) may be performed by the base transceiver stations and the central processing facility.

As depicted in FIG. 1, signal-processing operations performed at the central processing facility 110 can include spatial multiplexing and/or spatial demultiplexing 114.1, routing 114.2, and power control 114.3. The central processing facility 110 can be configured to perform super-array processing. In one aspect of the invention, the central processing facility 110 comprises a super array processing system 112. In some aspects of the invention, the super array processing system 112 comprises one or more subsystems or modules, such as a spatial multiplexing/demultiplexing system 114.1, a routing system (e.g., router) 114.2, and a power control system 114.3.

In one aspect of the invention, the super array processing system 112 comprises one or more general-purpose computers programmed to function as a special-purpose computer configured to perform various aspects of the disclosure, such as Cooperative-MIMO processing in a distributed antenna system. In another aspect, the super array processing system 112 comprises one or more special-purpose processors, such as integrated circuits, discrete circuits, and/or other specialized hardware configured to perform Cooperative-MIMO processing. As disclosed herein, a distributed computing system may be employed for implementing aspects of the invention, such as spatial multiplexing, spatial demultiplexing, and/or baseband signal processing operations typically performed by base transceiver stations. Such distributed computing systems may comprise a network of general-purpose computers (programmed to function as a special-purpose computers), such as servers, located in one or more data centers. A distributed computing system may comprise a network of special-purpose processors or a combination of special-purpose processors and general-purpose computers. Similarly, components of system 112, as well as any other components, processors, systems, and devices mentioned in the disclosure, may each comprise one or more general-purpose computers, one or more special-purpose processors, or combinations thereof, and may optionally comprise a distributed computing platform.

In accordance with some aspects of the invention, the centralized architecture simplifies physical-layer system upgrades, since processing equipment used for multiple base stations 101.1-101.N resides at a common location (i.e., the central processing facility 110). Upgrades to improved modulation schemes, new receiver combining techniques, enhanced array-processing, etc. can be provided at the central processing facility 110 instead of at each base station 101.1-101.N. Similarly, adding or upgrading base station antennas (e.g., antennas 102.1-102.M$_1$ and 104.1-104.M$_N$) is simplified since the antennas installed at each base station 101.1-101.N may simply be coupled to the central processing facility 110 via the communication network 105. Adding base stations to the network can be quick and less costly due to the low cost and complexity of each base station 101.1-101.N. Thus, any signal-processing upgrade associated with the base stations 101.1-101.N is performed at the central processor 110.

In aspects of the invention that employ spatial multiplexing/demultiplexing, the system capacity scales linearly with the number of base station antennas (e.g., antennas 102.1-102M$_1$ and 104.1-104.M$_N$) within range of the UEs 120.1-120.K. This is because the spatial multiplexing gain (i.e., the number of independent data streams that can be sent concurrently over MIMO subchannels) is proportional to the number of antennas 102.1-102M$_1$ and 104.1-104.M$_N$ serving the UEs 120.1-120.K.

Unlike conventional MIMO in which all of the transmitting antennas reside on a single device (e.g., a single base station), a cooperative-MIMO transmitting system in accordance with aspects of the disclosure comprises antennas residing on multiple devices (e.g., the base stations 101.1-101.N). The super array processing system 112 coordinates the base stations 101.1-101.N to synthesize an antenna system comprising geographically distributed antennas, which provides superior decorrelation of the transmission paths between transmitting antennas and receiving antennas in the MIMO system. Since MIMO antennas in prior-art systems reside on a single device, the length of the MIMO array is only a few wavelengths, which is usually insufficient for providing the spatial selectivity required to match the spatial multiplexing gain to the number of transmitting antennas. Thus, in prior-art MIMO systems, the rank of the MIMO channel matrix is typically less than its dimension. Adding more antennas to a prior-art MIMO system almost always results in diminishing levels of return with respect to capacity, whereas aspects of the invention solve this problem.

Since the system (depicted in FIG. 1) capacity scales linearly with the number of base station antennas, particularly if the antennas are geographically distributed, it is advantageous to add more base stations as UE density increases. There are several benefits to doing this. Unlike prior-art cellular systems, inter-cell interference is not a problem in the radio access network depicted in FIG. 1. Rather, it is exploited for spatial multiplexing gain, whereas enormous effort is made in today's cellular systems to avoid inter-cell interference, particularly for smaller cells. In aspects of the invention, base stations can be added in the general vicinity of increased user density without cell planning and extensive modifications to the radio access network. The central processing facility 110 immediately adapts to the new radio access network architecture to add capacity to the target area.

Since optimal spatial multiplexing gain is typically achieved when SNR is high (e.g., close to a MIMO base transceiver station), distributed antenna systems disclosed herein can provide closely proximal base transceivers for UEs throughout the coverage area that provide both high SNR and spatial selectivity. Unlike prior-art cellular systems in which each UE is linked to a single base station until it is handed off to another base station, aspects of the invention provide for maintaining concurrent links between the UE and multiple base stations throughout the UE's session. Thus, as the UE moves through the coverage area, it maintains a consistently high SNR.

In other aspects of the invention, Cooperative-MIMO processing on the client side can provide distributed antenna systems comprising cooperating UEs that enable similar MIMO benefits.

In some aspects of the disclosure, all of the base station processing is performed in the central processing facility 110 (which may be an offsite data center as long as latency constraints are met) instead of by the individual base stations 101.1-101.N. Thus, even at very high densities of UEs, not only can all UEs remain connected to the network, but the UEs do not incur the overhead normally incurred by large numbers of UEs sharing one base station in a cell.

The central processing facility 110 could be scaled indefinitely to accommodate increasing UE density and data demands. As the number of UEs and demand grows, not only is it easy to deploy additional base stations, as described above, but it is easy to expand the computing capability in the central processing facility 110 to accommodate the added base stations.

In accordance with some aspects of the invention disclosed in the '163 application, a distributed (e.g., cloud) computing environment may be employed to perform the base station processing. Also, the '163 application discloses that the base station processing may be performed in an SDR. Thus, the implementation of the base station processing may occur entirely on general-purpose CPUs. One implementation of the central processing facility 110 in accordance with previously cited disclosure could include a data center comprising multiple switches and general-purpose servers that connect to the fronthaul network 105 via general-purpose digital links, such as 10 GbE or other links.

Figure 2:
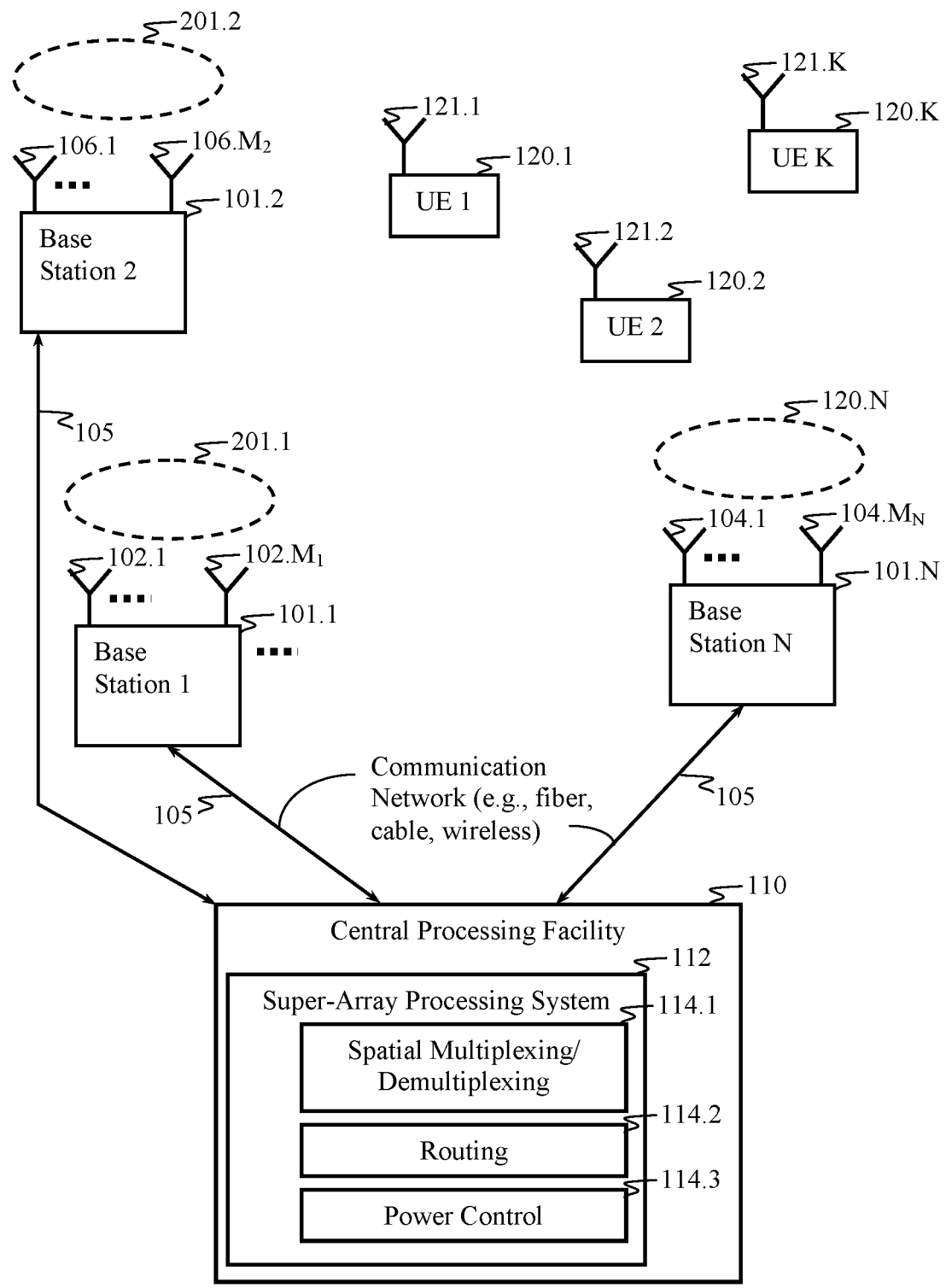
FIG. 2 illustrates a network configuration for super-array processing in accordance with some aspects of the invention.

FIG. 2 illustrates a network configuration for super-array processing in accordance with some aspects of the invention. In one aspect, multiple mobile units (e.g., UEs 120.1-120.K) are each serviced by multiple base stations (e.g., base stations 101.1-101.N) simultaneously. In one aspect of the invention, each base station 101.1-101.N comprises an antenna array. For example, the first base station 101.1 comprises an $M_1$-element array 102.1-102.$M_1$, a second base station 101.2 comprises an $M_2$-element array 106.1-106.$M_2$, and the $N^{th}$ base station 101.N comprises an $M_N$-element array 104.1-104.$M_N$. In super-array processing, the base station arrays (e.g., arrays 102.1-102.$M_1$, 106.1-106.$M_2$, and 104.1-104.$M_N$) are configured to work together to exploit the propagation environment, such as to enhance signal reception for each mobile user 120.1-120.K, reduce power transmission requirements, and mitigate undesired interference.

For the purpose of describing an exemplary aspect of the invention, signals transmitted by mobile unit 120.1 may be received at multiple base station antenna arrays (e.g., at base stations 101.1, 101.2, and 101.N). Adapting each base station antenna beam pattern (e.g., beam patterns 201.1, 201.2, and 201.N) can enhance reception of signals transmitted by each mobile unit 120.1-120.K. Transmissions to each mobile unit 120.1-120.K can also be enhanced. For example, a transmission from base station 101.2 intended for mobile unit 120.2 may cause interference at mobile unit 120.1. However, this interference can be mitigated by including a cancellation signal in the transmission from base station 101.1 and/or base station 101.N. Since all of the base stations 101.1-101.N in this exemplary aspect are connected to the central processing facility 110, signal processing at this facility 110 can be performed to allow multiple base stations to work together and thereby enhance the radio coverage, bandwidth efficiency, and power efficiency.

With respect to each mobile unit 120.1-120.K, all of the interfering signals transmitted by the multiple base transceiver stations 101.1-101.N coherently combine to produce the exact waveform intended for that mobile unit with a high SNR (e.g., SINR). For example, first portions of waveforms transmitted by the multiple base transceiver stations 101.1-101.N combine coherently at a first mobile unit (e.g., 101.1) to produce a first set of data signals intended for the first mobile unit 101.1. Similarly, second portions of the transmitted waveforms combine coherently at a second mobile unit (e.g., 101.2) to produce a second set of data signals intended for the second mobile unit 101.2. However, the first portions combine destructively to cancel at the second mobile unit 101.2 and the second portions combine destructively to cancel at the first mobile unit 101.1. In some aspects of the invention, the high-SNR waveforms exist only in a small volume around the corresponding intended mobile unit. Since these highly localized regions of high SNR are synthesized interference zones, the diameter of these three-dimensional regions (such as may be indicated by a full-width half-maximum amplitude or power) can be less than a wavelength.

Propagation effects due to sparse antenna arrays are described in U.S. patent application Ser. No. 09/906,257, which is incorporated by reference in its entirety. When randomly spaced sources (or equivalently, sources transmitting random carrier frequencies) are employed, interference patterns (i.e., superpositions of the transmitted signals) away from the main lobe (i.e., where signals are configured to combine coherently, or in phase) tend to have little variation between minima and maxima, particularly when many sources (or frequencies) are employed.

In the spatial dimensions, a rich scattering environment can provide a large number of effective sources (i.e., each scatterer is an effective source). It is anticipated that some aspects of the invention may employ very large numbers of transmitters to generate signals that coherently combine in 3-dimensional space at a desired receiver(s). When very large numbers (e.g., hundreds or more) of transmitters and/or effective sources are employed, the signal amplitude (or power) can fall off dramatically at a short distance (even a fraction of a wavelength) from the superposition peak. The signal levels can remain at a consistently low SNR throughout 3-dimensional space except, perhaps, very close to the transmitters. With a sufficiently large number of transmitters, it may be possible to transmit signals from each transmitter that are so low in power that the signals intended for a particular user device are indistinguishable from background noise throughout almost all of the coverage area except in a small volume at the user device where they coherently combine. Thus, some aspects of the invention can provide a type of physical-layer low probability of interception/low probability of detection (LPI/LPD) benefit due to spatial processing that is analogous to LPI/LPD benefits of ultra-wideband signals. Such LPI/LPD benefits can enhance security in wireless networks.

Array processing can be performed at the central processor 110 to adapt transmission and reception beam patterns to improve one or more operating criteria, such as signal-to-noise, signal-to-noise plus interference, probability of error, bit error rate, etc. Various aspects include the use of known training sequences and pilot signals, as well as blind adaptive techniques. Open-loop and/or closed-loop feedback techniques can be used.

In one aspect, each UE may be assigned an orthogonal uplink pilot. However, the maximum number of orthogonal pilots is limited by the duration of the coherence interval divided by the channel delay spread. Thus, aspects of the invention may employ any of various channel estimation algorithms, such as blind techniques, that circumvent the use of pilots altogether. By way of example, the '163, '854, and '107 applications disclose blind techniques that jointly estimate the channels and the payload data.

Even though the propagation channel is reciprocal (between uplink and downlink in time-division duplex systems), the RF front-ends in the base transceivers and UEs may not be reciprocal between the uplink and downlink. Accordingly, calibration of the hardware to ensure reciprocity may be performed, such as disclosed in the '163 application.

The array-processing aspects of the invention can also be used in conjunction with control of other system operating parameters, including, but not limited to, power control, throughput, bandwidth, channel coding (e.g., convolutional, block, trellis, etc.), and frequency band scheduling. In one aspect, the system reduces the transmit power of a mobile unit when array processing enhances the signal-to-noise-plus-interference of that unit's radio link. In another aspect, the level of array processing is adjusted with respect to some quality factor associated with each unit. For example, array processing may be performed only for units that exceed a certain degree of signal degradation, require a certain amount of throughput, or have a predetermined quality-of-service level (QOS). Array processing can be used for data links in a system that provides data and voice services, since digital links require a higher QOS. Array processing can be used to compensate for signal-quality degradation for units assigned to interfering channels.

It should be appreciated that signal processing at the central processing facility 110 may be performed by multiple computer processors via distributed computing (e.g., cloud computing) such as disclosed in the '163 application. In some aspects, the base station signal processing at the central processing facility 110 can be implemented in a real-time SDR to provide for software-defined networks that enable more dynamic organization of resources, such as disclosed in the '163 application. The central processor 110 may comprise one or more servers in a data center configured to compute baseband waveforms using an SDR, such as described in the '163 application.

Since multiple base transceiver stations 101.1-101.N are employed to serve each UE 120.1-120.K via Cooperative-MIMO subspace processing, it is advantageous for the coverage areas of base transceiver stations 101.1-101.N employing the same spectral resources to overlap. This is contrary to how cellular base stations are positioned in a conventional cellular network. Prior-art base stations conform to a cellular layout that is carefully planned to minimize transmission overlap. However, aspects of the disclosure are not constrained to such cell plans because subspace processing can produce constructive and destructive interference zones throughout the radio access network's coverage area to enable spectral reuse, potentially for very large numbers of UEs, even UEs that are in close proximity to each other (e.g., on the order of a few wavelengths, or even less). This enables universal spectral reuse while facilitating deployment of the radio access network infrastructure. In some aspects, the base transceiver stations 101.1-101.N can be placed pseudo-randomly throughout the radio access network, such as to take advantage of locations that are convenient and/or less costly, and with less concern about coverage area and the presence of obstructions in the propagation environment.

In some aspects, since each UE 120.1-120.K is concurrently served by multiple base transceiver stations 101.1-101.N with overlapping coverage areas, a failure of a small number of base transceiver stations 101.1-101.N is less likely to cause a service disruption. Rather, the spatial multiplexing/demultiplexing 114.1 can adapt to changes in the configuration of the base transceiver stations 101.1-101.N, such as to ensure uninterrupted service.

The spatial multiplexing/demultiplexing 114.1 can perform various spatial processing techniques, including (but not limited to) ZF, MMSE, MRC, and/or successive interference cancellation. In some aspects, MRC can offer certain advantages due to the ease in which it can be implemented in a distributed manner and its computational simplicity (e.g., when used for demultiplexing, received uplink signals can be multiplied by the conjugate channel responses, and pre-coding downlink transmissions is similarly simplified). The combination of the MRC receiver (for the uplink) and its counterpart, maximum ratio pre-coding (for the downlink) comprise matched filtering, which is disclosed in the '163 and '854 applications. MRC can be advantageous when channel responses associated with different terminals are substantially uncorrelated.

As disclosed in the '163 application, the fronthaul network 105 can take various forms, including a mesh architecture. Since at least some of the fronthaul links 105 can be wireless (such as disclosed in the '850 application), and given that the base transceiver stations 101.1-101.N can comprise remote radio heads (or other simple radio transceivers), as disclosed in the '850 application, the base transceiver station 101.1-101.N hardware can be a fraction of the cost of prior-art base stations and can be deployed more quickly. Furthermore, as disclosed in the '163, '854, and '107 applications, UEs 120.1-120.K and other devices (not shown) in the radio access network can function as base transceiver stations, such as to dynamically adapt to increased network loads and/or increased UE density, compensate for base station outages, and/or expand the coverage area.

Figure 3A:
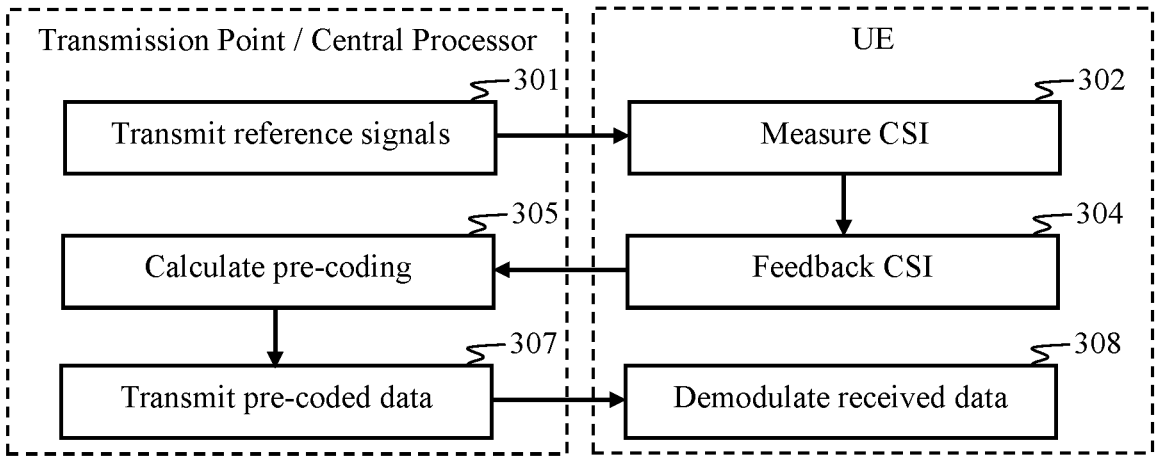
FIG. 3A is a flow diagram of a super-array processing method in accordance with an aspect of the invention.

FIG. 3A is a flow diagram of a super-array processing method in accordance with an aspect of the invention. A plurality of base transceiver stations (e.g., transmission points, or access points) is configured to transmit reference signals 301, which are measured by UEs to calculate channel state information 302. For example, the '850 application discloses that reference signals, which include known training sequences and pilot signals, are transmitted, and a channel model is developed by a receiver upon receiving the transmitted reference signals. The channel state information can comprise channel information relative to multiple base station antennas residing on multiple geographically distributed base stations.

The UEs feedback the channel state information to the transmission points 304, and the transmission points and/or the central processor calculate pre-coding weights 305 therefrom. The '850 application discloses that open-loop and/or closed-loop feedback may be employed. While channel state information can comprise quantized channel estimates, channel state information can comprise alternative indicators, such as codewords. In some aspects of the invention, such as disclosed in the '850 application, step 305 comprises selecting UE's for which array processing is to be performed, wherein only UE's having a predetermined quality-of-service level are selected. In some aspects disclosed in the '850 application, different levels of array processing may be performed, the level of array processing being selected with respect to a quality factor associated with each UE.

Multiple transmission points are coordinated by the central processor to transmit the pre-coded data 307 to each UE. In some aspects of the invention, such as in accordance with the disclosure of the '163 application, step 305 and/or 307 comprises selecting a portion of the network to serve a particular UE. For example, a predetermined set of transmission points is selected to process transmissions to a particular UE based on received pilot signal power. Upon receiving the transmissions, each UE demodulates the received signals 308. Since UE's may comprise antenna arrays, such as disclosed in the '850 application, step 308 may comprise array processing, including MIMO processing.

In accordance with one aspect of the invention disclosed in the '163 application, network processing functions are computed by a plurality of spatially separated processors. For example, the central processor can be replaced by a distributed computing system. The distributed computing system can comprise a plurality of transmission points. In some aspects, the distributed computing system can comprise UE's, repeaters, and/or other network equipment.

In accordance with aspects disclosed in the '850 application, super-array processing comprises a coordinated multi-point technology which sends and receives signals from multiple sectors or cells to a given UE. By coordinating transmission among multiple cells, interference from other cells can be reduced and the power of the desired signal can be increased.

In one aspect of the invention, signaling over a fronthaul network can be used between base stations (e.g., eNodeB's) to coordinate among cells. In another aspect of the invention, multiple remote radio equipments (RREs) are connected via an optical fiber fronthaul carrying a baseband signal between cells and a central eNodeB, which performs the RAN baseband signal processing and control, so the radio resources between the cells can be controlled at the central eNodeB. Other aspects of the invention include combinations of distributed control based on independent eNodeB configurations and centralized control based on RRE configurations.

Figure 3B:
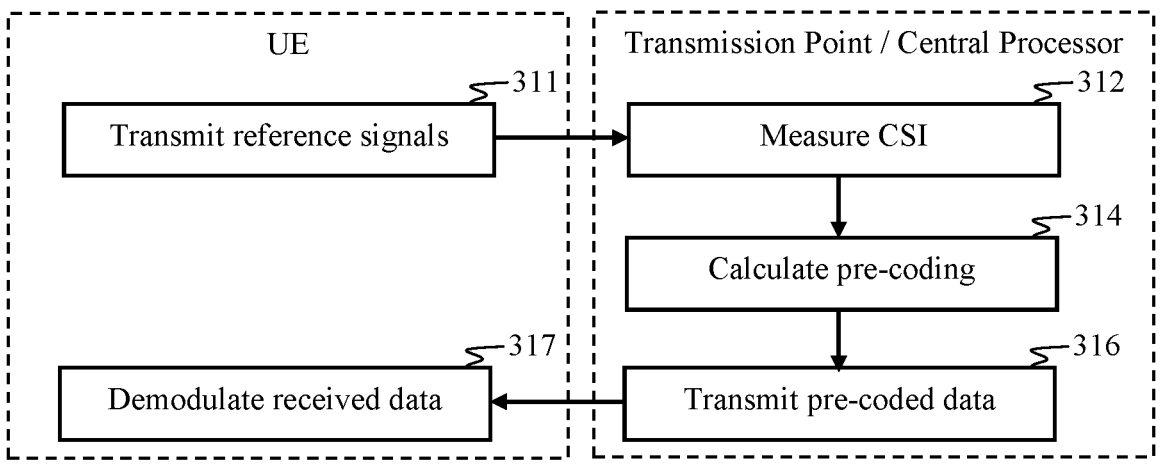
FIG. 3B is a flow diagram of a super-array processing method in accordance with an aspect of the invention in which channel information is estimated from measurements of reference signals transmitted by the UEs. The reciprocal nature of the channel can enable channel estimation of received uplink signals to be used to calculate pre-coding for the downlink channel.

FIG. 3B is a flow diagram of a super-array processing method in accordance with an aspect of the invention in which channel information is estimated from measurements of reference signals transmitted by the UEs. This exemplary method can be useful when time division duplexing (TDD) is employed, such as wherein the uplink and downlink channels assigned to each UE share the same frequency band. For estimation of channels at the transmitter in TDD networks, one can rely on the reciprocity of the uplink and downlink channels so that channel estimation on the uplink can be used for downlink transmission.

In one aspect of the invention, each UE transmits a known reference signal 311, such as one or more known training sequences and/or pilot signals, which are described in the '850 application. The transmitted reference signals are received by antennas of multiple base transceivers, and the channel state information is measured 312 by the base transceiver stations and/or at least one central processor. As disclosed in the '850 application, the channel state information can comprise frequency-domain channel state information. In one aspect, measured channel state information is coupled by the base transceiver stations to the central processor to be used for calculating pre-coding weights 314. In accordance with another aspect, the central processor performs steps 312 and 314. As disclosed in the '163 application, steps 312 and 314 can comprise reference-signal processing, blind adaptive techniques, directive, and/or retro-directive techniques. Communication between the base transceiver stations and the at least one central processor is provided by a high speed network backbone, or fronthaul, which may comprise optical fiber, wired connections, wireless connections, or any combination thereof. Pre-coded data is transmitted 316 by multiple transmission points under the control of the central processor. Each UE receives pre-coded transmissions from multiple transmission points and demodulates the received data 317.

In one aspect of the invention, joint transmissions by multiple cells (i.e., base transceiver stations) to a given UE employ the same time and frequency radio resources. Dynamic cell selection provides for selecting a portion of the base station network to serve a particular UE. Furthermore, UE's can be selected for array processing, such as based on a UE's quality of service level. Pre-coding between the cells provides for coherent transmission, which results in in-phase combining at the receiver. With uplink multi-cell reception, the signal from a UE is received by multiple cells and combined. The UE does not need to be aware of whether multi-cell reception is occurring, so it should have little impact on the radio interface specifications.

As described in the '850 application, some aspects of the invention provide for sharing data and channel state information among groups of base stations to coordinate their transmissions in the downlink and jointly process the received signals in the uplink. These techniques can effectively turn otherwise harmful inter-cell interference into useful signals, enabling significant power gain, increased channel rank, and/or diversity advantages. While some systems disclosed herein describe cellular base stations by way of example, it should be appreciated that additional and/or alternative radio transceivers may be employed, including fixed relay stations, remote radio heads, mobile stations, peer-to-peer radio transceivers, access points, and combinations thereof.

Figure 4A:
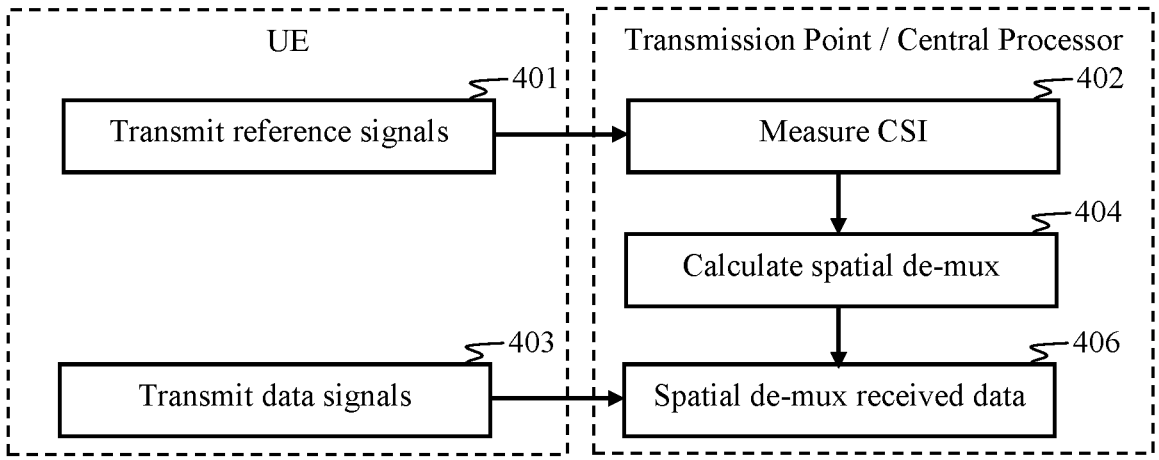
FIGS. 4A and 4B are flow diagrams depicting spatial demultiplexing implemented via multi-cell MIMO cooperation in wireless networks.
Figure 4B:
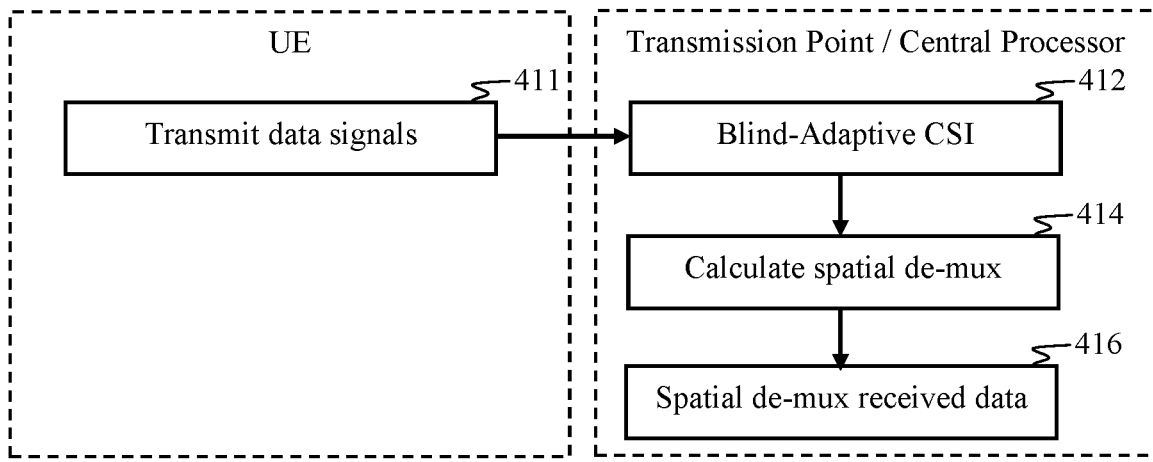

FIGS. 4A and 4B are flow diagrams depicting spatial demultiplexing implemented via multi-cell MIMO cooperation in wireless networks. In dense networks where interference emerges as the key capacity-limiting factor, multi-cell cooperation can dramatically improve the system performance. Remarkably, such techniques can literally exploit inter-cell interference by allowing the user data to be jointly processed by several interfering base stations, thus mimicking the benefits of a large virtual MIMO array.

In FIG. 4A, UE's transmit reference signals 401 and data signals 403. Transmitted reference signals received by multiple base transceiver stations are measured to generate channel state information 402, from which spatial demultiplexing weights are calculated 404. In one aspect of the invention, a central processor measures the channel state information 402 and calculates demultiplexing weights 404 for a geographically distributed set of base transceiver stations. In another aspect of the invention, each base transceiver station measures the channel state information 402, which is then forwarded to at least one central processor. In some aspects of the invention, distributed computing may be employed for calculating the spatial demultiplexing weights 404. For example, computational parts of step 404 may be performed by multiple base transceiver stations. The central processor then demultiplexes the data transmissions 406 received from the UEs.

In FIG. 4B, the transmission points and/or the central processor employ blind-adaptive processing, such as disclosed in the '163 application, to demultiplex received data transmissions. Data signals transmitted 411 by the UE are received and processed by multiple base transceiver stations and at least one central processor. Blind adaptive processing provides channel state information 412, which is used to calculate spatial demultiplexing weights 414, which are used to demultiplex 416 the data transmissions received from the UEs.

Figure 5:
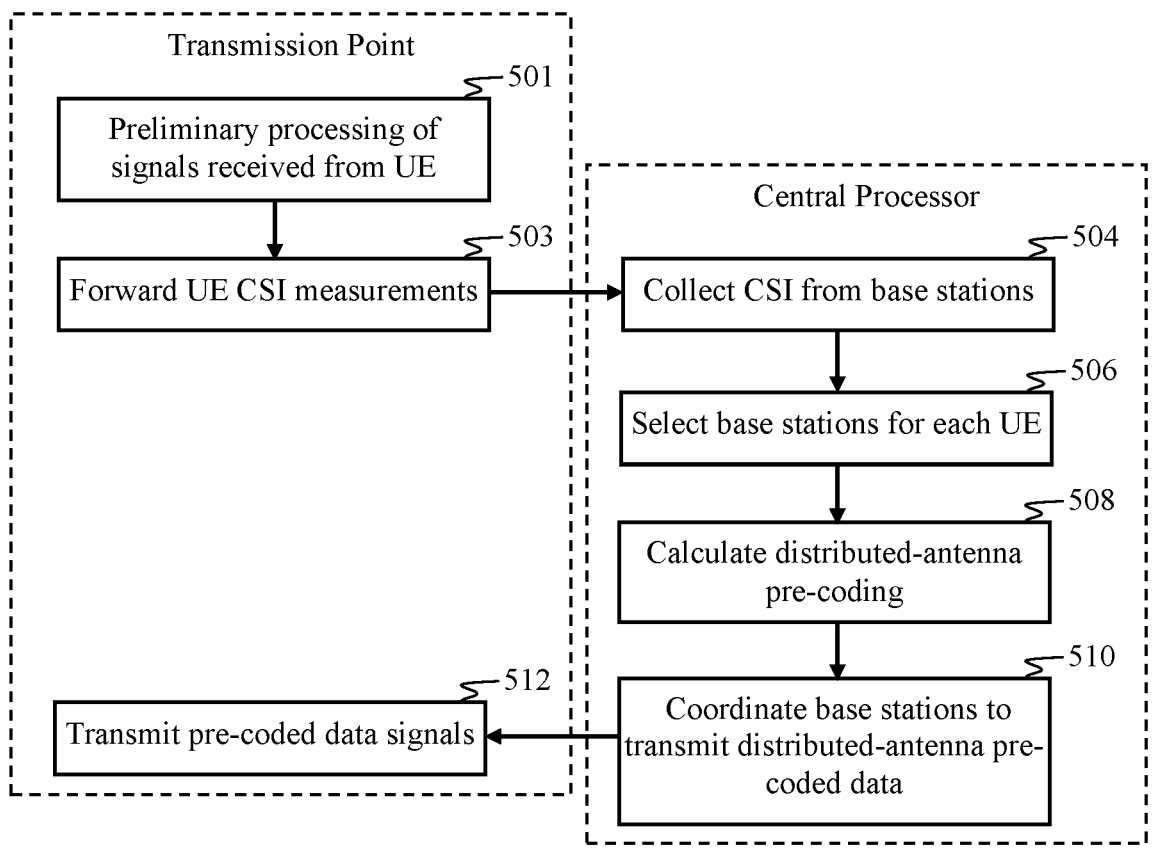
FIG. 5 is a flow diagram depicting a method in accordance with an aspect of the disclosure in which multiple geographically distributed transmission points are coupled to a central processor via a fronthaul network, and the central processor calculates pre-coding weights for spatial multiplexing and coordinates the transmission points to transmit subspace pre-coded downlink signals to multiple UEs.

FIG. 5 is a flow diagram depicting a method in accordance with some aspects of the invention in which multiple transmission points and at least one central processor cooperate to produce subspace pre-coded downlink transmissions to multiple UEs. A base transceiver station (e.g., a transmission point) performs preliminary processing 501 of signals received from at least one UE and communicates channel state information corresponding to each UE to at least one central processor 503. The channel state information can include channel measurements made by the UEs and/or the base transceiver stations. Thus, step 501 can comprise measuring the channel(s) of each UE. The central processor collects channel state information communicated by multiple base transceiver stations 504, selects which base transceiver stations will serve each UE 506, calculates the distributed-antenna pre-coding 508, and coordinates the base transceiver stations to transmit pre-coded data signals to the UEs 510. Each base transceiver station then transmits pre-coded data signals to the UEs 512.

A base transceiver station (or transmission point), as used throughout the disclosure, can comprise a NodeB (such as employed in a UTRAN system) or an eNodeB (such as employed in an EUTRAN system). A central processor, as used throughout the disclosure, can include a radio network controller (RNC) in a UTRAN system or an eNodeB in an EUTRAN system. EUTRAN consists only of eNodeBs on the network side. The eNodeB performs tasks similar to those performed by the NodeBs and RNC together in UTRAN.

E-UTRA uses OFDM-MIMO antenna technology depending on the terminal category and can use subspace pre-coding for the downlink to support more users, higher data rates, and lower processing power. In the uplink, LTE uses both OFDMA and Carrier Interferometry (also called Single-Carrier Frequency-Division Multiple Access), such as disclosed throughout the '850 and '163 applications. This mitigates the very high peak-to-average power ratio (PAPR) of conventional OFDM. For the uplink, in release 8 and 9, multi-user MIMO/Spatial division multiple access (SDMA) is supported.

LTE supports both Frequency-division duplex (FDD) and TDD modes. While FDD makes use of paired spectra for UL and DL transmission separated by a duplex frequency gap, TDD splits one frequency carrier into alternating time periods for transmission from the base station to the terminal and vice-versa. Both modes have their own frame structure within LTE, and these are aligned with each other. Thus, similar hardware can be used in the base stations and user terminals.

Figure 6:
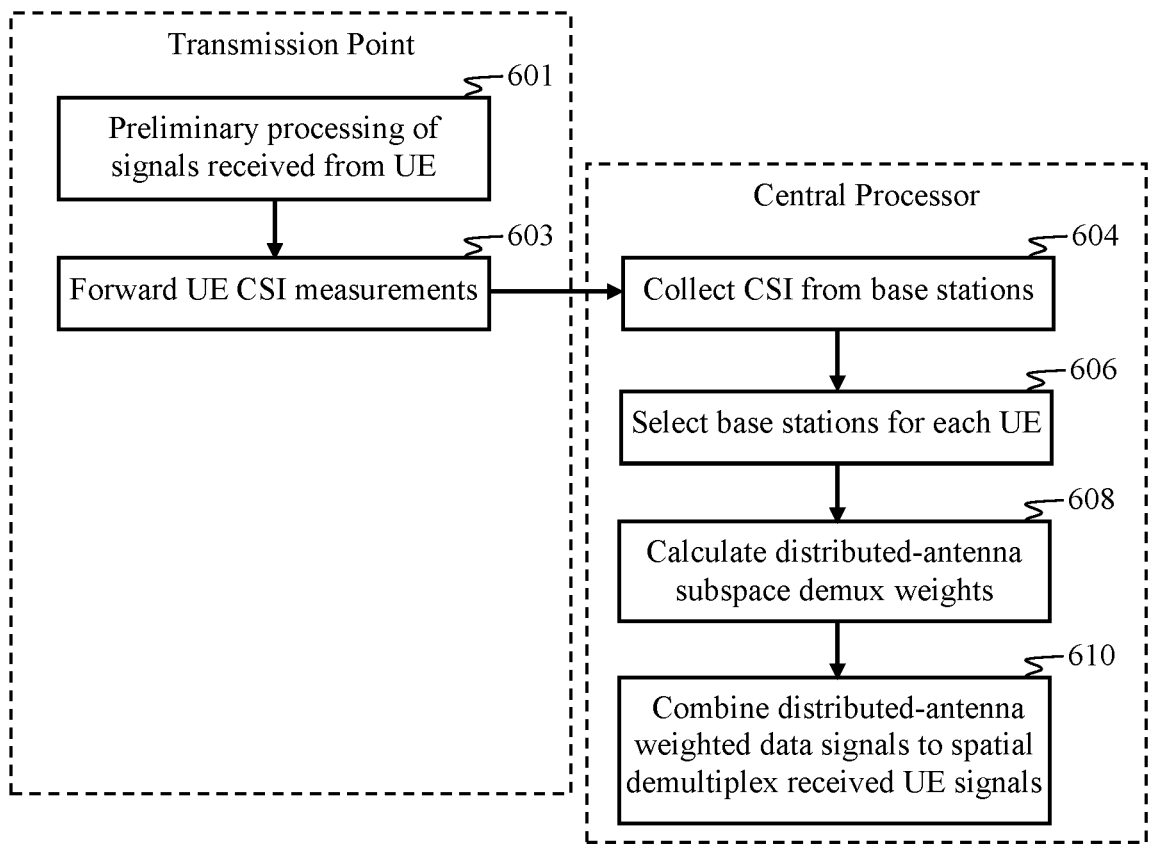
FIG. 6 is a flow diagram depicting a method in accordance with an aspect of the disclosure in which multiple geographically distributed transmission points are coupled to a central processor via a fronthaul network, and the central processor is configured to perform spatial demultiplexing of UE uplink transmissions received by the distributed transmission points.

FIG. 6 is a flow diagram depicting a method in accordance with some aspects of the invention in which multiple transmission points and at least one central processor cooperate to perform distributed spatial demultiplexing of uplink transmissions received from multiple UEs. A base transceiver station (e.g., a transmission point) performs preliminary processing 601 of uplink signals received from at least one UE and communicates channel state information corresponding to each UE to at least one central processor 603. The channel state information can include channel measurements made by the UEs and/or the base transceiver stations. Thus, in some aspects, step 601 can comprise measuring the channel(s) of each UE. The central processor collects channel state information communicated by multiple base transceiver stations 604, selects multiple base transceiver station antennas (including antennas on different base stations) from which signals will be combined for each UE 606, calculates the distributed-antenna demultiplexing weights 608, and performs spatial demultiplexing 610 to separate multiple same-band signals transmitted by the UEs and received by multiple base transceiver stations.

With respect to aspects of the disclosure, a multi-antenna wireless communication system, such as one employing Coordinated Multipoint transmission and/or reception, can mitigate inter-cell interference. In such a system, multiple antennas are deployed across a plurality of geographically contiguous cells (or sub-cells) and connected to a central processor, e.g., via a fast backhaul. This architecture enables the central processor to jointly process downlink signals transmitted from and/or uplink signals received at the multiple antennas, in order to mitigate inter-cell interference.

In accordance with some aspects of the disclosure, to jointly process downlink signals transmitted from the multiple antennas, in particular, the central processor is provided with information characterizing the associated downlink channel responses. If the system employs FDD, the served UEs measure these downlink channel responses and feed them back to the central processor. If the system instead employs TDD, the downlink channel responses can advantageously be estimated from uplink signals received at the multiple antennas based on the assumption that for TDD, the downlink channel can be inferred from the uplink channel (e.g., the uplink and downlink channels can be reciprocal).

This assumption of reciprocity between the downlink and uplink channel, however, may sometimes be inaccurate in a multi-antenna system. For instance, each of the multiple antennas is connected to a corresponding transceiver that comprises a transmit-receive radio frequency (RF) chain. These transmit-receive RF chains may have different frequency responses, due for example to differences in the transfer characteristics of the components (e.g., analog filters, power amplifiers, etc.) making up those RF chains. If the RF chains of the multiple antennas do not have identical frequency responses, the assumption of reciprocity no longer proves accurate, which in turn can prevent advantageous estimation of the downlink channel responses from uplink signals. Accordingly, the RF chains can be initially, and perhaps periodically, calibrated with one another to account for differences in their frequency responses, such as disclosed in U.S. Pat. No. 6,211,671, which is incorporated by reference in its entirety.

Figure 7:
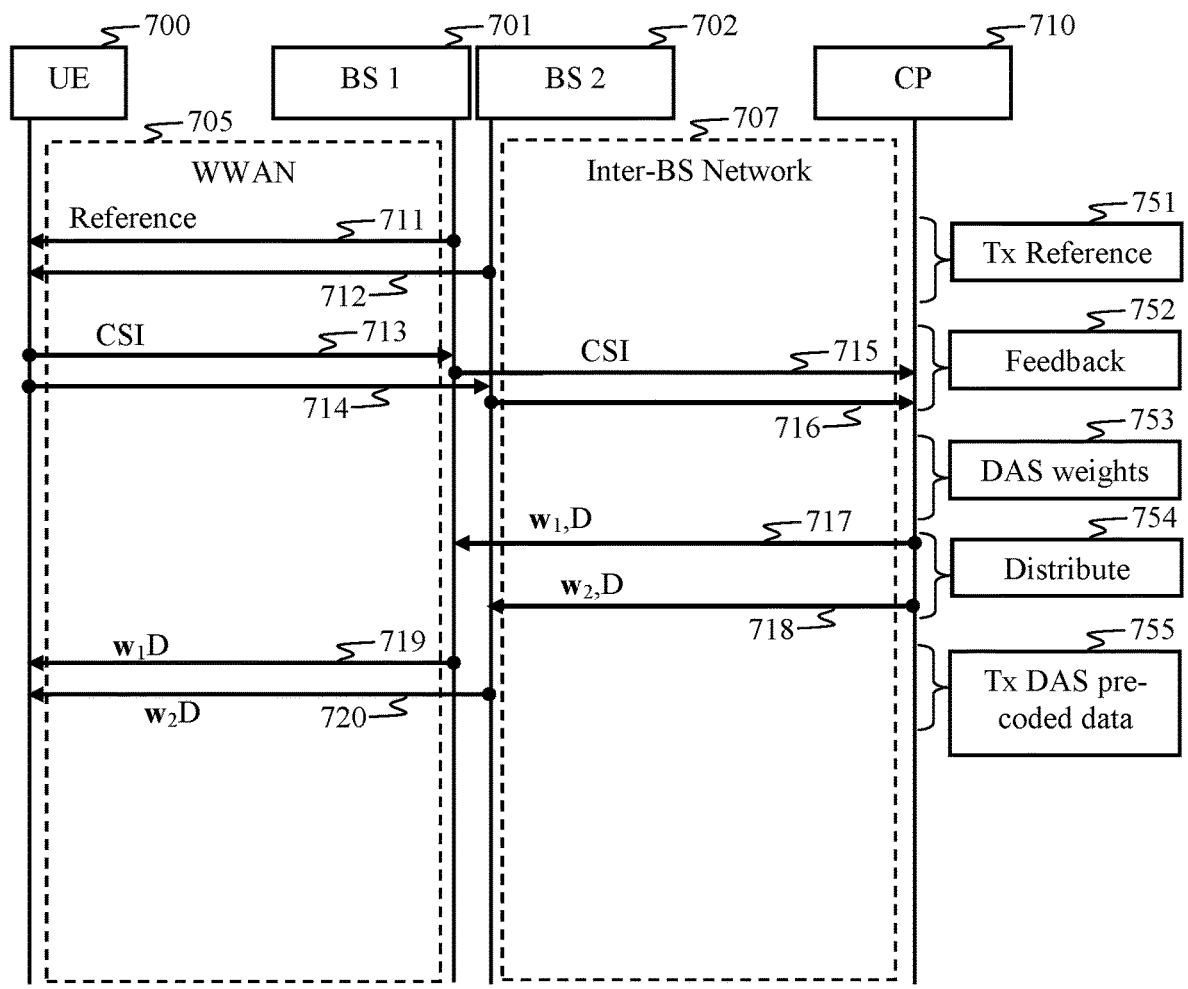
FIG. 7 is a flow diagram depicting messages passed between UEs, base transceiver stations, and a central processor corresponding to a super-array processing method.

FIG. 7 is a flow diagram depicting messages passed between network devices corresponding to steps in a super-array processing method. Such flow diagrams can assist a software developer in designing software modules with instructions on non-transient computer-readable memory that program a computer processor to perform methods disclosed herein.

In one aspect of the invention, a reference signal is transmitted 751, from which channel state information is calculated. For example, each antenna on each of a plurality of base stations 701 and 702 can transmit a reference signal (711 and 712, respectively), such as a known training signal or a pilot tone, which a UE 700 receives and processes to determine its channel state information.

In a feedback step 752, the UE transmits its channel state information 713 and 714 back to its respective base station 701 and 702. The base stations 701 and 702 relay the channel state information (e.g., messages 715 and 716) received from their UEs to at least one central processor 710.

As should be appreciated from the disclosure, an alternative step 751 can comprise the base stations 701 and 702 receiving transmitted reference signals from the UEs (such as UE 700) and estimating the channels therefrom. Then the feedback step 752 comprises the base stations 701 and 702 relaying the channel state information 715 and 716 to the at least one central processor 710.

In step 753, the central processor 710 calculates distributed antenna system weights $w_1$ and $w_2$ 753 based on the channel state information 715 and 716. In a cooperative-MIMO demultiplexing step (not shown), the weights can be used to demultiplex interfering data streams (not shown) in the uplink channels between the UEs 700 and base stations 701 and 702 routed to the central processor 710.

Cooperative-MIMO multiplexing provides for employing the distributed antenna system weights for pre-coding data D to be transmitted to each UE 700. For example, weight vectors $w_1$ and $w_2$ are used to pre-code a data matrix, and the pre-coded data signals 717 and 718 are routed to their respective base stations 701 and 702. The base stations 701 and 702 transmit signals 719 and 720 comprising the pre-coded data to the UEs 700.

Figure 8:
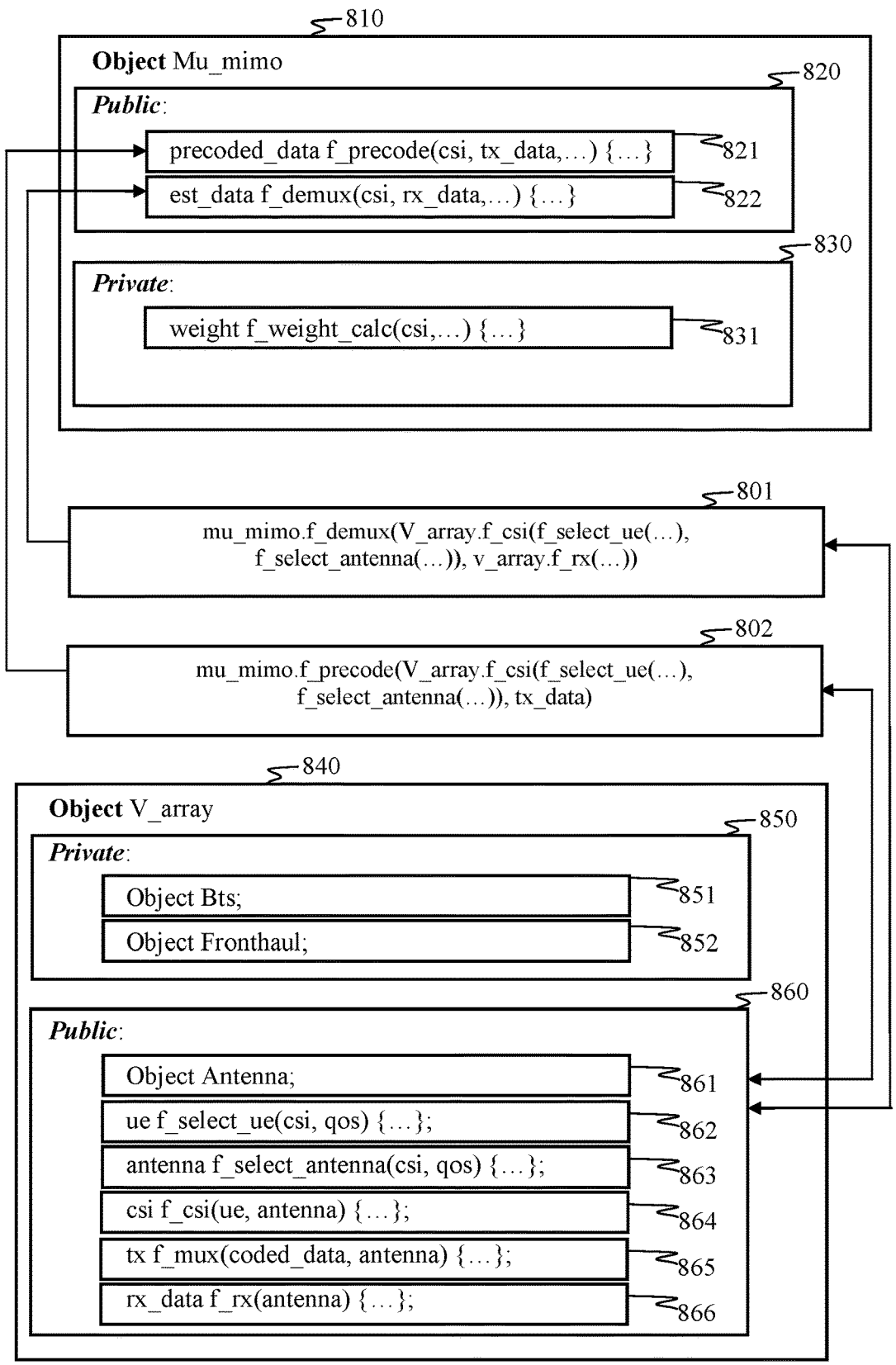
FIG. 8 comprises pseudo-code that depicts data structures and processing functions that can be implemented by a computer processor programmed to perform methods, such as super-array processing methods, in accordance with aspects of the disclosure.

As illustrated in FIG. 8, software developed in accordance with aspects of the invention may comprise functionality that is separable into multiple independent and interchangeable modules. In some aspects, a module may comprise a software object. In some applications, a module may comprise a container that contains other objects. While the scale of a module may vary depending on the programming language and the application, modules are typically designed to perform logically discrete functions and interact via well-defined interfaces. It should be appreciated that in some aspects of the disclosure, modules can comprise data objects, and such data objects reside in physical memory of a computing device and can comprise executable instructions stored in memory that cause a processor to execute steps that give rise to the disclosed functionality as described below.

FIG. 8 comprises pseudo-code that depicts data structures and processing functions that can be implemented by a computer processor programmed to perform methods in accordance with aspects of the invention, including methods disclosed in the '850 application. An object, such as a virtual array object, V_array 840, can comprise methods and data structures that package distributed-array assets (e.g., antenna systems of different base transceivers, radio signal processors associated with those antenna systems, baseband signal processing systems in the base transceivers and/or in the central processor(s), and front-haul networks) in a manner that conceals certain details. For example, the V_array object 840 may comprise a private section 850 in which a combination of data structures and functions can only be accessed within the object 840. By way of example, objects Bts 851 and Fronthaul 852 are private members. Private data structures and functions can conceal implementation details of the object's 840 interface (e.g., how Public functions are implemented and how Public data structures are created).

The virtual antenna array object 840 includes an implementation, which is typically expressed by one or more functions, such as functions 862-866. The implementation contains the working code that corresponds to the elements declared in the interface, such as the Antenna object 861. Functions 862-866 may call other functions which may be internal and/or external to the object 840. By way of example, function f_select_ue( . . . ) 862 selects UEs based on some predetermined quality factor, such as disclosed in the '850 application. Function f_select_antenna( . . . ) 863 selects antennas in the array to serve a particular UE, such as disclosed in the '163 application. Function f_csi( . . . ) measures channel state information for each antenna/UE combination, such as disclosed in the '850 application. Function f_mux( . . . ) provides for spatial multiplexed transmission of pre-coded data across the array of antennas (which may reside on multiple geographically distributed base stations), such as disclosed in the '850 application. Function f_rx( . . . ) receives data from a predetermined set of antennas residing on multiple geographically distributed base stations, such as disclosed in the '850 application.

In one aspect of the invention, each Antenna object 861 is associated with an antenna on a base transceiver station (indicated by the Bts object 851), so the virtual antenna array can include antennas associated with different base stations, such as disclosed in the '850 application. The base transceiver stations can be connected to a central processor via a fronthaul network, such as disclosed in the '850 application. Thus, the virtual array object 840 can comprise one or more Fronthaul objects 852 associated with communications between the Antenna objects 861.

In some aspects of the invention, the virtual antenna array object 840 conceals information related to its antenna elements being distributed across multiple base transceivers (and/or UEs). For example, in some aspects, the virtual antenna array object 840 conceals information about fronthaul networks communicatively coupling signals between the antenna elements and signal processors (such as baseband processors, including MIMO processors). Thus, each virtual antenna array object 840 can conceal network communications within an object-oriented interface.

In accordance with some aspects of the invention, the virtual antenna array object 840 is part of a distributed control environment that provides services, such as access, interaction, and control of base transceiver antennas in a network of geographically distributed base transceivers.

A module interface expresses the data and/or functional elements that are provided and required by the module. For example, the virtual antenna array object 840 could receive as its input an element indicating a particular UE. Thus, a virtual antenna array could be created for each UE. The elements defined in the interface are usually detectable by other modules. In one aspect of the invention, quality factors and signal strength are some of the parameter by which physical antennas distributed across multiple base transceivers can be selected for inclusion in the virtual antenna array object 840. In some aspects, a quality factor or signal strength comprises a measurement of a known training signal. Elements may comprise various data structures, such as lists, arrays, queues, stacks, and other objects. Each data structure has associated operations that may be performed on it and pre-conditions and constraints on the effects of those operations.

Once a virtual array object 840 is created, it may be passed as an argument to another module, such as a multi-user MIMO object, Mu_mimo 810. For example, function calls 801 and 802 access functional elements 822 and 821, respectively, in the Mu_mimo object's 810 interface 820. In some aspects, arguments in the function calls 801 and 802 can comprise function calls in the V_array object's 840 interface.

The f_precode( . . . ) function 821 employs channel state information (csi) to generate a set of antenna array weights (such as via a private function, f_weight( . . . ) 831). The weights are used by function 821 to pre-code a data set (tx_data) to produce pre-coded data (precoded_data). The pre-coded data can then be transmitted by the f_mux( . . . ) function 865 in the same virtual array object 840 used by the f_precode function 821. Thus, in accordance with some aspects of the invention, the f_precode function 821 can perform multi-user MIMO pre-coding for an array of geographically distributed antennas. The f_demux( . . . ) function 822 processes channel state information (csi) and received data (rx_data) from the virtual antenna array 840 to demultiplex the received data.

In the uplink, MIMO receiver processing techniques can be used to efficiently exploit the spatial dimensionalities of the MIMO channel to increase WWAN capacity. In aspects of the invention, from an algorithmic perspective, there is no discernible difference in processing a plurality of different transmissions from a single UE configured for MIMO versus processing one signal from each of a plurality of different UEs configured only for Single Input, Multiple Output (SIMO). Similarly, in some aspects of the invention in which fronthaul latency is either negligible or compensated for, there is no algorithmic difference in MIMO receiver processing whether the receiving array comprises antennas employed on multiple base transceiver stations or an antenna array on a single base transceiver station. In the downlink, in some aspects of the invention in which fronthaul latency is either negligible or compensated for, there is no algorithmic difference in MIMO transmitter processing whether the transmitting array comprises antennas employed on multiple base transceiver stations or an antenna array on a single base transceiver station. For these reasons, at least some implementation details of the virtual array object 840 can be concealed from the multi-user MIMO object 810.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, wherein $N_C \leq \min\{N_T, N_R\}$. Each of the $N_C$ independent channels is also referred to as a spatial subchannel (or subspace channel) and corresponds to a dimension. In one common MIMO system implementation, the $N_T$ transmit antennas are located at and associated with a single transmitter system, and the $N_R$ receive antennas are similarly located at and associated with a single receiver system. A Cooperative-MIMO system can be effectively formed for a multiple access communication system having a set of base transceiver stations communicatively coupled together and coordinated to concurrently communicate with a number of UEs. In this case, each base transceiver station and each terminal can be equipped with one or more antennas. A Cooperative-MIMO system can be effectively formed for a multiple access communication system having a multiple UEs communicatively coupled together and coordinated to concurrently communicate with at least one base transceiver station. In this case, the base transceiver station is typically equipped with multiple antennas and each terminal can be equipped with one or more antennas. However, if geographically distributed base transceiver stations are employed, each base transceiver station can be equipped with one or more antennas.

The wireless links between the distributed base transceiver station antennas and the UE antennas are modeled as a complex channel matrix H of dimensions $K \times N_T$, where K is the aggregate number of UE antennas and $N_T$ is the number of distributed antennas. $H_{DL}$ is the DL channel matrix and $H_{UL}$ is the UL channel matrix. Channel reciprocity holds if DL and UL are set to the same carrier frequency:

$$H_{DL} = H_{UL}^T = H$$

where the superscript symbol, "T", denotes the transpose matrix operation.

In one aspect of the invention, channel estimation is initiated with transmission of a training signal by each of the antennas of a plurality N of base stations. Assuming M antennas per base station, there are N·M training signal transmissions.

Each UE receives each training signal through each of its antenna(s) and frequency down-converts the training signal to baseband, where it is digitized and processed. Signal characterization logic, such as represented by function f_csi( . . . ) 864 characterizes the channel from the received training signal (e.g., identifying phase and amplitude distortions, such as in the case of a flat fading channel, or calculating a channel impulse response) and stores the characterization in memory. Some aspects of this characterization process are similar to that of prior-art MIMO systems, with a notable difference being that the each UE only computes the characterization vector for its own antenna(s) rather than for all K antennas, and each UE is configured to perform channel characterization from training signals transmitted from multiple base transceiver stations. In other aspects of the invention, function f_csi( . . . ) 864 characterizes the channel from training signals transmitted by the UEs. Thus, function f_csi( . . . ) 864 may reside on the base transceiver stations and/or the central processor. In accordance with some aspects of the invention, software objects, and even components with software objects disclosed herein may reside on multiple devices, including UEs, base transceiver stations, and central processors.

In accordance with one aspect of the invention, each UE produces a sub-matrix of a full cooperative-MIMO channel matrix H. For example, if a UE has one antenna (or it has multiple antennas and a combining system that combines signals received by the multiple antennas), then a channel estimate corresponding to a training signal transmitted by one antenna of one of the base stations is an element of a $1 \times N_T$ vector, where $N_T$ is the total number of base station antennas, expressed by $N_T = \Sigma_{n=1}^{N} M_n$, where N is the number of base stations, and $M_n$ is the number of antennas corresponding to an $n^{th}$ base station. In some aspects, a channel estimate comprises a complex-valued flat-fading coefficient. In some aspects, a channel estimate comprises a matrix, such as an impulse response vector.

In accordance with an aspect of the invention, a first UE having a single antenna generates a $1 \times N_T$ vector of channel characterization data: $[H_{1,1}, H_{1,2}, \ldots, H_{1,N_T}]$. A second UE having a single antenna generates a $1 \times N_T$ vector of channel characterization data: $[H_{2,1}, H_{2,2}, \ldots, H_{2,N_T}]$. A $k^{th}$ UE having a single antenna generates a $1 \times N_T$ vector of channel characterization data: $[H_{k,1}, H_{k,2}, \ldots, H_{k,N_T}]$. This channel characterization data can be a data set (e.g., csi) within the V_array object 840.

Based on channel conditions and/or proximity of a UE to each base station, a particular set of base stations may be selected to serve the UE. For example, this selection process may be performed by the f_select_antenna( . . . ) function 863. Thus, one or more UEs may be assigned to a subset of the total number of base stations. In such instances, values of the channel characterization data corresponding to a non-serving base station relative to a UE may equal zero. In some cases, certain values of the full cooperative-MIMO channel matrix H, such as matrix elements corresponding to indices of non-serving base station antennas relative for a particular UE, may be set to zero In some aspects of the invention, a $k^{th}$ UE comprises multiple $N_k$ antennas configured to perform MIMO. For each UE's antenna, a channel estimate corresponding to a training signal transmitted by one antenna of one of the base stations is an element of a $1 \times N_T$ vector. Thus, the $k^{th}$ UE can generate an $N_k \times N_T$ submatrix of the full cooperative-MIMO channel matrix H.

The UEs upload their channel characterization sub-matrices to the base stations via the WWAN, and the sub-matrices are communicated to the central processor via the fronthaul network. Thus, in some aspects, the f_csi( . . . ) function 864 can comprise components distributed across UEs, base stations, and one or more central processors. As the central processor collects the channel characterization sub-matrices, they are stored as the full $K \times N_T$ cooperative-MIMO channel matrix H, where K is the total number of UE antennas and $N_T$ is the total number of base station antennas.

Since each UE is an independent device, each UE often receives its own unique data stream. Thus, in some aspects of the invention, the central processor sources multiple data streams and routes them as separate data streams intended for each UE. In order to do this, the central processor comprises precoding logic for precoding the signals transmitted from each antenna of each of the base stations based on the signal characterization matrix H. In one aspect of the invention, the pre-coding logic is implemented via one or more software instructions, such as the f_precode( . . . ) function 821 in the Mu_mimo object 810. The central processor then routes the precoded data (or the precoding weights and data symbols) to the plurality of base stations. Routing can be part of the f_precode( . . . ) function 821, or it can comprise a separate function call. Thus, each base station antenna is configured to transmit a subspace-coded data sequence which is a function of the data symbols and the channel matrix H.

In one aspect of the invention, cooperative MIMO improves the uplink communications (i.e., the link from the UEs to the Base Stations). In this aspect, the channel from each UE is continually analyzed and characterized by uplink channel characterization logic residing in each base transceiver station or central processor, which may be implemented by the f_csi( . . . ) function 864. For example, each UE may transmit a training signal, which the channel characterization logic analyzes (e.g., as in a typical MIMO system) to generate the channel characterization matrix H.

As described throughout the '163 application, the '854 application, and the '107 application, all of which are incorporated by reference in their entireties, various spatial processing techniques may be employed. Such processing techniques may be included within the f_precode 821 and f_demux 822 functions.

In one aspect of the invention, f_demux 822 performs linear spatial processing on the received signals (for a non-dispersive MIMO channel with flat fading) or space-time processing on the received signals (for a dispersive MIMO channel with frequency selective fading). The spatial processing may be achieved using linear spatial processing techniques such as a channel correlation matrix inversion technique, a minimum mean square error (MMSE) technique, and others. These techniques may be used to null out the undesired signals and/or to maximize the received SNR of each of the constituent signals in the presence of noise and interference from the other signals. The space-time processing may be achieved using space-time processing techniques such as an MMSE linear equalizer, a decision feedback equalizer (DFE), a maximum-likelihood sequence estimator (MLSE), and others. In some aspects, iterative cancellation techniques, such as successive interference cancellation may be employed.

In some aspects of the invention, f_precode 821 performs directive and/or retro-directive techniques for calculating antenna array weights for transmission in a distributed antenna system. Such techniques are disclosed in the '163 application. In some aspects of the invention, as disclosed in the '187 application, eigenvalue-decomposition approaches, such as singular value decomposition, may be employed for transmitter spatial processing.

For example, a MIMO channel formed by the $N_T$ transmit antennas comprising multiple transmission nodes (e.g., base stations) and $N_R$ receive antennas comprising multiple UEs can be characterized by an $N_R \times N_T$ channel response matrix H for each OFDM subband, wherein each matrix element $h_{i,j}$ of H denotes coupling or complex channel gain between transmit antenna j and receive antenna i. For simplicity, the MIMO channel is assumed to be full rank with $S = N_T \le N_R$.

For data transmission with eigensteering, eigenvalue decomposition can be performed on a correlation matrix of H to obtain S eigenmodes of H, as follows:

$$R = H^H \cdot H = E \cdot \Lambda \cdot E^H,$$

where R is a correlation matrix of H; E is a unitary matrix whose columns are eigenvectors of R; $\Lambda$ is a diagonal matrix of eigenvalues of R; and "$^H$" denotes a conjugate transpose.

A unitary matrix U is characterized by the property $U^H U = I$, where I is the identity matrix. The columns of a unitary matrix are orthogonal to one another, and each column has unit power. The matrix E is also called an "eigenmode" matrix or a "transmit" matrix and may be used for spatial processing by the central processor to transmit data on the S eigenmodes of H. The eigenmodes may be viewed as orthogonal spatial channels obtained through decomposition. The diagonal entries of $\Lambda$ are eigenvalues of R, which represent the power gains for the S eigenmodes. The eigenvalues in $\Lambda$ may be ordered from largest to smallest, and the columns of E may be ordered correspondingly. Singular value decomposition may also be performed to obtain matrices of left and right eigenvectors, which may be used for eigensteering.

For data transmission with eigensteering, the transmitting entity may perform spatial processing for each subband as follows:

$$z = E \cdot s,$$

where s is a vector with up to S data symbols to be sent on a particular subband; and z is a vector with $N_T$ spatially processed symbols for the subband. In general, D data symbols may be sent simultaneously on D (best) eigenmodes of H for each subband, where $1 \le D \le S$. The D data symbols in s are spatially processed with D columns of E corresponding to the D selected eigenmodes.

For data transmission with a spatial spreading matrix, such as a CI spatial spreading matrix, the transmitting entity may perform spatial processing for each subband as follows:

$$z_{ss} = V \cdot s$$

where V is a spatial spreading matrix for the subband; and $z_{ss}$ is a vector with up to $N_T$ spread symbols for the subband. Each data symbol in s is multiplied with a respective column of V to obtain up to $N_T$ spread symbols.

In general, D data symbols may be sent simultaneously on each subband with matrix spreading, where $1 \leq D \leq S$. The D data symbols in s may be multiplied with a $N_T \times D$ spreading matrix V(k) to obtain $N_T$ spatially processed symbols for $z_{ss}$. Each spatially processed symbol for each subband includes a component of each of the D data symbols being sent on the subband. The $N_T$ spatially processed symbols for each subband are then transmitted on the S spatial channels of H.

As disclosed throughout the '187 application, any of various water-filling or water-pouring schemes may be employed to optimally distribute the total transmission power over the available transmission channels, such as to maximize spectral efficiency. For example, water-filling can be used to adapt individual UE transmission powers such that channels with higher SNRs are provided with correspondingly greater portions of the total transmit power. A transmission channel, as defined herein, may include a spatial (e.g., a sub-space) channel, a space-frequency channel, or some other channel defined by a set of orthogonalizing properties. Similarly, water filling may be used at a physically connected (i.e., wired) antenna array. The transmit power allocated to a particular transmission channel is typically determined by some predetermined channel-quality measurement, such as SNR, SINR, BER, packet error rate, frame error rate, probability of error, etc. However, different or additional criteria may be employed with respect to power allocation, including, but not limited to, UE battery life, load balancing, spatial reuse, power-control instructions, and near-far interference.

The modulation and channel coding for each transmission channel may be adapted with respect to the corresponding SNR. Alternatively, transmission channels may be grouped with respect to their data-carrying capability. Thus, groups of transmission channels may share common modulation/coding characteristics. Furthermore, transmission channels having particular SNRs may be used for particular communication needs. For example, voice communications may be allocated to channels having low SNRs, and thus, data-carrying capabilities. In some cases, transmission channels that fail to achieve a predetermined threshold SNR may be eliminated. In one embodiment of the invention, water filling is employed such that the total transmission power is distributed over selected transmission channels such that the received SNR is approximately equal for all of the selected channels.

In accordance with some aspects of the invention, hardware systems, such as UEs, base transceiver stations, and central processors, can include a processing element capable of executing processing threads or tasks.

Figure 9:
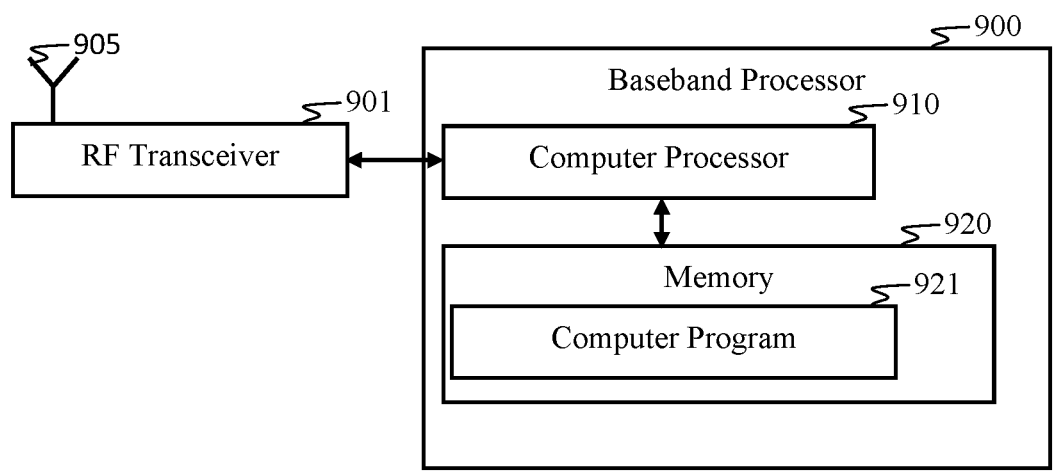
FIG. 9 is a block diagram of a UE that can be configured to operate in accordance with aspects of the disclosure.

As depicted in FIG. 9, a UE can include a controller, such as at least one computer or data processor 910, at least one non-transitory computer-readable memory medium embodied as a memory 920 that stores a program of computer instructions 921, and at least one suitable radio frequency (RF) transmitter/receiver 901 for bidirectional wireless communications with multiple base transceiver stations via one or more antennas 905.

Figure 10:
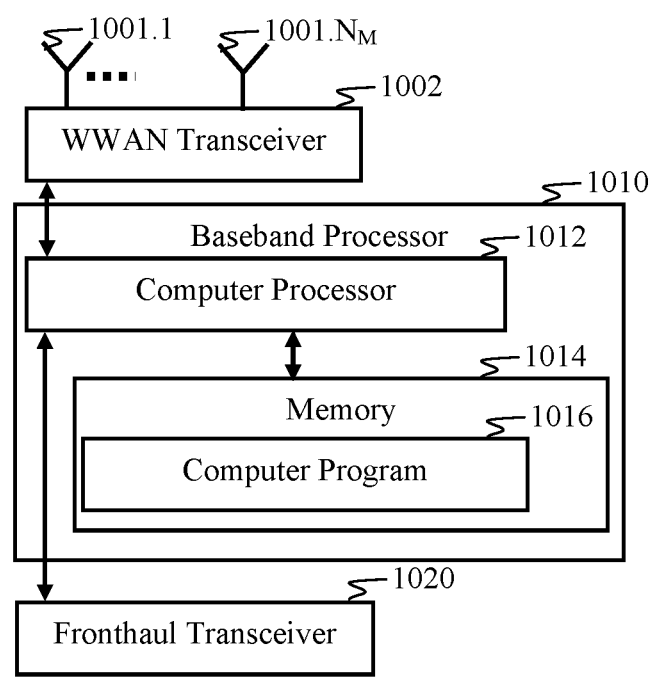
FIG. 10 is a block diagram of a base transceiver station that can be configured to operate in accordance with aspects of the disclosure.

As depicted in FIG. 10, a base transceiver station includes a controller, such as at least one computer or a data processor 1012, at least one computer-readable memory medium embodied as a memory 1014 that stores a program of computer instructions 1016, and at least one suitable transceiver 1002 for communication with the UEs via one or more antennas $1001.1-1001.N_M$. The base transceiver station is coupled via a fronthaul transceiver 1020 to a data and control path to the central processor, such as a network control element. In one aspect of the invention, the fronthaul may be implemented as an Si interface. In another aspect, the fronthaul may comprise an X2 interface. In another aspect, the fronthaul can comprise a direct eNodeB internal interface (e.g., optical fiber connection) such as a connection between a radio remote head and an eNodeB.

Thus, there is some central unit where several base transceiver stations are connected as such, with the goal being that the base transceiver stations (e.g., transmission points, macro eNodeBs, etc.) are centrally controlled together. The control can be at the location of a macro eNodeB, but could also be at a different location.

Figure 11A:
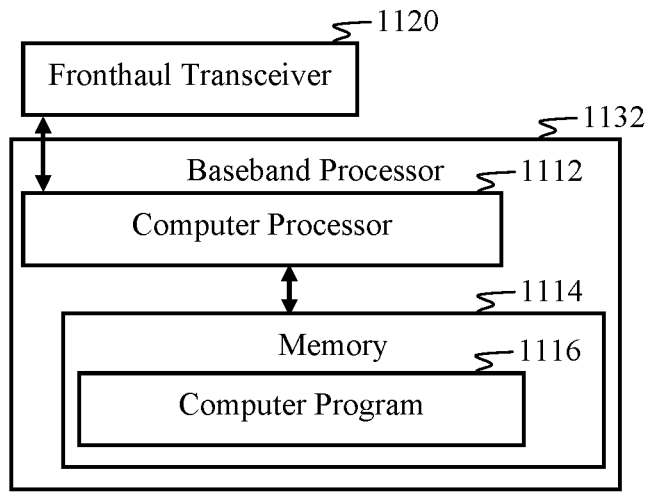
FIG. 11A is a block diagram of a central processor that can be configured to operate in accordance with aspects of the disclosure.

As depicted in FIG. 11A, a central processor, such as a network control element, comprises a controller, such as at least one computer or a data processor 1112, at least one computer-readable memory medium embodied as a memory 1114 that stores a program of computer instructions 1116, and at least one fronthaul transceiver 1120 coupled to a data and control path (i.e., a fronthaul network) between the central processor and multiple base transceiver stations.

At least one of the programs 921, 1016, and 1116 is assumed to include program instructions that, when executed by the associated computer processor(s), enable the corresponding device(s) to operate in accordance with the exemplary aspects of the invention.

The '163 application discloses SDR platforms that enable dynamic implementations of a full protocol stack, including Physical-layer processing. Some aspects are disclosed in the context of software-defined networks, such as to enable more dynamic organization of resources. Disclosed software radio implementations include instantiations of virtual base stations.

In some disclosed aspects, software radio provides associated control operations, such as identifying a particular transmission protocol used by a particular device, reserving channels for transmission, monitoring channel use (including channel reservation and channel release), requesting data transmissions and/or state information from remote devices, attaching tags to data streams for identification and/or access control, and providing instructions to remote transceivers to adjust or control processing, transmit status information, and/or identification.

By way of example, and with respect to implementing base transceiver station processing in a central processor or in a distributed computing system, a software-defined radio in accordance with one aspect of the invention can provide a base station instantiation for a UE. Specifically, the software-defined radio can perform base station processing functionality in combination with Cooperative-MIMO subspace processing to use a plurality of geographically distributed base transceiver stations that communicate with the UE via the radio access network. In an LTE network, this means that the software-defined radio implements a virtual eNodeB to support the LTE protocol stack for that user while providing for subspace coding to support spatial multiplexing.

In one aspect, when a UE joins the network, the SDR might provide for requesting identification, performing channel reservation, and requesting state information (e.g., channel state information) from the UE. The combination of software-defined radio and Cooperative-MIMO implemented with virtualized base station processing via the central processor or even distributed (e.g., cloud) computing enables each UE to be served independently of other UEs concurrently employing the same spectrum, and possibly using the same base transceiver station hardware. This is because Cooperative-MIMO subspace processing enables multiple non-interfering subspace channels in the same spectrum to be used by each UE, even closely spaced UEs, which can eliminate the need for other multiple access partitioning of the spectral resource (such as via TDMA, OFDMA, CDMA, etc.). When the UE ends its connection with the network, the SDR releases the channel and its instantiated virtual base station.

In accordance with some aspects, consolidation of processing from multiple base stations to a central processor (e.g., an offsite data center) constitutes a virtual base station that employs multiple antennas of different base transceiver stations and remote (and possibly software-defined) base station processing. Further aspects distribute the base station processing over multiple processing cores via distributed (e.g., cloud) computing. As disclosed in the '163 application, multiple different transmission protocols may be employed simultaneously. Thus, SDR instances (e.g., virtual base stations) employing different protocol stacks may coexist within the same software-defined radio and can be implemented concurrently within the same spectrum.

A CI-based software radio can extend adaptive link-layer techniques to the physical layer. This enables more efficient use of the spectrum by dynamically adjusting physical-layer characteristics to current channel conditions, network traffic, and application requirements. CI can significantly improve wireless network performance and functionality by adapting to different requirements for bandwidth, error rate, latency, link priority, and security.

Embodiments of a CI-based communication system may include interactive capabilities between the physical layer and higher layers such that a response to changing conditions and operational requirements can be directed to an appropriate physical-layer function. For example, a base station or central processor in a mobile wireless network can dynamically create channels (e.g., spatial multiplexing channels) depending on the number of mobile units in its coverage area and their service requirements. When additional units enter the area, the system can be reconfigured accordingly.

In ad-hoc networks, base station functions (e.g., routing, power control, synchronization, geo-location services, etc.) may be distributed among various devices. Aspects of the disclosure can also include adapting base-station and access-point functions to maintain link quality and perform load balancing (including managing power budgets for devices acting as routers and relays, managing system spectrum allocations, and/or adjusting cell boundaries to adapt to changing user demands, power budgets, and spectrum use). Thus, in some aspects, the super-array processing system 112 may include a power control 114.3.

Bandwidth can be dynamically allocated to uplink and downlink channels depending on network traffic characteristics. Units requiring real-time or broadband services may be assigned to dedicated channels, whereas units having bursty data requirements may be assigned to a shared channel. Aspects of the invention can provide for combinations of time-domain and frequency-domain processing to produce signals having desired physical-layer characteristics.

SDRs disclosed in the '163 application are configured to provide for various signal processing objectives for implementing multiple-access protocols (e.g., DS-CDMA, TDMA, OFDM, MC-CDMA), channel coding, modulation (e.g., phase modulation, frequency modulation, amplitude modulation, time-offset modulation, etc., including different constellations (e.g., binary, M-ary), multiplexing (e.g., TDM, FDM, CDM), formatting (e.g., frame length, headers, payload length, etc.), source coding, providing for frequency agility (e.g., frequency hopping, variable aggregate bandwidth, frequency selectability, etc.), encryption, and/or subchannel coding.

Figure 11B:
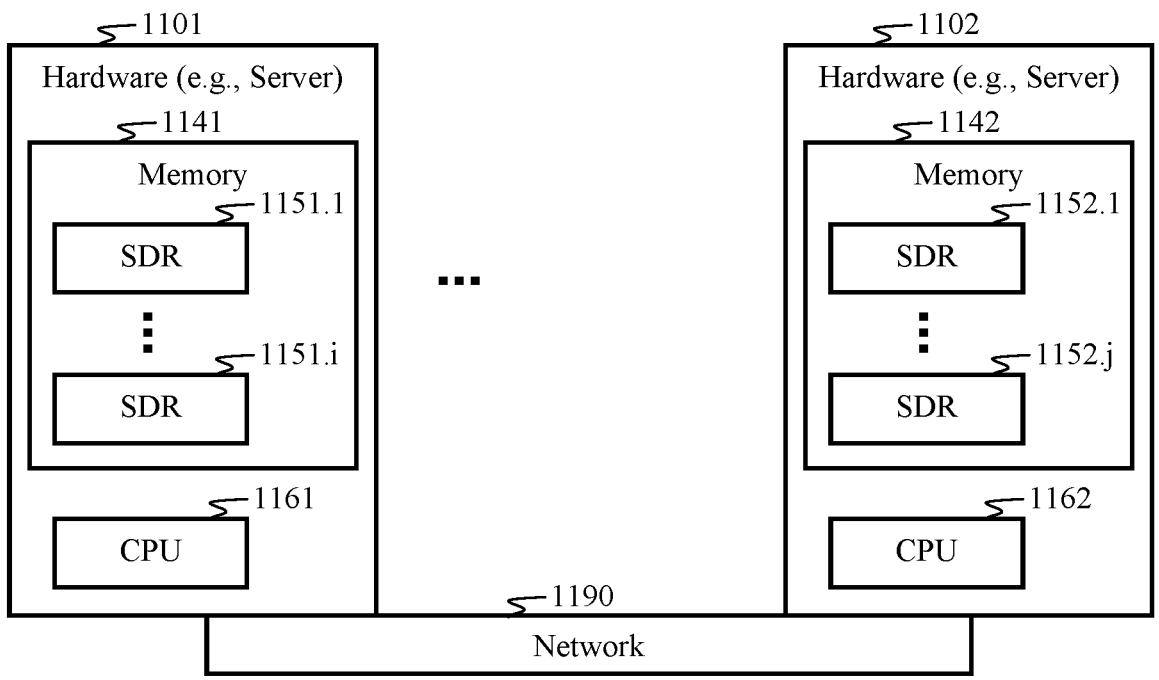
FIG. 11B is a block diagram that depicts a cloud-based software-defined radio, which can be implemented in accordance with many different aspects of the disclosure.
Figure 12:
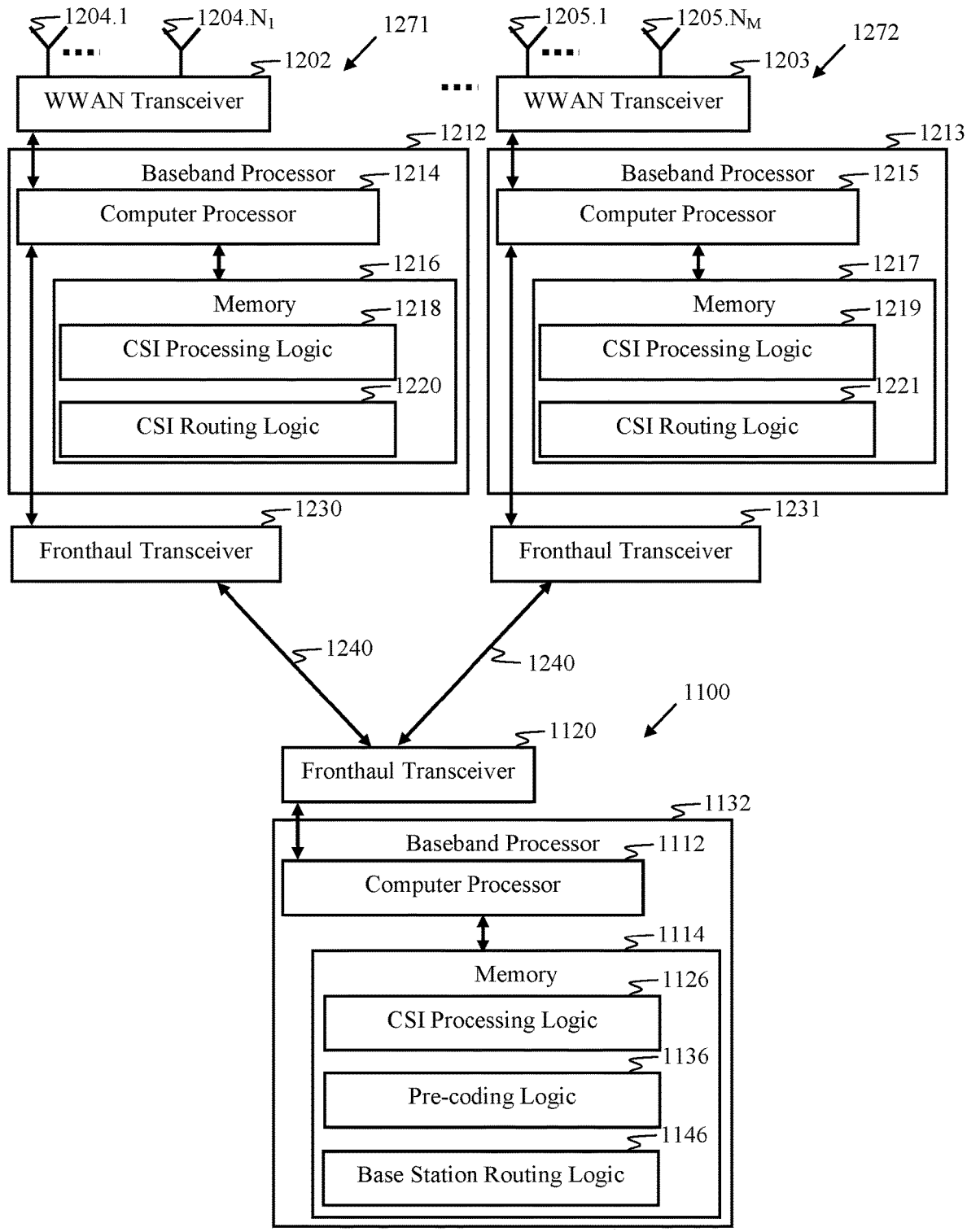
FIG. 12 is a block diagram of a super-array processing system comprising a central processor communicatively coupled to multiple geographically distributed base transceiver stations via a fronthaul network.

FIG. 11B is a block diagram that depicts a cloud-based software-defined radio, such as disclosed in the '163 application. A plurality of hardware components (such as servers 1101 and 1102) are communicatively coupled together via a network 1190. Server 1101 comprises at least one processor (e.g., CPU 1161) and at least one memory 1141. Similarly, server 1102 comprises at least one processor (e.g., CPU 1162) and at least one memory 1142. A software-defined radio platform can comprise a plurality of signal-processing software components residing in one or more of the memories 1141 and 1142 of the hardware components, 1101 and 1102, respectively. By way of example, SDRs 1151.1-1151.$i$ are stored in memory 1141, and SDRs 1152.1-1152.$j$ are stored in memory 1142. By way of example, the hardware components 1101 and 1102 may include a computer main frame or a workstation.

Although not shown, interfaces can couple the hardware components 1101 and 1102 together, such as via the network 1190. Such interfaces disclosed in the '163 application include radio interfaces for a radio network. The network 1190 may comprise various types of networks, including a bus. Also disclosed in the '163 application is the concept of interfaces for the software components (e.g., 1151.1-1151.$i$ and 1152.1-1152.$j$) as it relates to software design, such as object oriented design. Interaction and inter-connectivity between software and hardware interfaces is also contemplated for coupling together hardware and/or software components.

The SDRs 1151.1-1151.$i$ and 1152.1-1152.$j$ may include local and/or remote computer programs configured to process signals, such as for various physical-layer signal processing, including baseband processing. For example, the SDRs 1151.1-1151.$i$ and 1152.1-1152.$j$ may include one or more programs for performing digital signal processing. One or more of the SDRs 1151.1-1151.$i$ and 1152.1-1152.$j$ may provide control signals to one or more hardware components such as to select, adapt, or otherwise reconfigure signal processing.

The memory can comprise various types of storage mediums (e.g., disk drive, tape drive, CR Rom, DVD, flash memory, or any other storage device) for storing application programs (e.g., the SDRs 1151.1-1151.$i$ and 1152.1-1152.$j$) and data. Hardware and/or the software may perform A/D conversion, as necessary. In some applications, modulation and/or demodulation may be performed digitally with any combination of software and hardware.

In one set of aspects of the invention, a software component (such as at least one of the SDRs 1151.1-1151.$i$ and 1152.1-1152.$j$) residing at a remote receiver location (e.g., a base transceiver station) receives signals transmitted in the radio access network, processes the received signals, and conveys some control information in the data stream (e.g., in a header or pilot channel) to hardware components residing in another location (e.g., at a central processor or another base transceiver station). Signal-processing operations may be distributed throughout a network in a way that balances processing loads and/or communication-resource (e.g., spectrum use) loads. Alternatively, in a Cooperative-MIMO network wherein UEs cooperate with a base transceiver station to perform joint processing for spatial multiplexing and/or demultiplexing signals, most of the signal processing may be performed by the base transceiver station (and/or the central processor) to reduce the cost and complexity (and power usage) of the UEs. As described with respect to centralized processing of base transceiver operations, RF processing is performed at each base transceiver station, and most or all of the baseband signal processing may be performed at a central processing facility.

In one set of aspects of the disclosure, software can be uploaded to a remote transceiver (e.g., base transceiver station) via one or more communication channels. This simplifies software updates and enhances signal-processing versatility of the network. In another set of aspects, software updates can be uploaded to a central processor (e.g., a cloud network organized by a central processor) where most or all of the baseband processing is performed.

Software-based radios can provide adaptability to different communication standards. The '163 application discloses various systems and techniques that can migrate many different transmission protocols to a common high-performance SDR platform that is suitable for all applications. In some aspects of the disclosure, the SDR platform can be configured to enable coexistence of different standard systems within the same spectrum. For example, the power emission, frequency band, or other configuration parameters of a legacy radio access network can be adjusted to accommodate the adoption of new transmission protocols while avoiding harmful interference with the legacy protocol.

As new wireless standards are developed to enhance data rate and coverage in the radio access network, the base transceiver stations and/or central processors can be updated to support those standards. In some aspects, only the central processor(s) needs to be updated. By way of example, the central processor may comprise distributed computing resources, such as multiple servers residing in one or more data centers. The servers may comprise hardware components of an SDR platform.

In one aspect, the base transceiver stations and/or central processors are SDRs equipped with programmable computational capability, such as FPGA, DSP, CPU, GPU, and/or GPGPU, configured to run algorithms for baseband signal processing in the radio access network. If the standard is upgraded, new baseband algorithms can be uploaded to the central processors and/or from the central processors to the base transceiver stations to reflect the new standard. This SDR feature allows for continuous upgrades to the radio access network, such as when new technologies are developed to improve overall system performance.

In one aspect of the disclosure, a cloud SDR network comprises a multi-user MIMO system implemented with cooperative-MIMO over a plurality of geographically distributed base transceiver stations communicatively coupled to a central processor. The central processor is configured to perform at least some of the baseband processing in the radio access network. In some aspects, the central processor and the base transceiver stations are configured to exchange information to reconfigure system parameters, such as to dynamically adapt to changing conditions of the radio access network, including the network architecture (such as described in the '187 application).

As disclosed with respect to coordinated multipoint systems with a central processor configured to perform cooperative MIMO, the base transceiver stations in a cloud SDR network can be configured to generate simultaneous non-interfering wireless links to serve different UEs with different multiple access techniques (e.g., TDMA, FDMA, CDMA, OFDMA, etc.) and/or different modulation/coding schemes. For example, if the base transceiver stations perform RF processing and the central processor performs just baseband processing, the SDRs can be configured to perform baseband processing. Based on the active UEs in the radio access network and the standard(s) they use for their wireless links, the SDRs implemented by the central processor (such as SDRs in a distributed computing environment) can instantiate virtual base station processes in software, each process configured to perform the baseband processing that supports the standard(s) of its associated UE(s) while utilizing a set of the base transceiver stations within range of the UE(s).

In accordance with one aspect of the invention, baseband waveforms from multiple ones of the SDRs $1151.1$-$1151.i$ and $1152.1$-$1152.j$ are coupled into the Super-Array Processing System $112$ depicted in FIG. $2$. The baseband waveforms are combined in the Spatial Multiplexing/Demultiplexing module $114.1$ using Cooperative-MIMO subspace processing to produce multiple pre-coded waveforms. The routing module $114.2$ sends the pre-coded waveforms over the fronthaul $105$ to multiple ones of the base transceiver stations' $101.1$-$101.N$ antennas $102.1$-$102.M_1$, $106.1$-$106.M_2$, and $104.1$-$104.M_N$. The base transceiver stations $101.1$-$101.N$ can be coordinated to concurrently transmit the pre-coded waveforms such that the transmitted waveforms propagate through the environment and constructively interfere with each other at the exact location of each UE $120.1$-$120.K$. The coherent combining of these waveforms at the location of each UE $120.1$-$120.K$ results in the synthesis of the baseband waveform that had been output by the SDR instance $1151.1$-$1151.i$ and $1152.1$-$1152.j$ associated with that UE $120.1$-$120.K$. Thus, all of the UEs $120.1$-$120.K$ receive their own respective waveforms within their own synthesized coherence zone concurrently and in the same spectrum.

In accordance with one aspect of the invention, each UE's corresponding synthesized coherence zone comprises a volume that is approximately a carrier wavelength or less in width and centered at or near each antenna on the UE. This can enable frequency reuse between nearby—even co-located—UEs. As disclosed in the '107 application, the Spatial Multiplexing/Demultiplexing module $114.1$ can be configured to perform maximum ratio combining. Any of various algorithms for MIMO processing disclosed in the '107 application may be employed by methods and apparatus aspects disclosed herein. In some aspects, the module $114.1$ can perform zero forcing, such as to produce one or more interference nulls, such as to reduce interference from transmissions at a UE that is not an intended recipient of the transmission. By way of example, but without limitation, zero forcing may be performed when there are a small number of actual transmitters (e.g., base transceiver station antennas) and/or effective transmitter sources (e.g., scatterers in the propagation environment).

By way of example, FIG. $12$ is a block diagram that depicts a central processor $1100$ communicatively coupled via a fronthaul network 1240 to multiple base transceiver stations, such as base transceiver stations 1271 and 1272. Each base transceiver station 1271 and 1272 comprises a WWAN transceiver 1202 and 1203, respectively, and baseband processor 1212 and 1213, respectively. WWAN transceiver 1202 comprises a number $N_1$ of WWAN transceiver antennas 1204.1-1204.$N_1$, and WWAN transceiver 1204 comprises a number $N_M$ of WWAN transceiver antennas 1205.1-1205.$N_M$. The baseband processor 1212 comprises a computer processor 1214 and a memory 1216. The baseband processor 1213 comprises a computer processor 1215 and a memory 1217. In accordance with some aspects of the disclosure, the baseband processors 1212 and 121 comprise Channel State Information processing logic 1218 and 1219, respectively, and Channel State Information routing logic 1220 and 1221, respectively. Each base transceiver station 1271 and 1272 comprises a fronthaul transceiver 1230 and 1231, respectively, communicatively coupled via the fronthaul network to the central processor 1100.

In accordance with some aspects of the disclosure, Channel State Information processing logic 1218 and 1219 can collect channel information uploaded by the UEs (not shown) and/or determine channel state information from measurements of training signals transmitted by the UEs (not shown). Channel State Information routing logic 1220 and 1221 can route channel state information to at least one central processor, such as the central processor 1100.

In some aspects of the disclosure, the central processor 1100 comprises Channel State Information processing logic 1126, Pre-coding logic 1136, and Base Station Routing logic 1146. In one aspect, computer software, such as logic 1126, 1136, and 1146, comprises instructions stored on a non-transitory computer-readable medium (e.g., memory 1114), that when executed on the processor 1112, perform the steps of storing the WWAN channel state information received from the base transceiver stations (e.g., base transceiver stations 1271 and 1272) based on the WWAN channel state information and/or at least one quality metric that characterizes each communication link between a base transceiver station and a UE; and selecting a plurality of antennas residing on multiple base transceiver stations to provide a set of distributed antennas. For example, a set of distributed antennas can be selected to serve each UE. Next, the processor 1112 calculates subspace processing weights from each UE's channel state information for the each UE's corresponding set of distributed antennas. The corresponding instructions can be in the Pre-coding logic 1136 and/or in subspace demultiplexing logic (not shown). The processor 1112 coordinates each UE's corresponding set of distributed antennas to communicate in the WWAN via the fronthaul network. For example, the corresponding instructions for coordinating the distributed antennas can be in the Base Station Routing logic 1146. The central processor 1100 provides for performing at least one of subspace multiplexing of WWAN signals transmitted by each set of distributed antennas and subspace demultiplexing signals received by each set of distributed antennas.

The exemplary aspects of the disclosure may be implemented, at least in part, by computer software executable by the data processor 910 of the UEs (such as the UE shown in FIG. 9), the data processor 1012 of the base transceiver stations (such as the base transceiver station shown in FIG. 10), by the data processor 1112 of the central processor (such as the central processor shown in FIG. 11A), by multiple data processors in a distributed computing system (not shown), and/or by hardware, or by a combination of software, hardware, and firmware.

In accordance with one aspect of the invention, subspace multiplexing is provided by the Pre-coding logic 1136 configured to produce pre-coded subspace (i.e., spatial multiplexing) weights and to encode data with the weights, and the Base Station Routing logic 1146 configured to route the encoded data to the base transceiver stations for transmission to the UEs. In accordance with another aspect of the invention, subspace demultiplexing is provided by the Base Station Routing logic 1146 configured to route UE uplink signals received by the base transceiver stations to the central processor 1100 and the subspace demultiplexing logic (not shown) configured to produce subspace demultiplexing weights based on the channel state information and to de-multiplex (i.e., decode) the received signals. Thus, performing at least one of subspace multiplexing of WWAN signals transmitted by each set of distributed antennas and subspace demultiplexing signals received by each set of distributed antennas enables multiple UEs to employ simultaneous interference-free same-band communications.

In accordance with some aspects of the invention, certain features, such as pre-coding logic and subspace demultiplexing logic, can comprise an Application Programming Interface (API) or library that defines functionalities that are independent of their respective implementations, which allows definitions and implementations to vary without compromising each other. By way of example, and without limitation, APIs provided for base station network control can enable MIMO processing applications to operate on an abstraction of the network, such as by exploiting distributed antenna array systems and coordinated base station operations and capabilities, without being tied to the details of their implementation.

In accordance with some aspects of the disclosure, the steps of selecting antennas on multiple base transceiver stations for MIMO processing and coordinating the multiple base transceiver stations for cooperative-MIMO communications (which includes routing communication signals to and/or from the multiple base transceiver stations as part of a cooperative subspace processing operation) tie the mathematical operation (i.e., multi-user MIMO subspace processing) to specific and measurable operational benefits (i.e., based on measurable physical phenomena), such as the ability to improve WWAN performance (e.g., spectral efficiency, number of subspace channels, data rate per user, number of users supported, SNR, BER, etc.).

These steps add significantly more to MIMO processing than mere computer implementation. By employing steps, such as selecting multiple base transceiver stations to simultaneously serve each UE in a MIMO subspace processing operation, coordinating the selected multiple base transceiver stations to perform in a subspace multiplexing and/or demultiplexing process, and provisioning at least one central processor to perform subspace multiplexing and/or demultiplexing of signals transmitted by and/or received from the selected multiple base transceiver stations, the corresponding aspects of the invention go beyond the mere concept of simply retrieving and combining data using a computer.

In accordance with the disclosure, the various data processors, memories, programs, transceivers, and interfaces, such as depicted in FIGS. 9, 10, 11, and 12, can all be considered to represent means for performing operations and functions that implement the disclosed non-limiting aspects and embodiments.

The computer-readable memories (e.g., memories 920, 1014, 1114, 1216, and 1217) may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The computer processors (e.g., computer processors 910, 1012, 1112, 1214, and 1215) may be of any type suitable to the local technical environment, and may include one or more of general purpose computers, special purpose computers, microprocessors, digital signal processors (DSPs) and processors based on multi-core processor architectures, as non-limiting examples.

Figure 13A:
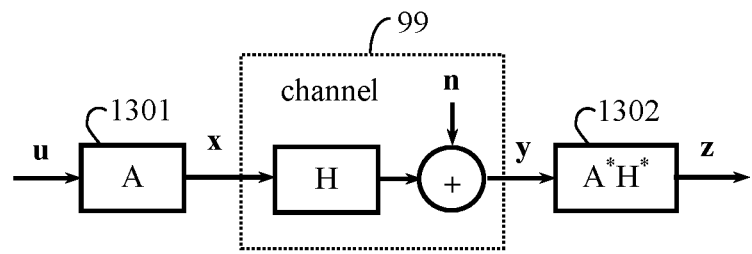
FIG. 13A is a flow diagram of a subspace processing method configured in accordance with some aspects of the disclosure.

In accordance with aspects of the invention depicted and described in the '163 application, FIG. 13A illustrates a subspace processing method configured in accordance with some aspects of the invention. A data-sequence vector u having length N is provided to a transmit filter 1301 before being coupled into a communication channel 99. The channel 99 acts on a transmitted data vector x via an N×N non-singular matrix H and an additive noise vector n having a variance of $N_o/2$. A signal vector y received from the channel 99 is expressed by:

$$y = Hx + n$$

The received signal vector y is processed by a matched filter 1302 to generate an output signal vector z, which is expressed by:

$$z = R_f x + n'$$

where $R_f = H^*H$ and $n' = H^*n$. An estimate of x given z is expressed by:

$$\hat{x} = R_b z + e$$

where $R_b^{-1} = R_f + (N_o/2)R_{xx}^{-1}$, $R_{xx}$ is the covariance of x, and e is the MMSE error. Additional processing, such as any of various adaptive feedback techniques, may be incorporated at the receiver end.

Although sub-space processing is commonly associated with array processing, the '163 application also discloses coding and decoding based on sub-space processing techniques. For example, as a signal is routed from one node to at least one other node in a network, algebraically unique linear codes are applied to the data for each "hop." In one set of embodiments, sub-space processing and CI methods can be combined. Sub-space processing can include frequency-diversity interferometry and/or interferometry between one or more sets of diversity-parameter values including, but not limited to, polarizations, codes, modes, phases, and delays.

Figure 13B:
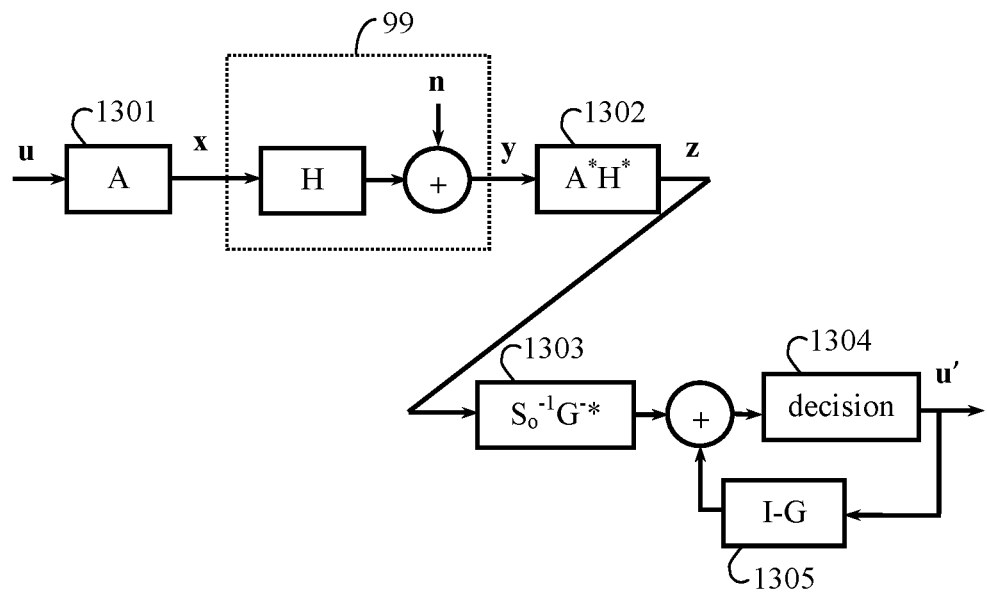
FIG. 13B is a flow diagram of a subspace processing method that employs decision feedback configured in accordance with some aspects of the disclosure.

As disclosed in the '163 application, FIG. 13B illustrates a subspace processing method that employs decision feedback. In this case, Cholesky factorization provides:

$$R_f = G^* S_o G$$

where $S_o$ is a diagonal matrix and G is a monic, upper-diagonal matrix. A decision feedback equalizer includes a feed-forward filter 1303, a decision system 1304, and a feedback filter 1305. An exemplary decision feedback equalization algorithm is represented by:

$$\tilde{z} \approx S_0^{-1} G^{-*} H^* y \text{ for } k = 0, N-1$$

$$\hat{x}_{N-k} \approx \text{decision}\left(\tilde{z}_{N-k} - \sum_{i=1}^{k} g_{N-k, N-k+i} \hat{x}_{N-k+i}\right)$$

end where $g_{ij}$ are elements of G, and $\hat{x}_i$ and $\hat{z}_i$ are elements of $\hat{x}$ and $\hat{z}$, respectively.

A decision feedback equalizer may reorder the received substreams by rearranging the rows and columns of H. For example, a layered processing approach may be employed. Symbols are detected sequentially and interference from previously detected symbols is subtracted. Received vector elements are weighted to null (or reduce) interference from undetected symbols.

Figure 14A:
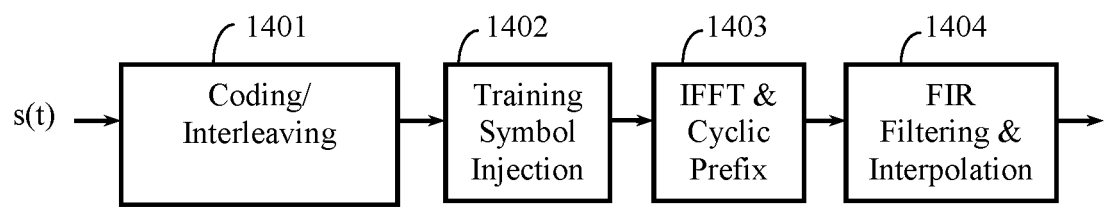
FIGS. 14A and 14B are block diagrams that illustrates method and apparatus implementations of radio transceivers in accordance with aspects of the disclosure.

Method and apparatus implementations of radio transceivers in accordance with aspects of the disclosure, such as radio transmission techniques and radio transmitters employed by UEs and/or base transceiver stations, are depicted in the block diagram of FIG. 14A. The blocks disclosed herein can be steps of a method, functional blocks of a transmitter and/or transmitter system, and/or components of a transmitter and/or transmitter system. In some aspects of the disclosure, such as disclosed in the '850 and '163 applications, a transmitter's components can reside on different devices, such as on different network devices communicatively coupled together via a network.

An exemplary aspect of the disclosure provides for OFDM signaling. An information signal s(t) is encoded and/or interleaved in block 1401. Various types of coding that are known in the art can be employed. For example, in the uplink, it can be desirable to produce a transmission signal with low dynamic range (i.e., peak to average power). Thus, the UEs can employ CI coding on OFDM subcarriers to produce CI-OFDM (also known as a single-carrier OFDM) signals.

The coding/interleaving block 1401 can provide for generating or otherwise acquiring symbol values to be impressed onto the subcarriers. The information signal can be provided with predetermined training symbols in a training symbol injection block 1402. Training symbols can be used for various purposes, including, but not limited to, channel estimation, signal-quality estimation, and synchronization.

An IFFT 1403 (or equivalent process) impresses the coded data symbols onto the subcarriers and adds a cyclic prefix. FIR filtering and interpolation 1404 is performed prior to preparing the resulting signal for transmission into a communication channel, typically via an RF front end (not shown).

Various methods and systems adapted to perform the blocks shown in FIG. 14A can be provided by transmission systems and methods pertaining to the aspects and embodiments of the disclosure. Furthermore, various other signal-processing steps that are typically performed in radio transmitters may be included herein. For example, pre-equalization steps and/or systems may be included in the transmission methods and transmitters disclosed herein.

As described throughout the disclosure, array processing may be performed in transmitters and in transmission methods. Array processing (e.g., subspace multiplexing) can be performed after FIR filtering and interpolation 1404. In some aspects, array processing can be integrated into the coding 1401, IFFT 1403, and/or FIR filtering 1404 blocks.

As used herein, RAN baseband processing is the Physical Layer processing of baseband signals, such as digital baseband signals that will be transmitted in the RAN (after DAC and up-conversion), and digitized baseband signals produced from received radio signals in the RAN. RAN baseband processing is distinguished from IP processing in that RAN baseband processing is particular to the RAN. By way of example, FIR filtering 1404, modulation (e.g., IFFT 1403), and training signal injection 1402 are RAN baseband processes. Coding 1401 can include Physical Layer and/or higher layers. For example, forward-error correction (FEC)

is often employed by the data link layer or higher. It should be appreciated that RAN baseband processing includes RAN multiple access and RAN spread spectrum coding, but not transcoding. Interleaving 1401, as it pertains to distributing data symbols over a physical resource (e.g., multiplexing data symbols on selected bins of a Fourier transform) constitutes RAN baseband processing, whereas interleaving data bits in a data stream does not. Many base station network coordination processes, such as scheduling, handover, routing, power control, and control signaling, are not RAN baseband processing operations. While channel estimation is a RAN baseband processing operation, conveying channel estimates, SNRs, or BERs between base stations is not. While multiple access and multiplexing (i.e., generating the physical signals wherein data is partitioned by time interval, frequency, code space, etc.) constitutes RAN baseband processing, assigning network resources to UEs does not.

Figure 14B:
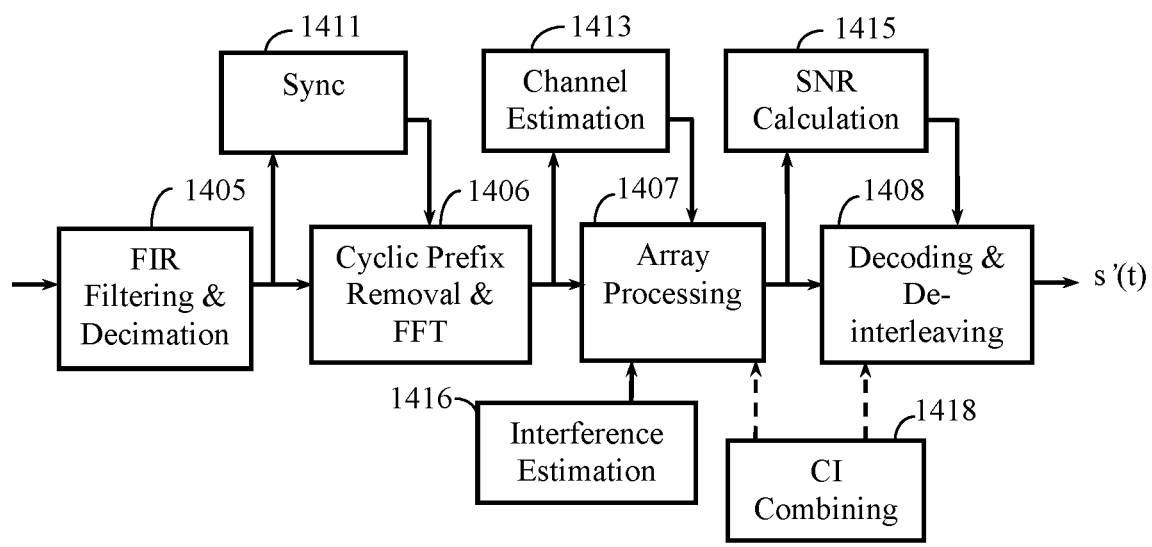

Method and apparatus implementations of radio transceivers in accordance with aspects of the disclosure, such as radio reception techniques and radio receivers employed by UEs and/or base transceiver stations, are depicted in the block diagram of FIG. 14B. The blocks disclosed herein can be steps of a method, functional blocks of a receiver and/or receiver system, and/or components of a receiver and/or receiver system. In some aspects of the disclosure, such as disclosed in the '850 and '163 applications, a receiver's components can reside on different devices, such as on different network devices communicatively coupled together via a network.

Signals received from a communication channel are input to an FIR filtering and decimation block 1405. Filtered signals may be processed in a synchronization step 1411 to control the timing of various reception processes, such as, but not limited to, a cyclic prefix removal and FFT step 1406 and array processing 1407. Complex-amplitude measurements associated with individual subcarriers, such as estimates obtained via known training symbols and/or unknown data symbols, may be used in a channel-estimation step 1413. The channel estimation step 1433 can facilitate the generation of weights (e.g., array-processing and/or CI combining weights).

Array processing 1407 is performed to achieve some preferred combination of system capacity (e.g., subspace demultiplexing) and signal quality (e.g., diversity combining). For example, array processing 1407 may include spatial interferometry multiplexing and/or any other form of array processing. In some aspects, array processing 1407 may be assisted by an interference-estimation step 1416. CI combining 1418 may be performed in conjunction with the array-processing 1407 and/or a decoding and de-interleaving 1408. Alternatively, either or both the array-processing 1407 and the decoding and de-interleaving 1408 may perform CI combining 1418. The decoding and de-interleaving step 1408 performs any necessary de-interleaving of data symbols received from the array-processing 1407 prior to, or following decoding 1408. Decoding 1408 can include channel, multiple access, spread spectrum, encryption, and/or other decoding processes.

Figure 15:
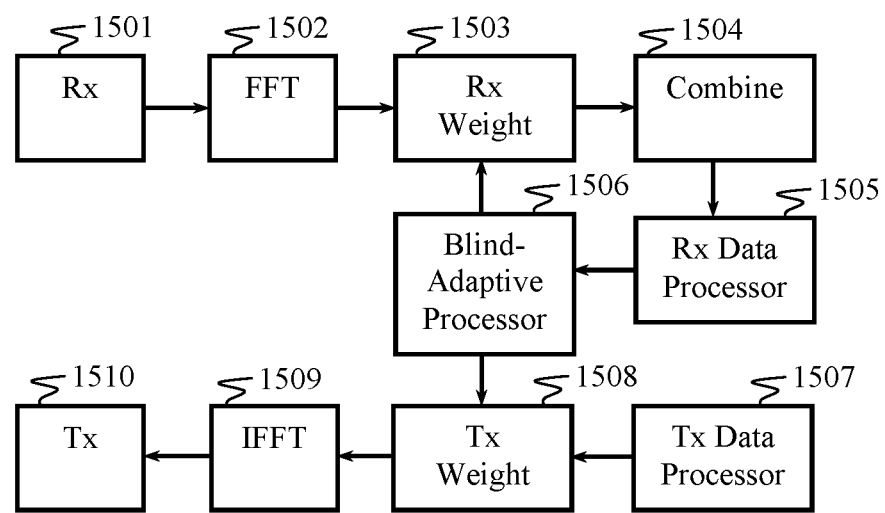
FIG. 15 is a block diagram of a transceiver in accordance with some aspects of the disclosure.

FIG. 15 is a block diagram of a transceiver in accordance with some aspects of the disclosure. A receiver system 1501 is configured to couple a received signal from a communication channel. One or more typical receiver-side signal processing techniques (such as filtering, mixing, down conversion, amplification, A/D conversion, etc.) may be performed on the received signal. A filter bank, such as an FFT 1502, separates the received signal into a plurality of frequency components. If the received signal is an OFDM signal, the FFT 1502 retrieves a symbol measurement for each OFDM subcarrier. The components are provided with weights in a receiver weighting system 1503. The weights may include one or more types of weights, such as channel-compensation weights, decoding weights, spatial de-multiplexing weights, multi-user detection weights, array-processing weights, wavelet-processing weights, etc. The weighted components are combined in a combiner 1504. The combined signals may be processed in a data processor 1505. In some aspects, the data processor 1505 may be part of a blind-adaptive processor 1506 that is adapted to generate and/or adapt weights relative to one or more performance parameters, such as channel estimates, confidence measures, data estimates, signal power, probability of error, BER, SNR, SNIR, etc.

In one aspect, the blind-adaptive processor 1506 processes information-bearing CI symbol measurements produced by the FFT 1502. The processor 1506 may work in conjunction with the combiner 1504 to combine the measurements and estimate transmitted data. In some aspects, the combining process may include wavelet processing. The processor 1506 may work in conjunction with the data processor 1505 to provide a channel estimate based on data estimates. In some aspects, the processor 1506 can employ a time-varying channel-estimation filter. In some aspects, the processor 1506 provides channel compensation, which may be based on a statistical characterization of interference, such as a covariance matrix.

In some applications, the processor 1506 provides predistortion (i.e., pre-coding) weights to transmitted signals. A data stream is optionally processed by a transmit data processor 1507. A transmitter weighting system 1508 is configured to weight data symbols provided to frequency bins of a frequency-domain-to-time-domain converter, such as an IFFT 1509. Time-domain signals generated by the IFFT 1509 are provided to a transmission system configured to prepare the time-domain signals for transmission into a communication channel.

Figure 16:
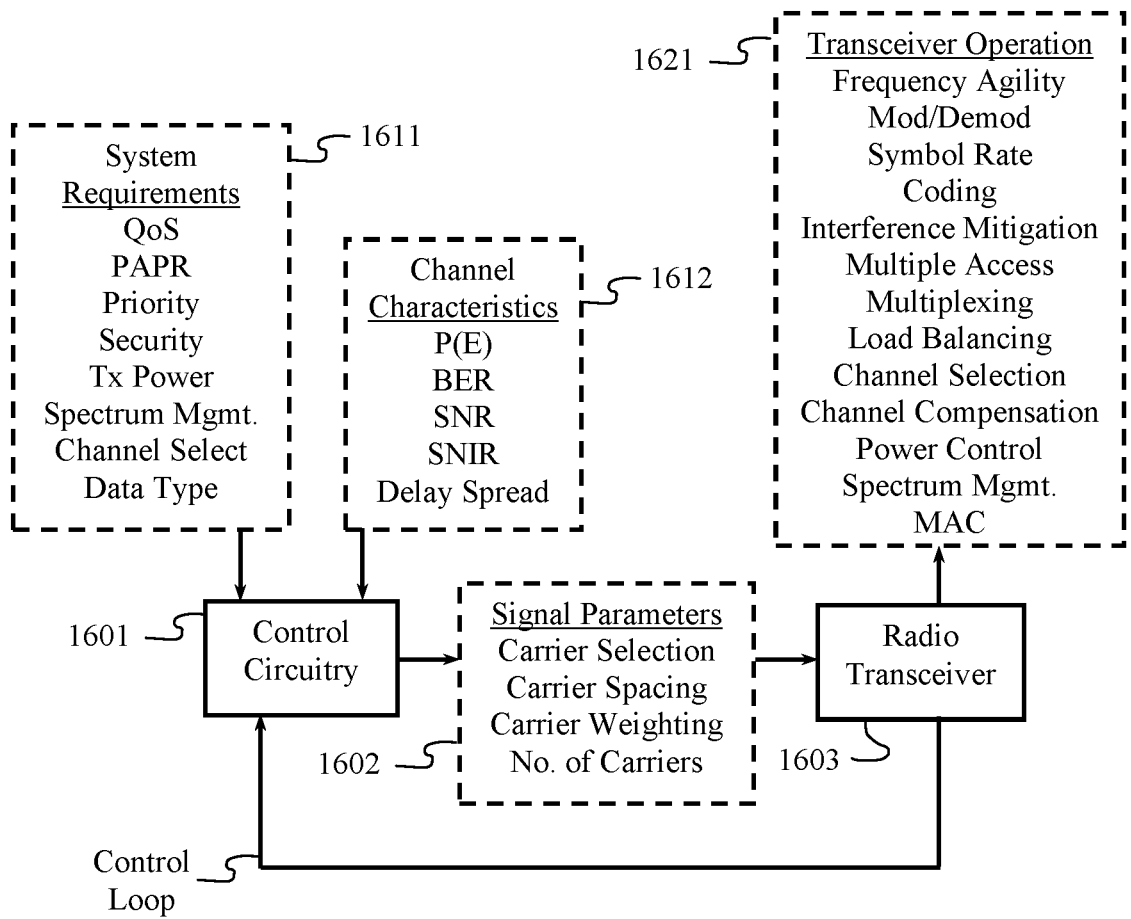
FIG. 16 is a block diagram depicting functional aspects of transceivers according to aspects of the disclosure.

In accordance with aspects of the disclosure, transceiver operating characteristics can be adaptable, such as indicated in the block diagram depicted in FIG. 16. In one aspect, a control circuit 1601 is configured to receive one or more system requirements 1611 and, optionally, one or more channel characteristics 1612. The control circuit 1601 can adapt one or more signal parameters 1602 employed by a radio transceiver 1603, such as radio transceivers employed by UEs, base transceiver stations, and/or central processors. Signal parameter adaptation and/or selection affect one or more transceiver operating parameters 1621.

In one aspect, the control circuitry 1601 may scale a transmitted bit rate by scaling the symbol duration, the number of subcarriers, the subcarrier spacing, and/or the number of bits per symbol per subcarrier. This permits the transceiver 1603 to operate in different communications environments, which may require varying operating parameters and/or characteristics. By adapting the operating parameters and/or characteristics of the transceiver 1603, the control circuitry 1601 can dynamically change the radio signals, thereby providing for compatibility or improving performance. For example, dynamically scaling the bit rate enables widely varying signal bandwidths, adjustment of delay-spread tolerances, and adaptability to different SNR requirements. An adaptable transceiver system can be particularly useful for mobile wireless communications, as well as other applications that support a variety of services in a variety of environments.

In accordance with some aspects of the disclosure, an OFDM system may be configured to select the number of subcarriers and a variable symbol duration. The control circuitry can dynamically select the number of subcarriers to decrease the signal bandwidth and the transmission rate while delay-spread tolerance remains the same. The control circuitry 1601 can also dynamically increase the symbol duration to decrease the transmission rate and the signal bandwidth and provide an increase in delay-spread tolerance. In some aspects, the control circuitry 1601 can be adapted to adjust the transmission rate by changing the type of modulation. In accordance with other aspects, variable transmission rates can be achieved by using adaptive coding wherein different coding schemes are selected to improve the link reliability and/or to decrease the peak-to-average power ratio.

In accordance with yet other aspects of the disclosure, adaptable transmission rates permit asymmetric data rates throughout the network. For example, individual UEs can be allocated varying sets of subcarriers depending on their data bandwidth needs. Additionally, during data downloading, for example, a mobile unit could have a larger downlink data rate than uplink data rate.

In accordance with some aspects of the disclosure, base transceiver stations employ adaptive antenna processing wherein UEs feedback their channel estimates via the uplink when uplink and downlink channel characteristics are not identical. In some aspects, power control can be performed on individual subcarriers or on groups of subcarriers. Alternatively, or in addition to power control, certain subcarriers may be selected to optimize one or more operational parameters, such as throughput, probability of error, received signal power, transmitter power efficiency, SNR, QOS, etc.

Sets of subcarriers may be selected with respect to the types of services being provided. For example, different qualities of service corresponding to different-priority links and/or different link services may be criteria for selecting subcarriers. In one case, subcarriers having little distortion and interference may be selected for services (such as data links) that do not tolerate high BER. In another case, a transmission may be divided into sections and sent on two or more groups of subcarriers (or channels). In some aspects, a more important section, such as addressing information, may be sent on higher-quality subchannels than subchannels on which payload data is sent. Addressing and other control information is typically less tolerant to errors than payload data. Thus, important parts of a transmission may be transmitted on higher-quality subspaces and/or on subcarriers having little distortion and fading.

In some aspects of the disclosure, various demand-assigned protocols govern the utilization of the bus medium. As used herein, the term bus medium, or bus, refers to a communication system or communication resources employed to communicatively couple together distributed transceiver components in a manner that resembles the functions of a computer bus. This expression covers all related hardware components (wire, optical fiber, etc.) and software, including communication protocols. By way of example, a bus can comprise a fronthaul network, a backhaul network, a local area network, and/or a wide area network. In one aspect, a bus communicatively couples together internal components residing in different networked devices, wherein the internal components are configured (such as by a central processor or via some distributed processing means) to function together as a single transceiver or transceiver system. In such aspects, a bus can comprise communication pathways, internal networks, etc. inside the networked devices.

As disclosed herein, software instructions configured to perform methods in accordance with aspects of the disclosure can provide various combinations of object-oriented design features. For example, a radio transceiver system comprising multiple components distributed across multiple networked devices may be provided with an abstraction interface wherein the multiple different constituent components are mapped to a single abstract device. Thus, the details of how the radio transceiver system is implemented (for example, whether the radio transceiver is a single discrete device or comprised of multiple constituent components communicatively coupled together via a bus) can be hidden from systems and operations configured to employ the radio transceiver system. In one example, MIMO processing algorithms can be employed across the multiple constituent components in substantially the same manner as would be employed in a single device comprising multiple antennas. As described herein, MIMO processing algorithms can include various types of algorithms, including, but not limited to, MRC, MMSE, ZF, and/or successive interference cancellation. In some aspects, certain details of the radio transceiver system implementation are provided to the abstract device. For example, certain implementation details (or at least the effects of the implementation) can help a MIMO processor compensate for latencies in the bus communications between cooperating devices in a Cooperative-MIMO configuration.

In accordance with one aspect of the disclosure, each data communication device (DCD) of a set of DCDs in a network communicates with a central access point (AP). Multiple DCDs may request access from the AP in the same request access (RA) burst. In one aspect, each of the multiple DCDs transmits its access request to the AP within a frequency-domain subchannel in the RA burst that is orthogonal to the frequency domain subchannels used by the other DCDs requesting access. In another aspect, each of the multiple DCDs transmits its access request to the AP within a subspace channel in the RA burst that is orthogonal to the subspace channels used by the other DCDs requesting access. Alternatively, other orthogonal diversity-parameter values may be employed. In some aspects, each DCD provides channel training information in the RA burst to allow the AP and/or DCD to adapt to variations in channel characteristics.

Figure 17:
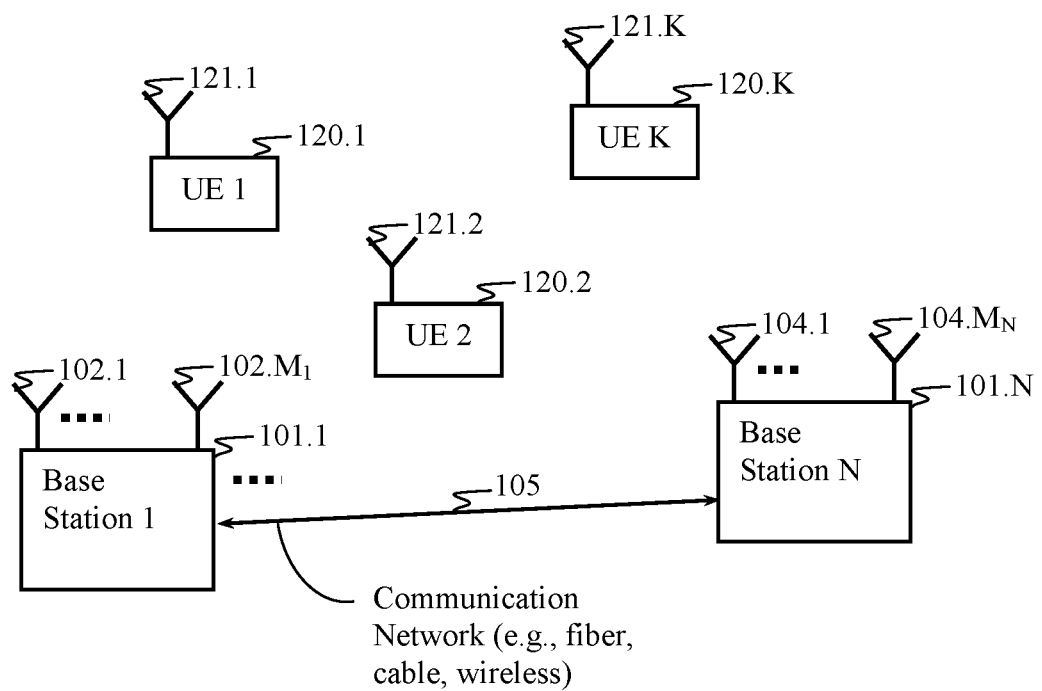
FIG. 17 depicts a network comprising multiple geographically distributed base transceiver stations communicatively coupled together via a fronthaul network. The base transceiver stations are configurable to jointly process signals in a radio access channel that serves multiple UEs. In some aspects of the disclosure, at least one of the base transceiver stations coordinates joint processing.

FIG. 17 is a block diagram depicting a plurality K of UEs 120.1-120.K (e.g., mobile or fixed subscriber units) in a wireless network comprising a plurality N of base transceiver stations (e.g., access points) 101.1-101.N. At least one of the UEs 120.1-120.K is configured to transmit a pilot signal or known training signal that is received at the base transceiver stations 101.1-101.N. The propagation environment ensures that the set of pilot signals received by the base transceiver stations 101.1-101.N is unique for each UE's 120.1-120.K location. In some aspects of the disclosure, the uniqueness of the propagation environment can be exploited to provide or enhance coding. The base transceiver stations 101.1-101.N are adapted to process the received pilot signals. Processing operations may depend on various characteristics of the received pilot signals, including absolute and/or relative signal power levels. For example, a predetermined set of the base transceiver stations 101.1-101.N may be selected to process signals for a given UE based on the received pilot signal power.

In one aspect, at least one of the base transceiver stations 101.1-101.N is configured to perform channel analysis to characterize the propagation environment of the transmissions between each UE 120.1-120.K and the base transceiver station(s) 101.1-101.N. Channel analysis may include delay-profile and/or flat-fading characterizations. In some aspects of the disclosure, the propagation environment is employed as a unique identifier for each UE 120.1-120.K. In some aspects, weights calculated from channel estimates may be utilized in multiple-access codes, encryption codes, and/or authentication and verification procedures.

In some aspects of the disclosure, channel analysis is used to generate filter weights and/or array-processing weights at the base transceiver stations 101.1-101.N to process received and/or transmitted signals. Such weights may be generated using various algorithms, such as MRC, MMSE, ZF, and/or successive interference cancellation, as well as others. The base transceiver stations 101.1-101.N may comprise single-antenna systems or multi-antenna systems, such as antenna arrays. Received signals may be compared to some local or global timing reference, such as to analyze phase offsets and/or signal timing.

In another aspect of the disclosure, the base transceiver stations 101.1-101.N are configured to transmit pre-coded signals to the UEs 120.1-120.K. For example, the transmissions can be pre-coded to exploit the multipath environment between the access points 10011 to 10015 and the UEs 120.1-120.K to constructively combine at the UEs 120.1-120.K.

In one set of aspects, transmission (i.e., pre-coding) weights are generated from the reciprocal of a channel matrix that characterizes the propagation environment between a plurality of the base transceiver stations 101.1-101.N and at least one of the UEs 120.1-120.K. Channel (i.e., pre-coding) weights may be generated via any combination of deterministic (i.e., training) and blind-adaptive processing. Channel weights may be selected and/or adapted to optimize coherent combining of the base transceiver stations' 101.1-101.N transmissions at one or more of the UEs 120.1-120.K. Similarly, the channel weights may be selected and/or adapted to optimize coherent combining of signals received by the base transceiver stations' 101.1-101.N from one or more of the UEs 120.1-120.K. Any of various combining techniques may be employed.

In some aspects, channel weights are adapted to generate beam-pattern nulls at one or more of the UEs 120.1-120.K or other transceivers. Channel weights may be adapted to provide time-varying channel compensation. Thus, beam steering, null steering, or any other time-dependent adaptive array processing may be performed. Appropriate combinations of carrier selection and carrier weighting may be provided to achieve simultaneous directionality (e.g., spatial multiplexing) and diversity benefits. In some applications, any of the base transceiver stations 101.1-101.N may be replaced by UEs configured to function as routers, relays, and/or array elements of an adaptive transceiver array.

Figure 18:
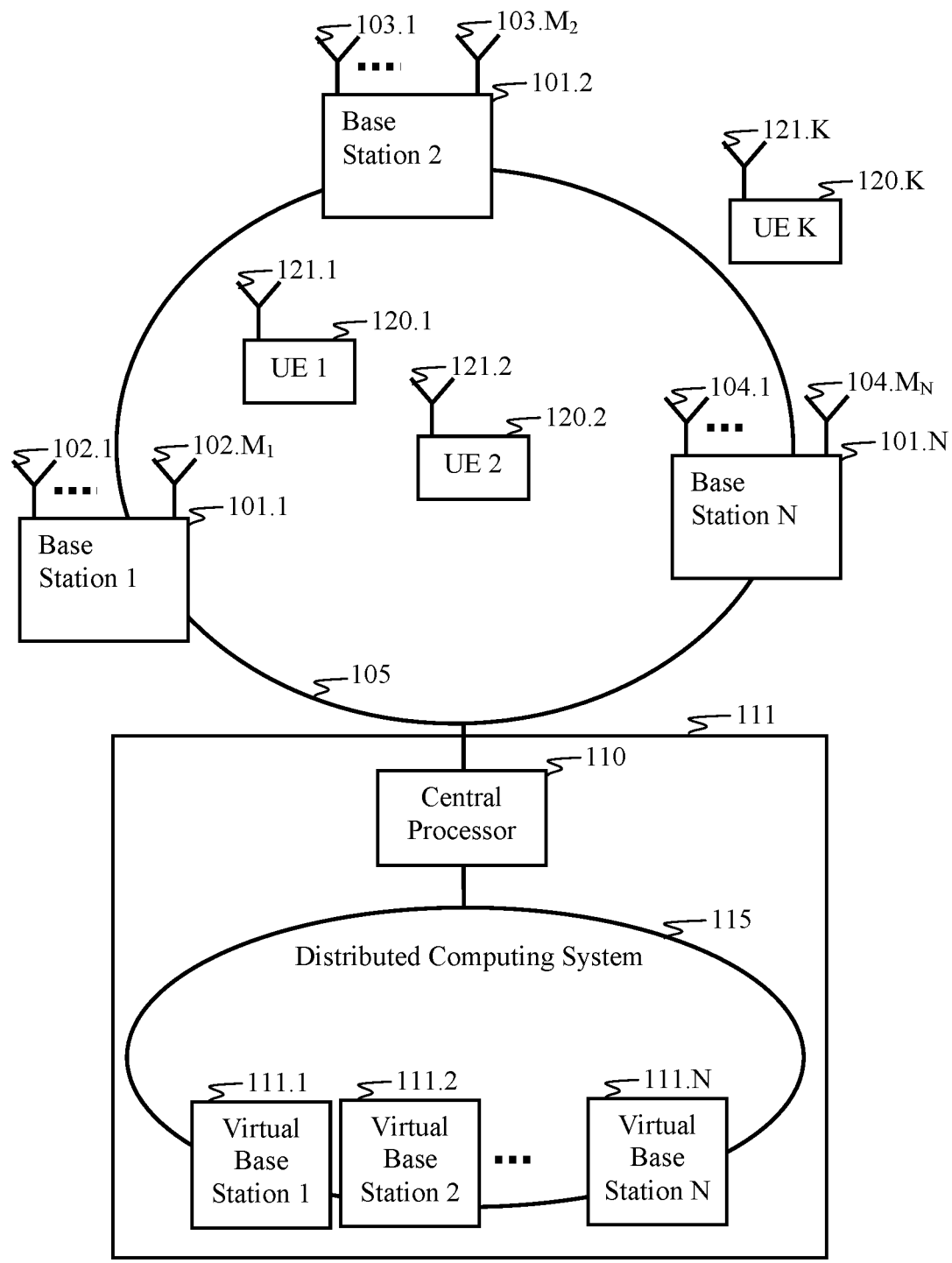
FIG. 18 depicts a cloud radio access network comprising multiple geographically distributed base transceiver stations communicatively coupled to a central processor via a fronthaul network, wherein the central processor comprises a distributed computing system. In such aspects, combinations of central processing and distributed computing can provide for pooling and virtualizing base station processing, such as via an SDR.

FIG. 18 is a block diagram of a RAN comprising base transceiver stations 101.1-101.N configured in accordance with an aspect of the invention. The fronthaul network 105 can comprise a wireless, fiber optic, and/or wireline network that communicatively couples the base transceiver stations 101.1-101.N to a central processor 110. The central processor 110 is configured to process signals received from and transmitted by the base transceiver stations 101.1-101.N.

In accordance with one aspect of the disclosure in the '163 application, the central processor 110 comprises a distributed computing system 111. In accordance with another aspect of the disclosure in the '163 application, the central processor 110 is replaced by the distributed computing system 111. In one aspect, the distributed computing system 111 comprises a plurality of processors, which may be geographically distributed. As used herein, the term "processor" can refer to a computer processor, a computer, a server, a central processing unit (CPU), a core, a microprocessor, and/or other terminology that indicates electronic circuitry configurable for carrying out instructions of a computer program.

The processors are communicatively coupled together via at least one network, such as a backhaul network 115. The backhaul network 115 can comprise an optical fiber network, a wireline network (e.g., Ethernet or other cable links), a wireless network, or any combination thereof. In one aspect, the processors are programmed to function as a plurality N of virtual base stations 111.1-111.N. By way of example, each virtual base stations 111.1-111.N may comprise one or more of the processors and perform base station processing operations that would ordinarily be performed by one or more of the corresponding base stations 101.1-101.N. Specifically, virtual base stations can be implemented via software that programs general-purpose processors. For example, an SDR platform virtualizes baseband processing equipment, such as modulators, demodulators, multiplexers, demultiplexers, coders, decoders, etc., by replacing such electronic devices with one or more virtual devices, wherein computing tasks perform the functions of each electronic device. In computing, virtualization refers to the act of creating a virtual (rather than actual) version of something, including (but not limited to) a virtual computer hardware platform, operating system (OS), storage device, or computer network resources.

In accordance with the art of distributed computing, a virtual base station's functions can be implemented across multiple ones of the plurality of processors. For example, workloads may be distributed across multiple processor cores. In some aspects, functions for more than one base station are performed by one of the processors.

As used herein, distributed computing refers to the use of distributed systems to solve computational problems. In distributed computing, a problem is divided into multiple tasks, and the tasks are solved by multiple computers which communicate with each other via message passing. A computer program that runs in a distributed system is referred to as a distributed program. An algorithm that is processed by multiple constituent components of a distributed system is referred to as a distributed algorithm. In a distributed computing system, there are several autonomous computational entities, each of which has its own local memory.

In accordance with aspects of the disclosure, the computational entities (which are typically referred to as computers, processors, cores, CPUs, nodes, etc.) can be geographically distributed and communicate with each other via message passing. In some aspects, message passing is performed on a fronthaul or backhaul network. The distributed computing system can consist of different types of computers and network links, and the system (e.g., network topology, network latency, number of computers, etc.) may change during the execution of a distributed program. In one aspect, a distributed computing system is configured to solve a computational problem. In another aspect, a distributed computing system is configured to coordinate and schedule the use of shared communication resources between network devices.

A distributed computing system can comprise a grid computing system (e.g., a collection of computer resources from multiple locations configured to reach a common goal, which may be referred to as a super virtual computer). In some aspects, a distributed computing system comprises a computer cluster which relies on centralized management that makes the nodes available as orchestrated shared servers. In some aspects, a distributed computing system comprises a peer-to-peer computing system wherein computing and/or networking comprises a distributed application architecture that partitions tasks and/or workloads between peers. Such distributed peer-to-peer computing systems are disclosed in the '107 application. In some aspects, peers are equally privileged, equipotent participants in the application. They are said to form a peer-to-peer network of nodes. Peers make a portion of their resources, such as processing power, disk storage, network bandwidth, etc., available to other network participants without the need for central coordination by servers or stable hosts. Peers can be either or both suppliers and consumers of resources.

As disclosed in the patents and patent applications incorporated by reference herein, and particularly with respect to aspects of Cooperative-MIMO systems and methods, network nodes can function as either or both clients and servers. Furthermore, when wireless network nodes cooperate in subspace processing, they create network resources, such as subspace (i.e., spatial multiplexing) channels, performance gains, RAN coverage area, etc. Even when UEs cooperate as a client array (e.g., a UE cluster) in a Cooperative-MIMO implementation, each UE can improve the data bandwidth, quality of service, range, and power efficiency of the other UEs in the array, or cluster. Thus, in some aspects of a Cooperative-MIMO system, UEs can extend the network infrastructure, such as to increase per-client data bandwidth, the number of clients served, coverage area, and/or quality of service without requiring substantial capital outlays from network operator to upgrade the base station network.

In Cooperative-MIMO systems, mobile UEs can opportunistically join together via a peer-to-peer overlay network for client-side MIMO processing. In some aspects, UEs can join base transceiver arrays via an overlay network to assist in server-side MIMO processing. Due to random movement of UEs, aspects of the invention do not impose a particular structure on the overlay network. Because there is no structure globally imposed upon them, unstructured networks are easy to build and allow for localized optimizations to different regions of the overlay. Also, in some aspects, because the role of all peers in the network is the same, unstructured networks are highly robust in the face of high rates of churn (i.e., when peers are frequently joining and leaving the network).

In accordance with some aspects of the disclosure, the base transceiver stations 101.1-101.N are "dumb terminals," wherein base station signal processing (for example, the baseband processing) is performed by the central processor 110 (which may include the distributed computing system 111). Thus, in some aspects, the base transceiver stations 101.1-101.N are simply radio remote units. For example, the base transceiver stations 101.1-101.N might perform only basic signal-processing functions, such as RF processing (i.e., radio front-end processing), which can include frequency conversion and (optionally) ADC/DAC functions, while the central processor 110 (which may include the distributed computing system 111) performs baseband processing, including channel analysis and generating base transceiver MIMO weights.

In one aspect, the central processor 110 coordinates or performs baseband signal processing corresponding to base station operations, whereas the base transceivers 101.1-101.N provide only RF front end signal processing, including frequency conversion, and optionally, ADC/DAC. The central processor can perform waveform shaping, error detection, error correction, power control, channel selection, multiple access control, multiplexing, modulation, formatting, synchronization, coding, etc. for the plurality of base transceivers (i.e., access points) communicatively coupled to the central processor via the fronthaul network. In some aspects of the disclosure, the central processor 110 provides for base-station functionality, such as power control, code assignments, and synchronization. The central processor 110 may perform network load balancing, including providing for balancing transmission power, bandwidth, and/or processing requirements across the radio network. Centralizing the processing resources (i.e., pooling those resources) facilitates management of the system, and implementing the processing by employing multiple processors configured to work together (such as disclosed in the '163 application) enables a scalable system of multiple independent computing devices, wherein idle computing resources can be allocated and used more efficiently.

Some aspects allow base station processing resources (e.g., the processors in the distributed computing system 111) and the remote RF units (e.g., the base transceiver stations 101.1-101.N) to be deployed separately. For example, RAN coverage, capacity, and/or data bandwidth per UE can be improved by adding base transceiver stations, and then the SDR platform dynamically adapts to the new RAN base station configuration. Similarly, the SDR platform can adapt to the loss of one or more of the base transceiver stations 101.1-101.N. The distributed computing system (e.g., cloud network) 111 can adapt to varying processing loads by allocating computing resources as needed. Furthermore, system upgrades, such as new transmission protocols, can be easily implemented via software upgrades to the SDR platform.

In some aspects, base-station functionality is controlled by individual base transceiver stations and/or UEs assigned to act as base stations. Array processing may be performed in a distributed sense wherein channel estimation, weight calculation, and optionally, other network processing functions (such as load balancing) are computed by a plurality of spatially separated processors. In some aspects, access points and/or subscriber units are configured to work together to perform computational processing. A central processor (such as central processor 110) may optionally control data flow and processing assignments throughout the network.

As disclosed in the '850 application, the system depicted in FIG. 18 provides system performance benefits by centralizing (e.g., pooling) much of the equipment (and/or signal processing) typically employed at the cell sites. Cost reduction is another motivation for centralizing the radio access network, as most of a cellular network's ownership costs comprise operating costs, including site rental, power, and support and maintenance expenses. Thus, instead of distributing baseband processing equipment at the edge of the network as in conventional cellular networks, centralizing the radio access network at the central processor 110 can greatly reduce capital expenditures to build out and upgrade the radio access network, as well as reduce operating expenditures.

As disclosed in the '163 application, providing for distributed computing at the central processor 110 provides network function virtualization to the radio access network. Benefits that can be realized with some aspects of the disclosure include cost reduction from pooling and virtualizing baseband processing. This can eliminate the need to provision for peak capacity on a per-site basis, thus reducing processing requirements. Furthermore, instead of requiring dedicated base station hardware, some of the disclosed aspects provide for the use of commercial (e.g., general-purpose) servers running software.

As disclosed in the patents and applications incorporated by reference herein, other types of networks, including wireless networks, can connect the base transceiver stations 101.1-101.N. One of the advantages of employing the optical fiber fronthaul 105 is that optical fiber can provide the high capacity and low latency required by many aspects of the invention. For example, when a large number of baseband processors are co-located at the central processor 110, the amount of data bandwidth in the fronthaul and the synchronization requirements between base transceiver stations 101.1-101.N can increase substantially when high RF bandwidth and MIMO are employed. Different aspects of the invention can provide for different functional splits between centralized and distributed functions.

Some aspects of the invention can reduce fronthaul requirements by implementing at least some of the Physical Layer processing at the base transceiver stations 101.1-101.N while implementing other processing (e.g., higher layer processing, or the higher layer processing plus some of the Physical layer processing) at the central processor 110. Thus, in some aspects of the invention, one or more of the base transceiver stations 101.1-101.N depicted in the figures may be replaced by UEs adapted to perform as routers, repeaters, and/or elements of an antenna array.

In one aspect of the disclosure, the base station network comprising base transceiver stations 101.1-101.N is adapted to operate as an antenna array. In such aspects, a portion of the network may be adapted to serve each particular UE. The central processor 110 and/or the base transceiver stations 101.1-101.N may be configured to perform other signal-processing operations, such as, but not limited to, waveform shaping, error detection, error correction, power control, channel selection, multiple access control, multiplexing, modulation, formatting, synchronization, coding, etc. In some aspects of the disclosure, the central processor 110 is replaced by a distributed computing system. In some aspects, the distributed computing system may comprise a plurality of the UEs 120.1-120.K, repeaters (not shown), and/or the base transceiver stations 101.1-101.N.

Figure 19:
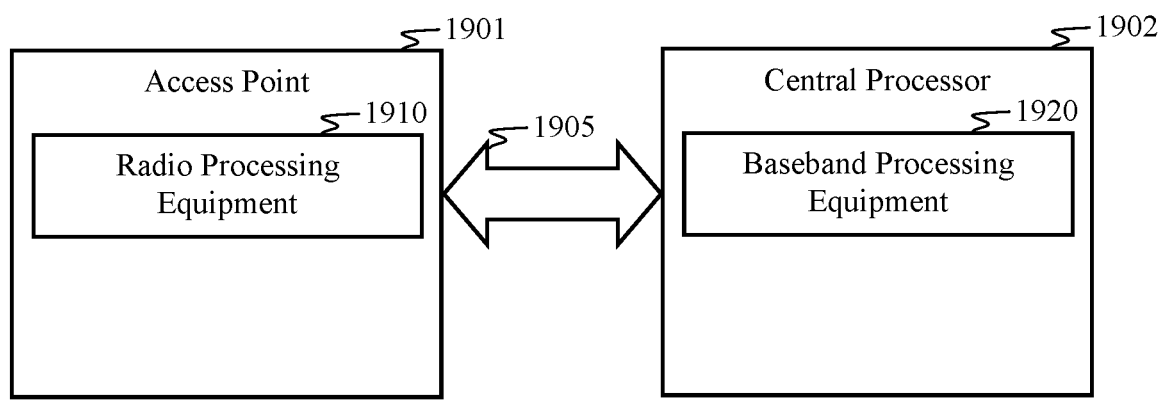
FIG. 19 depicts a coordinated multipoint network wherein a plurality of access points are communicatively coupled to a central processor via a fronthaul network, and wherein at least some of the access points' signal processing functions (such as RAN baseband processing) are pooled at the central processor. Apparatus implementations corresponding to this aspect of the disclosure include providing for relocating access point baseband processing equipment to the central processor, which can greatly reduce the capital expense and operating expense associated with the access point network.

FIG. 19 is a block diagram that depicts apparatus and method aspects of the disclosure. Access points (e.g., access point 1901) and at least one access controller (e.g., central processor 1902) are connected via a fronthaul network 1905, which may comprise an optical fiber, wireless, and/or wireline network. In some aspects, the fronthaul network 1905 may comprise standard interfaces, such as Common Public Radio Interface (CPRI) or Open Base Station Architecture Initiative (OBSAI). The access point 1901 comprises radio processing equipment 1910, and the central processor 1902 comprises baseband processing equipment 1920.

In accordance with some aspects of the disclosure, the entire baseband processing is carried out in the central processor 1902 while there may be no baseband processing performed at the access points 1901. For example, the radio processing equipment 1910 may comprise analog front end circuitry and digital front end circuitry, and the baseband processing equipment 1920 comprises circuitry for the layers L1 (i.e., the Physical Layer) and higher layers. In one aspect of the invention, the radio processing equipment 1910 may perform basic signal-processing tasks, such as amplification, RF filtering, frequency conversion, as well as other RF signal-processing functions. The baseband processing equipment 1920 may perform baseband processing, including modulation/demodulation, combining, channel characterization, power control, other system control functions, quality factor analysis, coding, array processing etc.

It should also be appreciated that in some aspects, such as supported by the disclosures of the patents and patent applications that are incorporated by reference, that either or both radio processing equipment 1910 and the baseband processing equipment 1920 may each be implemented with one or more processors and one or more memories including computer program code, the computer program code comprising instruction configured to cause the processor(s) to perform the corresponding radio processing and/or baseband processing functions.

In accordance with some aspects of the disclosure, physical-layer baseband processing is performed on an SDR platform, which can be implemented on a distributed (e.g., cloud) computing system. Physical-layer baseband processing can include multiplexing, de-multiplexing, modulation, de-modulation, and/or equalization.

In one aspect of the invention, the access point 1901 is a device that serves as the air interface to the user equipment and implements analog radio frequency functions of an eNodeB. The access point 1901 may include one or more antennas for communicating with one or more UEs, and may include support for a variety of antenna types and configurations including, but not limited to, single omni-directional antennas and MIMO arrays of directional antennas. Exemplary functions that may be performed by the access point 1901 include digital-to-analog (D/A) conversion, analog-to-digital (A/D) conversion, carrier multiplexing, power amplification, and RF filtering. The central processor 1902 may be an LTE network device configured to implement radio functions of the digital baseband domain. These functions may include, but are not limited to, radio base station control and management, MIMO processing, and channel coding and de-coding.

FIG. 20A is a flow chart depicting methods in accordance with aspects of the disclosure. Each of a plurality of geographically distributed access points performs RF processing of signals received from UEs in a radio access network 2001, such as a WWAN. The resulting RF-processed signals are communicated to a central processor via a fronthaul network 2002, such as an optical fiber network. The central processor collects RF-processed signals from the plurality of geographically distributed access points 2003 and performs baseband processing of the collected signals 2004. In one aspect of the disclosure, the baseband processing 2004 comprises distributed computing performed by a distributed computing system. For example, the central processor may configure a plurality of processors to perform baseband processing.

FIG. 20B is a flow chart depicting methods in accordance with aspects of the disclosure. A central processor performs baseband processing of UE signals 2011 to be transmitted by a plurality of geographically distributed access points to UEs served by a radio access network. In one aspect of the disclosure, the baseband processing 2011 comprises distributed computing performed by a distributed computing system (e.g., a cloud). For example, the central processor may configure a plurality of processors to perform baseband processing.

The resulting baseband-processed signals are communicated to the plurality of geographically distributed access points via a fronthaul network 2012. The central processor may coordinate the plurality of geographically distributed access points to transmit signals in the radio access network to the UEs 2013. Each of the access points performs RF processing of the baseband-processed signals 2014 prior to transmitting the signals to the UEs.

In some aspects of the disclosure, the access point antennas are connected to the central processor via optical fiber. Various types of fronthaul networks may be employed, including optical fiber, wireline (e.g., cable), wireless (e.g., radio), and any combination thereof. In wireless backhaul networks, such as those disclosed in the '163 application, digitized RF signals from various nodes can be aggregated, which allows the building of networks in chain, tree, and ring topologies.

In some aspects, the access point antennas can be considered as radio remote units, and the central processor can be considered as a central hub unit. The baseband signals from multiple access points can be gathered and processed together in the central processor to provide distributed antenna system MIMO benefits, such as spatial multiplexing gain. Similar types of distributed antenna system MIMO processing (e.g., pre-coding) can be performed at the central processor for signals to be transmitted by the access points.

In one aspect of the disclosure, downlink data is transmitted via MRC spatial multiplexing with power control. It should be appreciated that different aspects can effect various types of combining via pre-coding configured with respect to signal propagation measurements in the RAN channel. Pre-coding may comprise MRC, ZF, MMSE, and/or any of a variety of adaptive techniques, including blind adaptive techniques disclosed in the '163 and '107 applications. Coding and power control can comprise open-loop and closed-loop methods. In some aspects, UEs may be selected by the central processor and scheduled for array processing based on quality metrics (e.g., channel conditions, power measurements, SNR, etc.).

Figure 21:
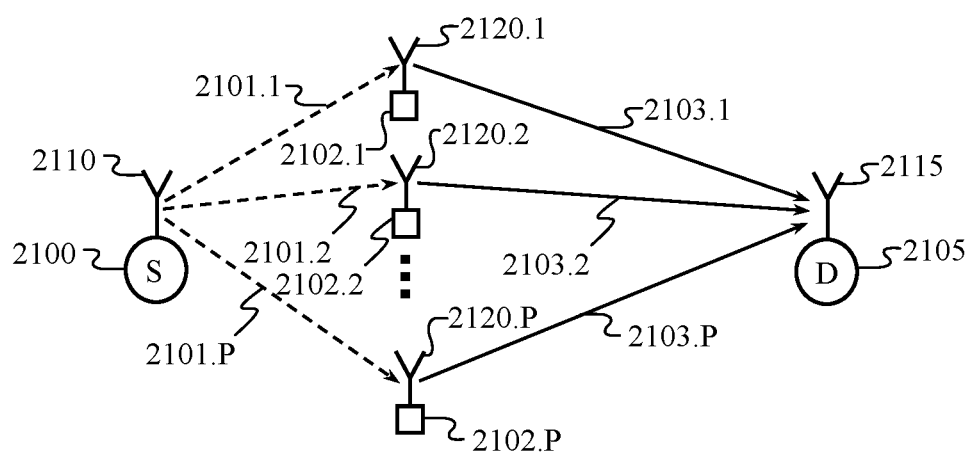
FIG. 21 depicts a network topology comprising a source node, a destination node, and a plurality of intervening nodes. This and other network topologies shown herein depict some aspects of the disclosure, including cooperative-MIMO, cooperative subspace coding along multiple network paths, simultaneously employing multiple network paths as a single communication link, providing for reusing spectral resources across multiple links, etc.

In accordance with some aspects of the disclosure, a network topology is depicted in FIG. 21 comprising a source node 2100, a destination node 2105, and a plurality of intervening nodes 2102.1-2102.P. The network nodes 2100, 2105, and 2102.1-2102.P may comprise UEs and/or base transceiver stations. The network nodes 2102.1-2102.P and any intervening nodes (not shown here, but depicted in the drawings of the '163 application) may be configured to function as routers and/or relays.

In accordance with some aspects of the disclosure, as the network evolves, the nodes adapt their routing tables. As network loads change, the nodes can perform load balancing, such as to ensure a predetermined range of bandwidth and transmit-power loads across the network. One or more paths to the destination node 2105 can be selected or modified to optimize loads across the network, minimize transmission power, and/or ensure received signal quality. In one aspect of the disclosure, multiple transmission paths to the destination node 2105 are employed to achieve one or more objectives, such as reducing the effects of fading, reducing transmission power in some of the relays, and/or distributing transmission power across the network.

Information intended for the destination node 2105 can be passed through the network along one or more intervening nodes 2102.1-2102.P. One or more of the intervening nodes (e.g., nodes 2102.1-2102.P) can provide a final radio link to the destination node 2105. For the sake of simplicity, FIG. 21 depicts a plurality P of transmission paths 2101.1-2101.P from the source node 2100 to the intervening nodes 2102.1-2102.P. It should be appreciated that each transmission path can comprise multipath components. It should be appreciated that in some aspects, one or more intervening nodes (not shown) may be utilized between the source node 2100 and nodes 2102.1-2102.P.

The source node 2100 comprises an antenna system 2110, which may include one or more antennas. Similarly, each of the intervening nodes 2102.1-2102.P comprises an antenna system (2120.1-2120.P, respectively) which may include one or more antennas. When multiple antennas are employed by a node (e.g., nodes 2100, 2105, and/or 2102.1-2102.P), the node may perform any combination of diversity processing and spatial multiplexing with respect to its antenna system.

In accordance with one aspect of the invention, the source node 2100 selects a plurality P of the intervening nodes 2102.1-2102.P to provide cooperative subspace processing, such as to increase the rank of the subspace pre-coding matrix and increase the number of linearly independent coded transmissions. In a first aspect of the disclosure, the transmission paths 2101.1-2101.P comprise the radio access network. In a second aspect of the disclosure, the transmission paths 2101.1-2101.P comprise a fronthaul network. In both the first and second aspects, the intervening nodes 2102.1-2102.P comprise antennas of a Cooperative-MIMO antenna array.

As depicted in FIG. 21, a plurality P of the intervening nodes 2102.1-2102.P can be selected to provide a final RF link (e.g., transmission paths 2103.1-2103.P) to the destination node 2105. It should be appreciated that each transmission path can comprise multipath components. It should be appreciated that in some aspects, one or more intervening nodes (not shown) may be utilized between the source node 2100 and nodes 2102.1-2102.P.

In one aspect, the destination node 2105 selects the plurality P of the intervening nodes 2102.1-2102.P to increase the number of linearly independent coded transmissions it receives, effectively increasing the rank of the matrix that encodes the transmitted data. In one aspect of the disclosure, the transmission paths 2103.1-2103.P comprise the radio access network, and the antenna system 2115 comprises a spatial multiplexing system configured to perform subspace processing. In another aspect of the disclosure, the transmission paths 2103.1-2103.P comprise a fronthaul network, and the intervening nodes 2102.1-2102.P comprise antennas of a Cooperative-MIMO antenna array.

In one aspect, the transmitted signals comprise multiple addresses corresponding to at least one path from the source node 2100 to the destination node 2105. The transmission may include multiple addresses corresponding to a plurality P of devices (e.g., nodes 2102.1-2102.P) that provide the final RF link to the destination node 2105. Alternatively, the transmission may include only the destination address of the destination node 2105. More than one destination address may be included for a particular transmission. A transmission may be duplicated when paths diverge. For example, a message with addresses to nodes 2102.1-2102.P can be duplicated by node 2100. In some aspects, a broadcast message includes a plurality of addresses, and the network is configured to propagate a single version of the message to all of the addresses.

In accordance with one aspect disclosed in the '163 application, a data message is provided that includes a plurality of destination addresses. Processing instructions, such as transmission weight values (e.g., a pre-coding matrix), are included with the data message. A single copy of the message is routed through nodes that form a path that is common to all of the destination addresses. The message is duplicated where the paths to the destination addresses diverge, but different linear coding is applied to the message for each of the paths. As disclosed in the '163 application, each router or relay can provide its own unique linear codes to the messages that pass through it.

The codes may include any combination of polyphase CI codes, CI-based codes, and channel-specific spatial interferometry codes (e.g., linear codes based on the random channel). For example, the channel characteristics for each transmission path (2101.1-2101.P and/or 2103.1-2103.P) can be exploited to provide addressing and/or multiple-access coding. Coding may include space-time coding, space-frequency coding, polarization coding, etc.

Some aspects of the disclosure provide for CI codes that can be implemented across one or more diversity-parameter spaces. Similar to random linear codes, all CI codes of a given set of CI code words can be constructed from a combination of linearly independent code vectors that form the CI code generation matrix. A CI coder is configured to generate a plurality of algebraically unique linear combinations of a plurality of information signals.

Figure 22A:
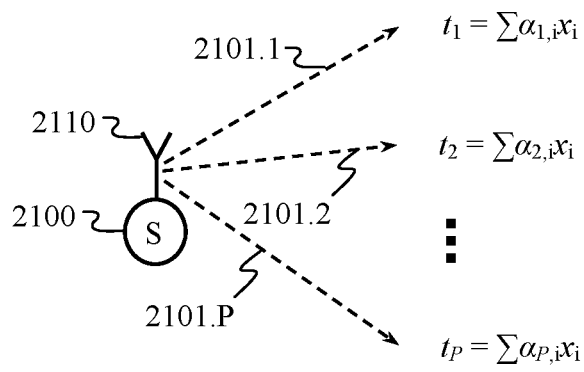
FIGS. 22A and 22B depict signal transmissions propagating in a network with multiple intervening nodes between a source node and a destination node. Selecting the intervening nodes as part of a transmit and/or receive cooperative subspace processing operation can build the rank of the subspace coding matrix of coded signals propagating through the network, thus providing a sufficient number of linearly independent combination of original data to permit subspace demultiplexing at the destination node.

FIG. 22A depicts an aspect of the disclosure wherein at least the source node 2100 transmits a plurality P of transmit messages $t_1, t_2, \ldots, t_p$ on the plurality P of network paths 2101.1, 2101.2, ..., 2101.P, respectively to the plurality P of intervening nodes (e.g., nodes 2102.1, 2102.2, ..., 2102.P). In one aspect, each of the transmit messages $t_1, t_2, \ldots, t_P$ comprises a unique linear combination of P information messages (or symbols) $x_1, x_2, \ldots, x_P$. For example, a $p^{th}$ transmit message $t_p$ may employ a vector of coefficients $[\alpha_{p,1}, \alpha_{p,2}, \ldots, \alpha_{p,P}]$ that is a row or column of a code matrix having rank P. In one aspect disclosed in the '163 application, the code matrix (e.g., channel-specific coding) comprises space-time or space frequency codes (e.g., pre-coding), such as derived from channel measurements. The characteristic randomness of the P terrestrial wireless transmission paths (e.g., 2101.1-2101.P) can provide a code matrix of random values with rank P if the transmission paths 2101.1-2101.P are sufficiently uncorrelated.

In one aspect, the source node 2100 selects the transmission paths 2101.1-2101.P to build up the rank of the code matrix. For example, the source node 2100 selects a sufficient number of the intervening nodes 2102.1-2102.P to ensure that the code matrix has sufficient rank to permit the destination node 2105 to decode the received data. The source node 2100 transmits the codes along with the encoded messages through the network via the intervening nodes 2102.1-2102.P.

Figure 22B:
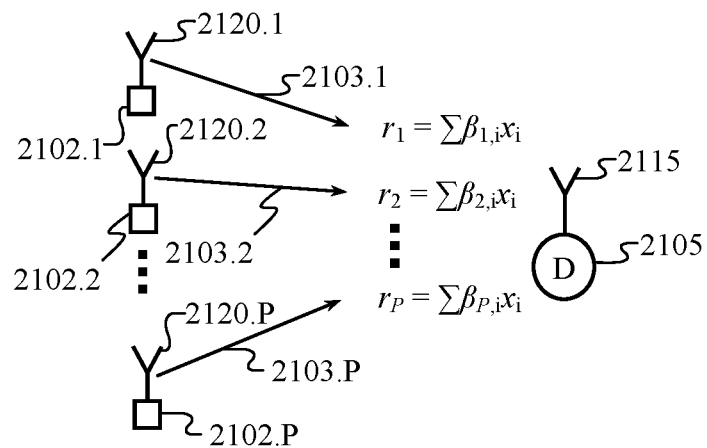

FIG. 22B depicts an aspect of the disclosure wherein the intervening nodes 2102.1-2102.P provide a plurality P of received messages $r_1, r_2, \ldots, r_P$ on the plurality P of network paths 2103.1, 2103.2, ..., 2103.P, respectively to the destination node 2105. In one aspect, each of the received messages $r_1, r_2, \ldots, r_P$ comprises a unique linear combination of P information messages (or symbols) $x_1, x_2, \ldots, x_P$. For example, a $p^{th}$ received message $r_p$ may comprise a vector of coefficients $[\beta_{p,1}, \beta_{p,2}, \ldots, \beta_{p,P}]$ that is a row or column of a code matrix having rank P. In one aspect disclosed in the '163 application, the code matrix (e.g., channel-specific coding) comprises space-time or space frequency codes (e.g., pre-coding), such as derived from channel measurements. The characteristic randomness terrestrial wireless transmission paths (e.g., paths 2101.1-2101.P and/ or paths 2103.1-2103.P) can provide a code matrix of random values with rank P if the transmission paths (2101.1-2101.P and/or paths 2103.1-2103.P) are sufficiently uncorrelated.

In one aspect of the disclosure, the destination node 2105 selects the intervening nodes 2102.1-2102.P to build up the rank of the received coding matrix. For example, the destination node 2105 can select a sufficient number of the intervening nodes 2102.1-2102.P to ensure that the code matrix has sufficient rank to permit the destination node 2105 to decode the received data.

In some aspects of the disclosure, the intervening nodes 2102.1-2102.P function as a cooperative-MIMO antenna array, which enables the destination node 2105 to receive a sufficient number of linearly independent combinations of transmitted signals to permit demultiplexing of the received signals. In one aspect, signals received by each of the intervening nodes 2102.1-2102.P comprises a linear combination of transmitted data signals, and the linear combinations and corresponding code vectors received by the nodes 2102.1-2102.P are communicatively coupled to the destination node 2105 via a fronthaul network comprising the paths 2103.1-2103.P. In another aspect of the disclosure, the destination node 2105 comprises an antenna array (e.g., antenna system 2115), and the transmission paths 2103.1-2103.P comprise the radio access network. The nodes 2102.1-2102.P transmit the codes along with the encoded messages to the destination node 2105. In this aspect, the nodes 2102.1-2102.P and/or the transmission paths 2103.1-2103.P can provide additional coding to the signals received at the destination node 2105. In some aspects, the code matrix may be determined by the destination node 2105 by deriving channel measurements from training (e.g., pilot) signals in the received signals. In other aspects, control signals (such as known training signals) can be encoded such that a receiver, upon correcting for channel distortions, can determine the code(s).

Figure 23A:
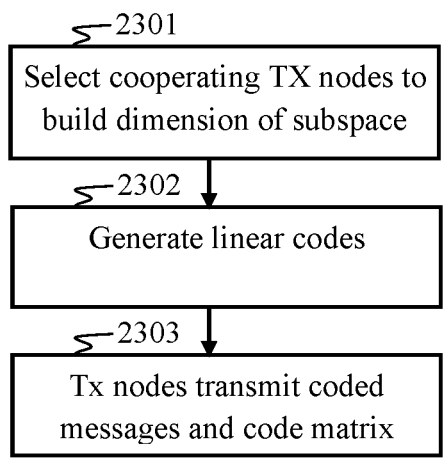
FIG. 23A is a flow diagram that illustrates aspects of the disclosure pertaining to cooperative subspace multiplexing.

FIG. 23A is a flow diagram that illustrates aspects of the disclosure pertaining to cooperative subspace multiplexing. In one aspect, a plurality of cooperating nodes is selected to build the dimension of a subspace spanned by coded transmissions 2301. The plurality of cooperating nodes may comprise a source node. In some aspects, the source node communicates with cooperating transmitter nodes via a fronthaul network.

Linear codes are generated 2302, for example, from channel estimates of a scattering-rich propagation environment. The natural randomness of terrestrial multipath channels can provide statistically random codes. In some aspects, linear coding is provided to transmissions via pre-coding based on channel measurements. In some aspects, linear coding may be provided to transmissions by multipath in the propagation environment. In such aspects, linear codes corresponding to different transmission channels will be algebraically unique if the channels from which the codes are derived are uncorrelated. This occurs when there is sufficient scattering. Thus, employing multipath scattering for encoding transmissions can be achieved by ensuring that transmitting antennas are sufficiently spatially separated to ensure uncorrelated subspace channels.

In some aspects of the invention, linear codes are generated 2302 and then the cooperating transmit nodes are selected 2301 to at least match the dimension of the set of linear codes (e.g., the rank of a resulting code matrix). In other aspects, the linear codes are generated 2302 to match the dimension of the subspace enabled by a pre-selected set of cooperating transmit nodes.

The cooperating transmit nodes transmit the coded messages and code matrix 2303. In one aspect, the code vectors are transmitted along with the data payload. In some aspects, the code vectors may be included in control signals. For example, the code matrix may be conveyed by encoding known values, such as training signals. In some aspects, the natural randomness of the channel encodes transmitted messages and training signals. Thus, transmitting the coded messages and code matrix 2303 can comprise transmitting signals from cooperating transmit nodes that are sufficiently spatially separated to provide uncorrelated transmission channels.

Figure 23B:
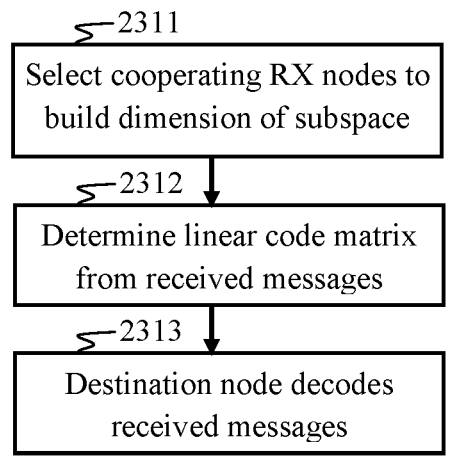
FIG. 23B is a flow diagram that illustrates aspects of the disclosure pertaining to cooperative subspace demultiplexing.

FIG. 23B is a flow diagram that illustrates aspects of the disclosure pertaining to cooperative subspace demultiplexing. In one aspect, a plurality of cooperating nodes is selected to build the dimension of a subspace spanned by received coded messages 2311. The plurality of cooperating nodes may comprise a destination node.

A matrix of linear codes is determined from the received signals 2312. For example, cooperating receiver nodes can communicatively couple their received messages to the destination node (or some other node(s) configured to perform MIMO subspace demultiplexing) via a fronthaul network. In some aspects, the code matrix accompanies the received messages in the data payload and/or as separate control information. In some aspects, the code matrix is determined from measurements of known training signals in the received messages.

In one aspect of the disclosure, determining the code matrix 2312 can indicate a required dimension that permits decoding. Thus, selecting cooperating nodes 2311 may be performed following step 2312, such as to ensure that a sufficient number of linearly independent combinations of the original messages are collected to enable decoding. Once the destination node (or at least one other node configured to perform MIMO subspace demultiplexing) receives a sufficient number of linearly independent combinations, the received messages are decoded 2313.

Figure 24A:
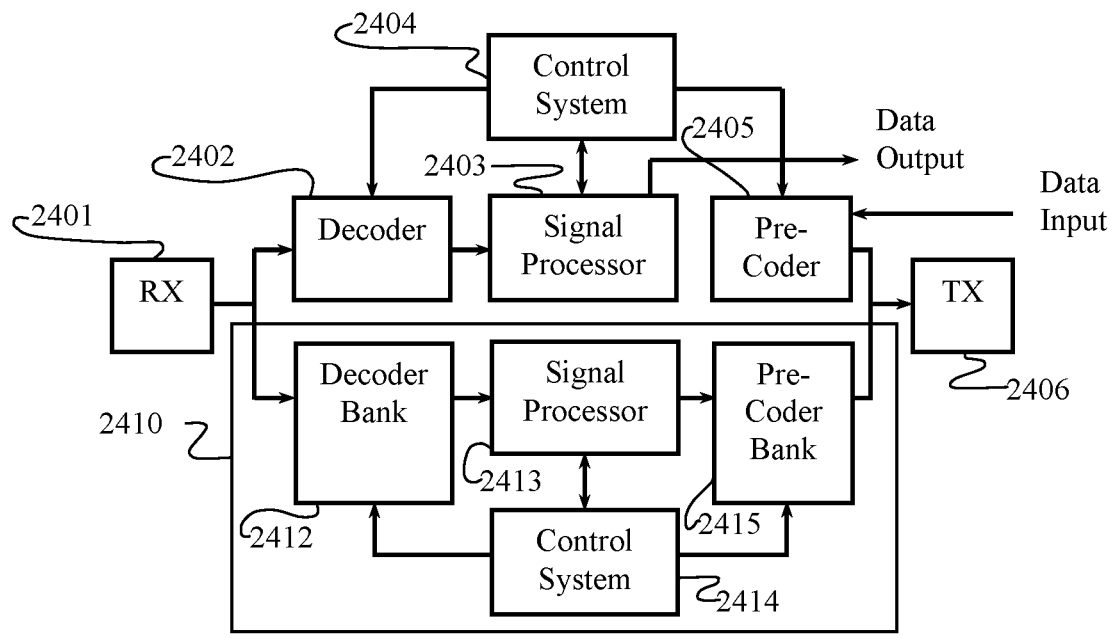
FIGS. 24A and 24B are block diagrams depicting transceiver apparatus and method aspects configured to perform routing and/or relaying.

FIG. 24A is a block diagram depicting a transceiver and transceiver method configured to perform routing in accordance with some aspects of the invention. In one aspect, each block comprises a step or set of steps, which can be performed by one or more circuits or machine components, such as a specialized computing device programmed with instructions to perform specific functions. In one aspect, each block comprises a circuit or a portion of a circuit in a transceiver apparatus. In another aspect, each block comprises a set of instructions that programs a specialized computing device to perform one or more steps disclosed herein. In another aspect, each block and/or a plurality of the blocks comprises at least one specialized computing device programmed with instructions to perform specific functions.

Transmitted signals are received by a receiver system 2401 that outputs a baseband signal. In a wireless network, the receiver system 2401 performs RF and, optionally, baseband processes typically performed to convert an RF signal to a baseband or intermediate frequency signal. For example, the receiver system 2401 may perform channel selection, filtering, amplification, frequency conversion, and A/D conversion.

In one aspect, each transmitted signal comprises a coded data payload and a preamble (or header) that comprises the code. The codes may comprise channel-specific coding. A decoder 2402 can be configured to decode the baseband signal relative to one or more codes in the header. A signal processor 2403 may process the decoded signals prior to producing an output data stream. Signal processing may include one or more signal-processing operations, including, but not limited to, quantization, channel decoding, multiple access decoding, demultiplexing, formatting, demodulation, channel estimation, channel compensation, synchronization, filtering, error detection, error correction, signal-quality analysis, multi-user detection, phase-jitter compensation, frequency-offset correction, time-offset correction, etc.

A control system 2404 is configured to select, adapt, or otherwise control the operation of one or more transceiver components. For example, channel estimates and/or signal-quality analysis performed by the signal processor 2403 may be processed in the control system 2404, such as to adapt decoding performed by the decoder 2402. The control system 2404 may provide power control to a transmission system (e.g., transmission system 2406) and/or otherwise provide network control. Similarly, coding may be adapted by the control system 2404.

A pre-coder 2405 is configured to process input data bits to produce a coded signal that is coupled to the transmission system 2406. The transmission system 2406 performs signal-processing operations typically performed to prepare a baseband signal for transmission into a communication channel. In a wireless network, the transmission system 2406 may perform one or more processes, including, but not limited to, D/A conversion, modulation, filtering, amplification, frequency conversion, beam forming, etc.

Signals from the receiver system 2401 can also be coupled through a routing system 2410. In one aspect, signals from the receiver system 2401 are coupled to a decoder 2412, which may include a bank of decoders. In one aspect of the disclosure, the decoder 2412 decodes received signals that are to be retransmitted. The decoded signals are processed in a signal processor 2413, which may perform similar signal-processing operations as signal processor 2403. Furthermore, the signal processor 2413 may perform pre-processing operations prior to coding in a pre-coder 2415. The pre-coder 2415 may include a bank of pre-coders. A control system 2414 may be configured to select, adapt, or otherwise control the operation of one or more of the transceiver components 2412, 2413, and 2415.

In one aspect, the control system 2414 and the coder 2415 may provide channel-compensation and/or beam-forming weights to the coded symbols. Such weights may be regarded as part of the routing process (e.g., the pre-coding). In some aspects, since routing decodes some signals that are not intended for the transceiver, the router components 2412, 2413, 2414, and 2415 can be isolated from the rest of the transceiver by a fire wall 2410.

In one aspect, the set of router components 2412, 2413, 2414, and 2415 receives signals to be routed, decodes the signals 2412, cleans up the decoded signals 2413, and re-encodes the cleaned-up signals 2415 for retransmission 2406. Additional pre-coded signals (e.g., from the pre-coder 2405) can be combined with the pre-coded signals from the pre-coder 2415 prior to retransmission 2406. As indicated by the junction that joins the pre-coder 2405 and the pre-coder 2415 prior to the transmitter 2406, pre-coded signals to be routed may be summed with pre-coded "Data Input," which produces linear combinations of pre-coded signals.

As disclosed in the '850 and '163 applications, in some aspects, the decoder 2412 does not decode some or all of the input coded signals. Rather, the decoder 2412 maps the input coded signals to different code spaces. For example, when basic linear CI codes are employed, the code coefficients resemble Fourier Transform coefficients which are distributed uniformly on the unit circle in the complex plane. One advantage to using basic linear CI codes is that such codes are orthogonal, and some implementation do not require transmitting the decode vector(s) with the coded transmission. Orthogonal codes comprise different integer numbers of "rotations" on the unit circle in the complex plane. For non-zero rotations, a vector sum of the code coefficients produces a zero result. For a zero rotation, all the code values are mapped to the same point on the unit circle, so the code values sum coherently. Decoding 2412 can map an input code having a first number of rotations to an output code having a second number of rotations. If the second number of rotations is zero, then summing the result yields a solution for a code space in the set of linearly independent coded data values whose coefficients are basic linear CI code values. Thus decoding 2412 can solve for one or more unknowns (i.e., information signals) in the set of linear combinations and/or map at least one code space to at least another code space.

In one aspect of the disclosure, communication signals comprise coded sets of low-bandwidth subchannels. Thus, interference resulting from multipath and effective multipath resulting from retransmissions through the network can be reduced to flat fades. Sub-carrier bandwidths may be adapted to the multipath channel in one or more parts of the network. Coding may be adapted with respect to one or more parameters, including geographical distributions of subscriber units and access points, channel conditions, link priority, security, subscriber services, number of subscribers, etc.

In some aspects of the disclosure, each network node has access to the community's transmissions. The system can allow each node to dynamically select for reception only those transmissions that are relevant to that node. Individual transceivers may be equipped with adaptable or programmable decoders designed to select and decode one or more transmissions. The transceivers may be provided with a bank of decoders to decode and process multiple received signals simultaneously.

Figure 24B:
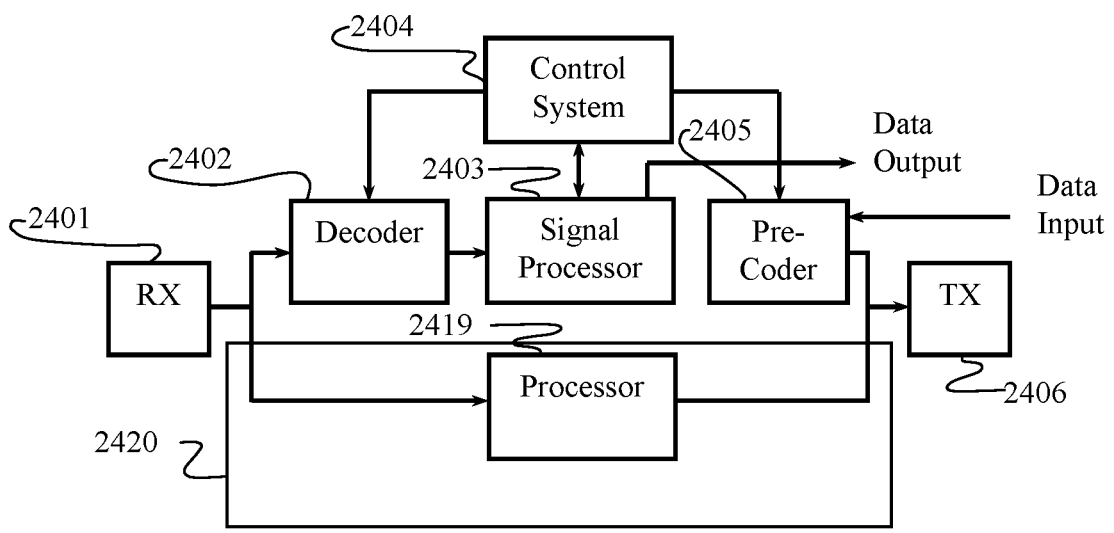

FIG. 24B is a block diagram of a transceiver configured to perform routing in accordance with aspects of the invention. It should be appreciated that FIG. 24B, as well as the other block diagrams of the disclosure, can indicate both apparatus and method implementations. For example, the blocks can indicate circuits, devices, systems, or other physical components of an apparatus or system. In some aspects, the blocks indicate functional components. The grouping of the functional components can take different physical forms. In some aspects, more than one block may be embodied by one particular physical component. In some aspects, a plurality of physical components can be employed as one of the blocks. In some aspects disclosed in the '850 and '163 applications, at least some of the disclosed signal processing operations can be performed by a computer processor and a computer-readable memory comprising processing instructions that instruct the processor to physically change input signals.

In the transceiver depicted in FIG. 24B, signals from the receiver 2401 are coupled through a routing system 2420 and then retransmitted by the transmitter 2406. The routing system 2420 can comprise a processor 2419 configured to process received signals to be routed, and then outputting processed signals to the transmitter 2406. The received signals to be routed may comprise baseband and/or intermediate-frequency (IF) signals. The processor 2419 can be configured to perform one or more baseband or IF processes, including, but not limited to, signal shaping, filtering, re-quantization, error detection, error correction, interference mitigation, multi-user detection, amplification, up sampling, down sampling, frequency conversion, D/A conversion, AGC, symbol remapping, etc.

It should be appreciated that in some aspects, retransmitting (e.g., relaying, routing, and/or repeating) the received signal can effectively increase the rank of the channel matrix H from the perspective of the destination receiver(s), particularly if propagation channel is a scattering-rich environment. The rank of H is the sum of non-zero singular values $\lambda_i$ in which each $\lambda_i$ corresponds to an eigenmode of the channel (i.e., an eigen-channel, or subspace channel). Each non-zero eigenmode can support a data stream, thus the MIMO channel can support k spatial sub-space channels, where k is the number of non-zero eigenvalues $\lambda_i$.

In accordance with some aspects of the disclosure, base-station responsibilities are assigned to (or assumed by) individual UEs. For example, base-station operations can be coordinated with simultaneous coded transmissions of a traffic channel and a control channel. Codes may include CI codes, CI-based coding, channel-specific coding, or any combination thereof. A time division duplexing method may be employed for transmit and receive operations to implement the necessary control functions for operation without a base station. At least one of the UEs can be assigned to be a network control station. By using time division duplexing for transmit and receive operations, the same frequency band(s) can be used for uplink and downlink, which can simplify channel estimation and MIMO processing.

A UE acting as a network control station can maintain power control and time synchronization normally performed by a base station. For example, power control can be maintained within predetermined time intervals by a feedback control loop using proportional integration and differentiation to smooth control such that power oscillations are maintained within desired limits. The network control functions may automatically be transferred if the connection with the transceiver is terminated or there is a predetermined degree of signal-quality degradation. The network control station can have channel control capabilities to assure transmission security. For example, the network control station may assign codes to other UEs to change the security or priority of individual communication links.

Figure 25A:
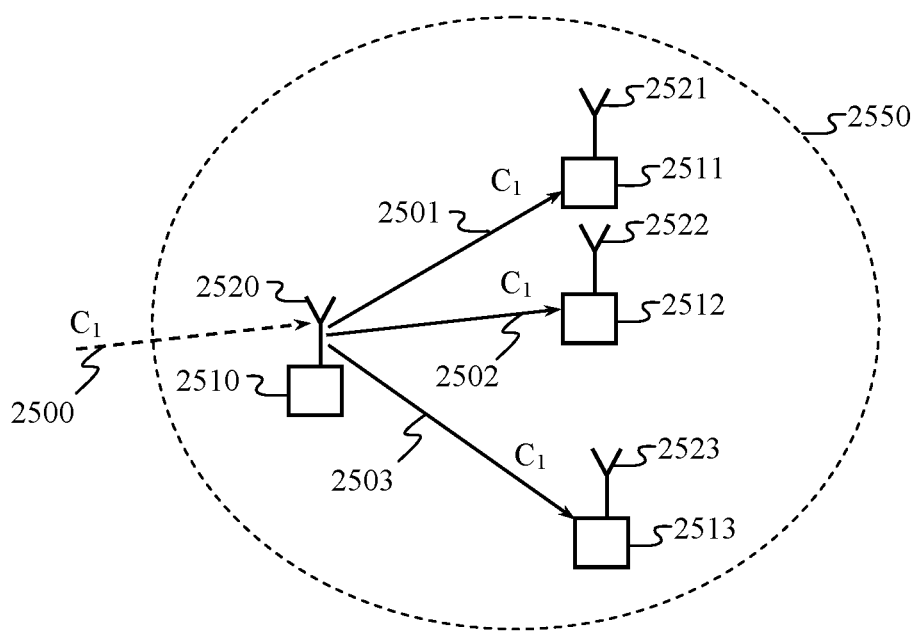
FIGS. 25A and 25B are block diagrams that depicts channel reuse, such as may be configured between a plurality of networks.

FIG. 25A is a block diagram illustrating a network configuration that employs channel reuse between a plurality of networks. A signal 2500 having channel allocation $C_1$ in a first network is received by a transceiver 2510 (with antenna system 2520). For example, the first network may comprise a WWAN, or "macro-cell." The channel $C_1$ is reused for communication in a second network (e.g., a micro-cell network) 2550 comprising transceivers 2510-2513. For example, transmissions 2501-2503 employ the channel allocation $C_1$. As disclosed in the '163 application, the transmissions 2501-2503 can comprise array-processing precoding, which can permit reuse of the channel allocation $C_1$ by the second network via interference mitigation.

In one aspect of the disclosure, antenna systems 2520, 2521, 2522, and 2523 may comprise multiple antennas, and each transceiver 2510, 2511, 2512, and 2513 may be configured to perform array processing with its own antenna system. In another aspect of the invention, the transceivers 2510, 2511, 2512, and 2513 can be configured to perform cooperative array processing, wherein array processing (such as subspace processing) operations are jointly processed by multiple ones of the transceivers 2510, 2511, 2512, and 2513. Combinations of local array processing (i.e., array processing on individual transceivers) and cooperative array processing (e.g., Cooperative MIMO) may be performed.

Figure 25B:
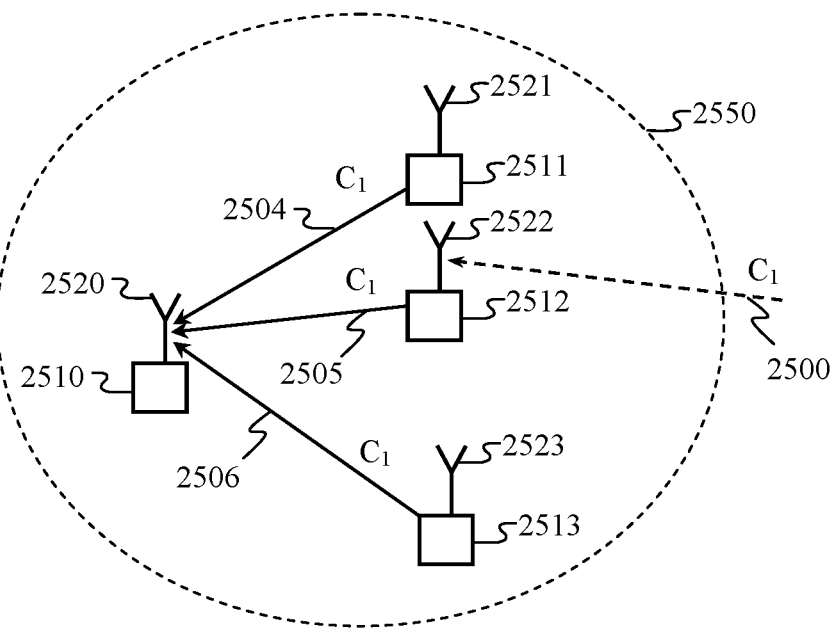

FIG. 25B is a block diagram illustrating a network configuration that employs cooperative array processing and reuses channel $C_1$ allocated to a first link 2500. In one aspect, a plurality of the transceivers (2511, 2512, and 2513) employs channel $C_1$ to communicate with transceiver 2520.

For example, the transceivers 2511, 2512, and 2513 transmit signals 2504, 2505, and 2506, respectively, to transceiver 2510. Pre-coding operations on the transmitted signals 2504, 2505, and 2506 can provide for beam forming (or equivalent array processing) operations. Various combining operations may be provided to produce any combination of interference rejection, diversity enhancement, and sub-space processing (i.e., capacity enhancement). The aforementioned operations can permit a micro-cell network (e.g., network 2550) to employ the same macro-cell channels (e.g., channel $C_1$) without interfering with the macro-cell network.

Methods described with respect to FIGS. 25A and 25B and the related disclosures in the '163 application, the transceivers 2510, 2511, 2512, and 2513 can be implemented, by way of example and without limitation, with apparatus embodiments depicted in and described with respect to FIGS. 24A and/or 24B.

Figure 26:
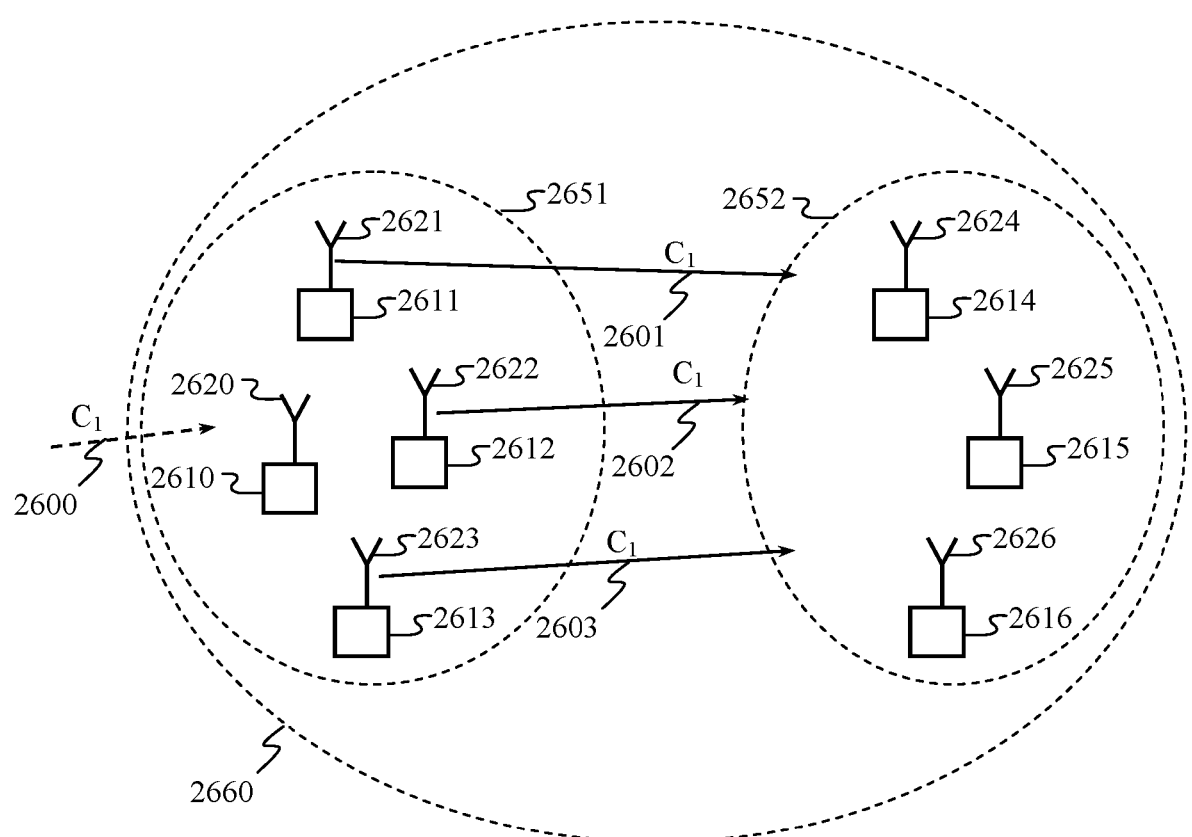
FIG. 26 depicts a cooperative-MIMO network configured to employ channel reuse.

FIG. 26 is a block diagram depicting systems and methods according to some aspects of the disclosure. In one aspect, a cooperative-MIMO network 2660 comprises multiple groups of separate geographically distributed transceivers, wherein at least a first group 2651 employs cooperative subspace processing (e.g., cooperative-MIMO) to communicate with at least a second group 2652, such as disclosed in the '107 and '163 applications. In one aspect of the disclosure, the first transceiver group 2651 comprising transceivers 2610-2613 is configured to communicate subspace signals 2601-2603 employing a common channel $C_1$ to the second transceiver group 2652, which comprises transceivers 2614-2616. Since the transceivers 2610-2616 can be configured to operate in multiple networks (e.g., macro-cell and micro-cell networks), in one aspect, network 2660 can be a micro-cell network configured to reuse channel $C_1$, which is used for communication in the macro-cell.

The subspace signals 2601-2603 comprise a plurality of spatial subchannels that occupy a common frequency spectrum, time interval, and code space denoted by the common channel $C_1$, wherein subspace processing provides for non-interfering parallel subchannels. As disclosed herein, subspace processing can comprise any combination of transmitter-side and receiver side subspace processing. For example, subspace processing can comprise pre-coding (i.e., spatial multiplexing). In some aspects, subspace processing comprises subspace decoding (i.e., spatial demultiplexing).

The transceivers 2610-2616 each comprises an antenna system (e.g., antenna systems 2620-2626, respectively), that includes one or more antennas. Thus, in some aspects, more than one antenna per transceiver can be available for cooperative-MIMO processing. In some aspects, one or more of the transceivers 2610-2616 can perform local antenna array processing (e.g., diversity combining and/or spatial multiplexing) in addition to participating in cooperative-subspace processing. As used herein, "spatial multiplexing" can denote the general practice of subspace processing, which can comprise pre-coding (also referred to as subspace coding or spatial multiplexing) and/or decoding (also referred to as subspace decoding or spatial demultiplexing). In some cases, "spatial multiplexing" specifically denotes subspace processing on the transmitter side of a communication link (which is distinguished from spatial demultiplexing performed on the receiver side of the link), and, thus, comprises subspace coding (also referred to as pre-coding). The intended scope of the terminology used in the disclosure is indicated by the context in which it is used.

Figure 27:
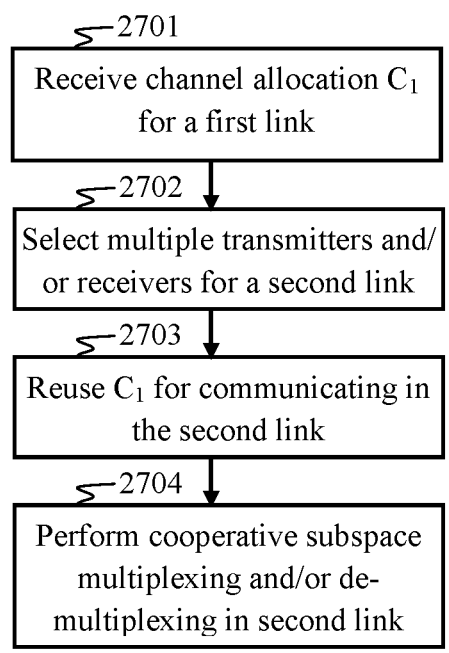
FIG. 27 is a flow diagram that depicts channel reuse methods in accordance with some aspects of the disclosure.

With reference to FIGS. 25A, 25B, and 26, and related disclosures in the '163 application, FIG. 27 is a flow diagram that depicts methods according to some aspects of the invention. In one aspect, a client transceiver (i.e., a client node) receives a channel allocation (e.g., channel $C_1$) for communicating in a first communication link 2701. For example, the client transceiver may receive a signal in channel $C_1$. Alternatively, the client transceiver may be allocated channel $C_1$ for transmitting signals. The channel allocation $C_1$ typically comprises a specified frequency band, time interval, and code space. When no multiple access codes are employed, the code space is simply a vector of ones (e.g., [1, 1, 1, . . . , 1]). By way of example, the channel $C_1$ may be allocated for communication between the client transceiver and at least one other transceiver in the first network, the channel $C_1$ being allocated so as not to interfere with other communication links in the first network.

A "client transceiver," as used herein, indicates a transceiver that is served by a first network via the first communication link. In some aspects of the disclosure, the client transceiver may perform additional network functions, and as such, may function as any of various network devices, such as a router, a relay, a repeater, or a gateway.

A transceiver group comprising multiple transceivers, including the client transceiver, is selected to communicate in a second communication link 2702. In one aspect, selecting 2702 comprises provisioning a plurality of the transceivers to cooperatively transmit signals in the second link. In another aspect, selecting 2702 comprises provisioning a plurality of the transceivers to cooperatively receive signals in the second link. Pluralities of both transmitting and receiving transceivers may be selected, such as depicted in FIG. 26.

In some aspects, the client transceiver functions as a router or relay, such as to forward communications it receives via the first link to a destination node or another intermediate node via at least a second link. The client may select 2702 the transceivers to which it forwards communications. In one aspect, communications forwarded by the client transceiver to a plurality of cooperating transceivers constitute the second link. In another aspect, transmissions from cooperating transceivers (which may or may not include the client transceiver) comprise the second link. In one aspect, the first link is part of a first network and the second link is part of a second network.

The channel $C_1$ is reused for communicating in the second link 2703. Specifically, the second link simultaneously employs the same frequency band and code space as in the first link. Thus, some aspects of the invention are configured to mitigate co-channel interference between signals in the first and second links. Some aspects employ cooperative subspace processing 2704 between at least two transceivers communicating in the second link to mitigate interference between signals in the first and second links. For example, spatial multiplexing (i.e., pre-coding) performed by a plurality of cooperating transmitters can cancel transmissions in the second link that would otherwise interfere with the reception of transmissions in the first link. Spatial de-multiplexing (i.e., subspace decoding) performed by cooperating transmitters can separate interfering first-link and second-link signals, such as to permit reception of either or both first-link and second-link signals by transceivers operating in the second link.

By way of example, if the first link channel $C_1$ is a downlink channel, then cooperative subspace multiplexing and/or demultiplexing can separate received second-link signals from received first-link signals within the transceiver group. By way of example, if the first-link channel $C_1$ is an uplink channel, then cooperative subspace multiplexing (e.g., pre-coding) can cancel co-channel interference due to second-link signals received by receivers communicating in the first link. Also, cooperative subspace multiplexing and/or demultiplexing can separate received second-link signals from received first-link signals within the transceiver group.

As will be appreciated to those skilled in the art, disclosures of the '850 and '163 applications can be employed in various types of communication networks, including LTE networks, which comprise a flat network architecture as opposed to hierarchical architectures of other cellular standards.

Thus, in accordance with some aspects of the disclosure, the UEs disclosed herein comprise LTE UEs. By way of example, a UE may comprise an RF transceiver for fixed and/or mobile clients receiving data streams over a downlink channel(s) in the radio access network and transmitting data via the uplink channel(s) in the radio access network.

A base transceiver station may comprise an eNodeB, which may handle radio resource management, user mobility, and scheduling. The base transceiver stations interface the fronthaul network with the radio access network. A base transceiver station of one aspect of the disclosure is an access point comprising an RF front-end configured to convert baseband signals to RF and RF signals to baseband. The base transceiver station may comprise a Digital-to-Analog Converter (DAC)/Analog-to-Digital Converter (ADC). In some aspects, the base transceiver station is a simple RF transceiver equipped with power amplifier/antenna(s), and RF signals are communicatively coupled between the base transceiver station and the central processor via the fronthaul network, which can include RF-over-fiber technology, such as described in related patents and applications that are incorporated by reference.

A controller employed in an LTE network may comprise a base transceiver station configured to perform certain specialized functions, such as transmitting training signals, receiving/transmitting control information from/to the UEs, receiving channel state information (CSI) or channel quality information from the UEs, etc. Coordinated multipoint systems disclosed herein may comprise multiple controllers. In an LTE network, the controller may comprise a mobility management entity.

A fronthaul network configured in an LTE system may comprise a combination of S1 and X2 interfaces. By way of example, but without limitation, the fronthaul may comprise S1-MME links between the mobility management entity and eNodeBs, S1-U links between the serving gateway and eNodeBs, and X2 links between multiple eNodeBs. In some aspects, the fronthaul network comprises the S1 interface. In other aspects, the fronthaul network comprises the X2 interface.

The LTE network typically comprises a gateway, which comprises a serving gateway (S-GW) that terminates the E-UTRAN interface, and a PDN gateway (P-GW), which interfaces with external networks. In accordance with aspects of the disclosure, the central processor can be implemented by the gateway, such as the S-GW component. In other aspects, one or more of the eNodeBs can be configured to operate as the central processor.

While aspects of the disclosure describe Cooperative-MIMO processing in which high channel selectivity (wherein selectivity refers to statistical variations of spatial gains of propagating signals) is achieved via rich multipath environments and/or geographically distributed transmitters (and/or receivers), alternative aspects may employ other diversity parameters (such as signal polarization) and/or various techniques (e.g., coherence multiplexing, frequency diversity interferometry, etc.), such as described in Applicant's patents and other applications, to achieve channel selectivity. By way of example, in U.S. Pat. No. 6,331,837, which is hereby incorporated by reference in its entirety, Applicant discloses that different antenna beam patterns can provide for different spatial gains, thereby providing the selectivity necessary to achieve spatial multiplexing and/or de-multiplexing. Specifically, subspace processing can be achieved in the beamspace domain of a transmitting and/or receiving array, thus transferring the MIMO operation from the antenna elements to the beamspace. Data streams are mapped onto specific transmitted beam patterns, and beamspace multiplexed data streams are sent simultaneously. Similarly, specific radiation patterns are used to receive transmissions. Since beamspace multiplexing exploits aerial degrees of freedom, such techniques can be advantageous for arrays with closely spaced elements. In some aspects of the disclosure, one or more antenna elements in an array are parasitic elements.

One aspect of the '837 patent discloses outputs from multiple beamforming processes being input to a spatial de-multiplexing process. In the case wherein the number of active receiving antennas is less than the number of transmitting antennas, if the beamforming processes produce a number of linearly independent combinations of received transmissions at least equal to the number of transmit sources, then there is sufficient rank in the resulting channel matrix to separate the received signals. In one sense, the beamforming process can be implemented as a multiple-access coding process that maps M logical channels onto N physical subspace channels, where M>N. Although the total theoretical capacity of the channel (such as expressed by the corresponding Shannon-Hartley theorem for the corresponding MIMO implementation employed) does not increase, the capacity is partitioned across more subchannels. In one aspect, the M subchannels each have a lower SNR (and thus smaller capacity) than the corresponding N subchannels. This could be a result of more correlation between the elements of the channel matrix as its dimension increases. The reciprocal of any such process can be applied to spatial multiplexing. Various techniques, including coherence multiplexing, polarization subspace multiplexing, and frequency diversity interferometry are described, and these and the other disclosed techniques can be employed within the spatial multiplexing and de-multiplexing methods and systems disclosed herein.

The various blocks shown in the figures may be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the invention may be practiced in various components such as integrated circuit chips and modules, and that the exemplary aspects of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary aspects of this invention.

Various modifications and adaptations to the foregoing exemplary aspects of this invention may become apparent to those skilled in the relevant arts in view of the foregoing description, when read in conjunction with the accompanying drawings. However, any and all modifications will still fall within the scope of the non-limiting and exemplary aspects of this invention.

The invention claimed is:

1. A method of enabling a flexible channel bandwidth for mobile radio communications, comprising:
provisioning a set of Orthogonal Frequency Division Multiplexing (OFDM) subcarriers for mobile radio communications;
encoding data symbols with polyphase codes derived from a discrete Fourier transform to produce encoded data symbols; and
modulating the encoded data symbols onto the OFDM subcarriers to produce a superposition signal that resembles a single-carrier signal and has one of a plurality of different symbol durations;
wherein provisioning comprises selecting one of a plurality of different selectable subcarrier spacings, to provide for the one of the plurality of different symbol durations.

2. The method of claim 1, wherein at least one of the plurality of different selectable subcarrier spacings equals at least one other of the plurality of different selectable subcarrier spacings multiplied by a scaling factor that is a power of two.

3. The method of claim 1, wherein the superposition signal is provided with a cyclic prefix.

4. The method of claim 1, wherein the provisioning comprises receiving at least one of a system requirement and a channel characteristic, and the selecting is responsive to the at least one of the system requirement and the channel characteristic to provide at least one of a predetermined transmission rate, a predetermined bandwidth, a predetermined signal-to-noise ratio, or a predetermined delay-spread tolerance.

5. The method of claim 1, wherein the provisioning is performed by a user device or a base station.

6. The method of claim 1, wherein the modulating employs a discrete Fourier transform with a plurality of sampling rates that comprise harmonic frequencies.

7. The method of claim 1, further comprising determining a delay spread in a mobile radio communication network; and based on the delay spread, the selecting being performed according to a first numerology or a second numerology; wherein the first numerology is a first one of the plurality of different selectable subcarrier spacings, and the second numerology is a second one of the plurality of different selectable subcarrier spacings.

8. An apparatus for providing flexible channel bandwidth in mobile radio communications, comprising:
at least one processor; and
at least one non-transitory computer-readable memory in electronic communication with the at least one processor, and instructions stored in the at least one memory, the instructions executable by the at least one processor for:
provisioning a set of Orthogonal Frequency Division Multiplexing (OFDM) subcarriers for mobile radio communications;
encoding data symbols with polyphase codes derived from a discrete Fourier transform to produce encoded data symbols; and
modulating the encoded data symbols onto the OFDM subcarriers to produce a superposition signal that resembles a single-carrier signal and has one of a plurality of different symbol durations;
wherein provisioning comprises selecting one of a plurality of different selectable subcarrier spacings, to provide for the one of the plurality of different symbol durations.

9. The apparatus of claim 8, wherein at least one of the plurality of different selectable subcarrier spacings equals at least one other of the plurality of different selectable subcarrier spacings multiplied by a scaling factor that is a power of two.

10. The apparatus of claim 8, further comprising instructions stored in the at least one non-transitory computer-readable memory, the instructions executable by the at least one processor for adding a cyclic prefix to the superposition signal.

11. The apparatus of claim 8, wherein the provisioning comprises receiving at least one of a system requirement and a channel characteristic, and the selecting is responsive to the at least one of the system requirement and the channel characteristic to provide at least one of a predetermined transmission rate, a predetermined bandwidth, a predetermined signal-to-noise ratio, or a predetermined delay-spread tolerance.

12. The apparatus of claim 8, wherein the provisioning is performed in a user device or a base station.

13. The apparatus of claim 8, wherein the modulating employs a discrete Fourier transform with a plurality of sampling rates that comprise harmonic frequencies.

14. The apparatus of claim 8, further comprising instructions stored in the at least one non-transitory computer-readable memory, the instructions executable by the at least one processor for determining a delay spread in a mobile radio communication network; and based on the delay spread, the selecting being performed according to a first numerology or a second numerology; wherein the first numerology is a first one of the plurality of different selectable subcarrier spacings, and the second numerology is a second one of the plurality of different selectable subcarrier spacings.

15. A computer program product, comprising a non-transitory computer-readable memory having computer readable program code stored therein, the program code containing instructions executable by one or more processors of a computer system for:
provisioning a set of Orthogonal Frequency Division Multiplexing (OFDM) subcarriers for mobile radio communications;
encoding data symbols with polyphase codes derived from a discrete Fourier transform to produce encoded data symbols; and modulating the encoded data symbols onto the OFDM subcarriers to produce a superposition signal that resembles a single-carrier signal and has one of a plurality of different symbol durations;

wherein provisioning comprises selecting one of a plurality of different selectable subcarrier spacings, to provide for the one of the plurality of different symbol durations.

16. The computer program product of claim 15, wherein at least one of the plurality of different selectable subcarrier spacings equals at least one other of the plurality of different selectable subcarrier spacings multiplied by a scaling factor that is a power of two.

17. The computer program product of claim 15, further comprising instructions stored in the at least one non-transitory computer-readable memory, the instructions executable by the at least one processor for adding a cyclic prefix to the superposition signal.

18. The computer program product of claim 15, wherein the provisioning comprises receiving at least one of a system requirement and a channel characteristic, and the selecting is responsive to the at least one of the system requirement and the channel characteristic to provide at least one of a predetermined transmission rate, a predetermined bandwidth, a predetermined signal-to-noise ratio, or a predetermined delay-spread tolerance.

19. The computer program product of claim 15, wherein the provisioning is performed in a user device or a base station.

20. The computer program product of claim 15, wherein the modulating employs a discrete Fourier transform with a plurality of sampling rates that comprise harmonic frequencies.

21. The computer program product of claim 15, further comprising instructions stored in the at least one non-transitory computer-readable memory, the instructions executable by the at least one processor for determining a delay spread in a mobile radio communication network; and based on the delay spread, the selecting being performed according to a first numerology or a second numerology; wherein the first numerology is a first one of the plurality of different selectable subcarrier spacings, and the second numerology is a second one of the plurality of different selectable subcarrier spacings.

* * * * *

EX PARTE REEXAMINATION CERTIFICATE (13158th)

United States Patent
Shattil

(10) Number: US 11,424,792 C1
(45) Certificate Issued: Jan. 26, 2026

(54) COORDINATED MULTIPOINT SYSTEMS

(71) Applicant: Genghiscomm Holdings, LLC, Boulder, CO (US)

(72) Inventor: Steve Shattil, Cheyenne, WY (US)

(73) Assignee: GENGHISCOMM HOLDINGS, LLC, Boulder, CO (US)

Reexamination Request:
No. 90/019,848, Feb. 11, 2025

Reexamination Certificate for:
Patent No.: 11,424,792
Issued: Aug. 23, 2022
Appl. No.: 17/183,114
Filed: Feb. 23, 2021

Related U.S. Application Data

(60) Continuation of application No. 16/575,713, filed on Sep. 19, 2019, now Pat. No. 10,931,338, which is a continuation of application No. 14/733,013, filed on Jun. 8, 2015, now Pat. No. 10,425,135, which is a continuation-in-part of application No. 13/116,984, filed on May 26, 2011, now Pat. No. 10,014,882, which is a continuation-in-part of application No. 12/328,917, filed on Dec. 5, 2008, now Pat. No. 7,965,761, which is a division of application No. 11/621,014, filed on Jan. 8, 2007, now Pat. No. 7,593,449.

(51) Int. Cl.
H04B 7/0456 (2017.01)
H04B 1/00 (2006.01)
H04B 7/024 (2017.01)
H04B 7/0452 (2017.01)
H04B 7/06 (2006.01)

(52) U.S. Cl.
CPC ......... *H04B 7/0456* (2013.01); *H04B 1/0003* (2013.01); *H04B 7/024* (2013.01); *H04B 7/0452* (2013.01); *H04B 7/0632* (2013.01)

(58) Field of Classification Search
None
See application file for complete search history.

(56) References Cited

To view the complete listing of prior art documents cited during the proceeding for Reexamination Control Number 90/019,848, please refer to the USPTO's Patent Electronic System.

*Primary Examiner* — Woo H Choi

(57) ABSTRACT

A flexible channel bandwidth for mobile radio communications is provided by provisioning a set of Orthogonal Frequency Division Multiplexing (OFDM) subcarriers for mobile radio communications; encoding data symbols with polyphase codes derived from a discrete Fourier transform to produce encoded data symbols; and modulating the encoded data symbols onto the OFDM subcarriers to produce a superposition signal that resembles a single-carrier signal and has one of a plurality of different symbol durations. The provisioning comprises selecting one of a plurality of different selectable subcarrier spacings, to provide for the one of the plurality of different symbol durations.

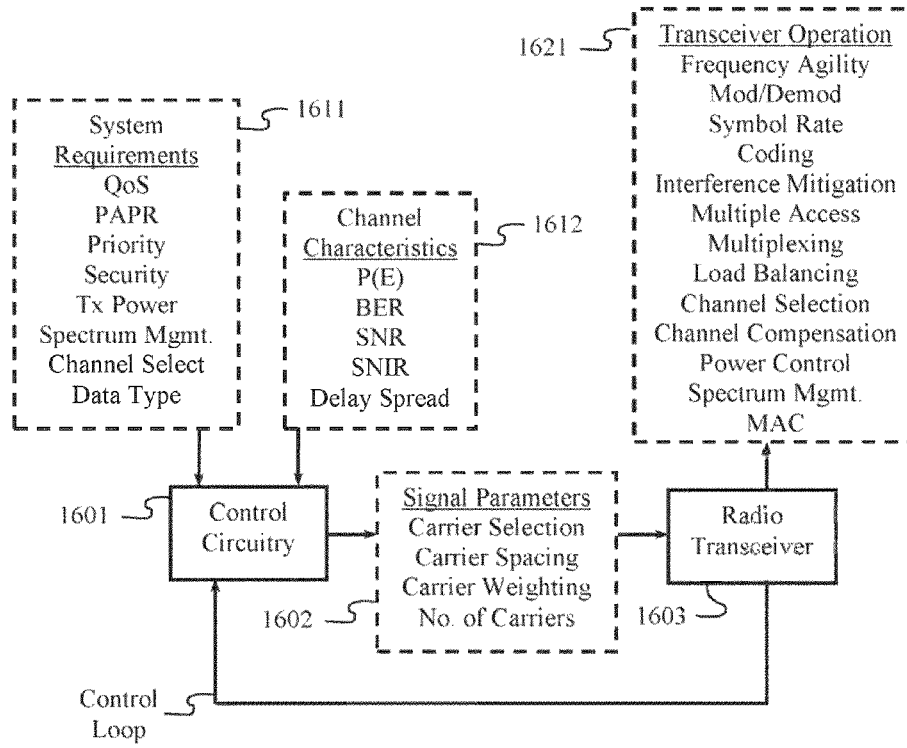

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 8-10 is confirmed.

Claims 1-7 and 11-21 were not reexamined.

\* \* \* \* \*